US012293501B2

(12) United States Patent
Stuart et al.

(10) Patent No.: US 12,293,501 B2
(45) Date of Patent: May 6, 2025

(54) IMAGING TOOL FOR VIBRATION AND/OR MISALIGNMENT ANALYSIS

(71) Applicant: Fluke Corporation, Everett, WA (US)

(72) Inventors: Michael D. Stuart, Issaquah, WA (US); John C. Bernet, Bremerton, WA (US)

(73) Assignee: Fluke Corporation, Everett, WA (US)

( * ) Notice: Subject to any disclaimer, the term of this patent is extended or adjusted under 35 U.S.C. 154(b) by 224 days.

(21) Appl. No.: 17/560,817

(22) Filed: Dec. 23, 2021

(65) Prior Publication Data

US 2022/0261980 A1 Aug. 18, 2022

Related U.S. Application Data

(63) Continuation of application No. 16/805,131, filed on Feb. 28, 2020, now Pat. No. 11,210,776, which is a (Continued)

(51) Int. Cl.
*G01H 9/00* (2006.01)
*G01B 11/27* (2006.01)
(Continued)

(52) U.S. Cl.
CPC .......... *G06T 7/0004* (2013.01); *G01B 11/272* (2013.01); *G01H 9/00* (2013.01);
(Continued)

(58) Field of Classification Search
CPC ... G06T 7/0004; G06T 7/0014; G06T 7/0016; G06T 7/10; G01H 9/00; G05B 23/00; H04N 5/232; H04N 5/332
See application file for complete search history.

(56) References Cited

U.S. PATENT DOCUMENTS

| 4,467,279 A | 8/1984 | MacCormack |
| 4,954,094 A | 9/1990 | Humphrey |
| (Continued) |

FOREIGN PATENT DOCUMENTS

| CN | 1548967 A | 11/2004 |
| CN | 101617238 A | 12/2009 |
| (Continued) |

OTHER PUBLICATIONS

1587 FC/1587/1577 Insulation Multimeter, User's Manual, Apr. 2005, 50 pages.

(Continued)

*Primary Examiner* — Jeffery A Williams
(74) *Attorney, Agent, or Firm* — Seed IP Law Group LLP

(57) ABSTRACT

Systems and methods can be used for analyzing image data to determine an amount of vibration and/or misalignment in an object under analysis. In some instances, as operating equipment heats up during operation, temperature changes of various portions of the operating equipment leads to changes in dimensions of such portions, leading to misalignment. Multiple sets of data representative of the operating equipment in multiple operating conditions can be used to determine an amount of misalignment due to thermal offsets. Hot and cold temperatures of the equipment can be used to calculate thermal growth of various portions of the equipment, which can be used to determine an amount a misalignment due to thermal offsets. Additionally or alternatively, image data representing the equipment can be used to observe changes in alignment between states.

20 Claims, 23 Drawing Sheets

Related U.S. Application Data continuation of application No. 15/332,361, filed on Oct. 24, 2016, now Pat. No. 10,586,319, which is a continuation of application No. PCT/US2016/058331, filed on Oct. 22, 2016.

(60) Provisional application No. 62/247,998, filed on Oct. 29, 2015, provisional application No. 62/248,097, filed on Oct. 29, 2015, provisional application No. 62/245,351, filed on Oct. 23, 2015.

(51) Int. Cl.
| | | |
|---|---|---|
| *G05B 23/00* | (2006.01) | |
| *G06T 7/00* | (2017.01) | |
| *G06T 7/20* | (2017.01) | |
| *G06T 7/246* | (2017.01) | |
| *G06T 7/30* | (2017.01) | |
| *G06T 7/70* | (2017.01) | |
| *H04N 5/00* | (2011.01) | |

(52) U.S. Cl.
CPC ............... *G06T 7/001* (2013.01); *G06T 7/20* (2013.01); *G06T 7/246* (2017.01); *G06T 7/30* (2017.01); *G06T 7/70* (2017.01); *G06T 2207/10016* (2013.01); *G06T 2207/10048* (2013.01); *G06T 2207/30164* (2013.01)

(56) References Cited

U.S. PATENT DOCUMENTS

| | | | |
|---|---|---|---|
| 5,065,249 A | 11/1991 | Horn et al. | |
| 5,500,786 A | 3/1996 | Ono | |
| 5,844,719 A | 12/1998 | Wada | |
| 6,095,682 A | 8/2000 | Hollander et al. | |
| 7,535,002 B2 | 5/2009 | Johnson et al. | |
| 7,810,001 B2 | 10/2010 | Zhou et al. | |
| 7,851,758 B1 | 12/2010 | Scanlon et al. | |
| 7,994,480 B2 | 8/2011 | Johnson et al. | |
| 8,097,857 B2 | 1/2012 | Cochran et al. | |
| 8,186,873 B1 | 5/2012 | Madding | |
| 8,186,876 B2 | 5/2012 | Mullin et al. | |
| 8,208,026 B2 | 6/2012 | Hogasten et al. | |
| 8,274,273 B2 | 9/2012 | Nguyen et al. | |
| 8,289,372 B2 | 10/2012 | Hamrelius et al. | |
| 8,374,438 B1 | 2/2013 | Wagner | |
| 8,520,970 B2 | 8/2013 | Strandemar | |
| 8,620,841 B1 | 12/2013 | Filson et al. | |
| 8,749,635 B2 | 6/2014 | Hogasten et al. | |
| 8,803,698 B1 | 8/2014 | Heydron | |
| 9,058,653 B1 | 6/2015 | Kostrazewa et al. | |
| 9,143,703 B2 | 9/2015 | Boulanger et al. | |
| 9,235,023 B2 | 1/2016 | Burt et al. | |
| 9,264,154 B1 | 2/2016 | Laun | |
| 9,464,984 B2 | 10/2016 | Schmidt et al. | |
| 9,473,681 B2 | 10/2016 | Hoelter et al. | |
| 9,509,924 B2 | 11/2016 | Terre et al. | |
| 9,568,368 B2 | 2/2017 | Bohn et al. | |
| 9,716,843 B2 | 7/2017 | Fox et al. | |
| 2002/0001032 A1 | 1/2002 | Ohki | |
| 2002/0038205 A1 | 3/2002 | Gray et al. | |
| 2003/0089183 A1 | 5/2003 | Jacobsen et al. | |
| 2004/0004482 A1 | 1/2004 | Bouabdo et al. | |
| 2004/0030524 A1 | 2/2004 | Jarrell et al. | |
| 2004/0190586 A1 | 9/2004 | Lee | |
| 2005/0107976 A1 | 5/2005 | Klijn et al. | |
| 2005/0188290 A1 | 8/2005 | Motika et al. | |
| 2005/0259715 A1 | 11/2005 | Lee et al. | |
| 2005/0279172 A1 | 12/2005 | Schreier et al. | |
| 2006/0012385 A1 | 1/2006 | Tsao et al. | |
| 2006/0017821 A1 | 1/2006 | Garvey et al. | |
| 2006/0025663 A1 | 2/2006 | Talbot | |
| 2006/0043296 A1 | 3/2006 | Mian et al. | |
| 2006/0046793 A1 | 3/2006 | Hamilton et al. | |
| 2006/0066325 A1 | 3/2006 | McGinnis et al. | |
| 2006/0150724 A1 | 7/2006 | Byrne | |
| 2006/0249679 A1 | 11/2006 | Johnson et al. | |
| 2006/0282736 A1 | 12/2006 | Schroth et al. | |
| 2007/0058164 A1 | 3/2007 | Shibata et al. | |
| 2007/0087311 A1 | 4/2007 | Garvey et al. | |
| 2007/0198226 A1 | 8/2007 | Lee | |
| 2008/0026647 A1 | 1/2008 | Boehnlein et al. | |
| 2008/0091470 A1 | 4/2008 | Muradia | |
| 2008/0099678 A1 | 5/2008 | Johnson et al. | |
| 2008/0100253 A1 | 5/2008 | Kiyamura | |
| 2008/0204034 A1 | 8/2008 | Blades | |
| 2008/0295582 A1 | 12/2008 | Lee et al. | |
| 2009/0030558 A1* | 1/2009 | Rogers | G01B 11/2755 700/297 |
| 2009/0097502 A1 | 4/2009 | Yamamoto | |
| 2009/0141137 A1 | 6/2009 | Watanabe et al. | |
| 2009/0158849 A1 | 6/2009 | Gregg et al. | |
| 2009/0184244 A1 | 7/2009 | Drews et al. | |
| 2009/0294666 A1 | 12/2009 | Hargel | |
| 2010/0097057 A1 | 4/2010 | Karpen | |
| 2010/0117885 A1 | 5/2010 | Holbrook et al. | |
| 2010/0130838 A1 | 5/2010 | Kermani et al. | |
| 2010/0148759 A1 | 6/2010 | Lagerberg et al. | |
| 2010/0163730 A1 | 7/2010 | Schmidt et al. | |
| 2010/0164527 A1 | 7/2010 | Weyh et al. | |
| 2010/0225299 A1 | 9/2010 | Nguyen et al. | |
| 2010/0240317 A1 | 9/2010 | Giles et al. | |
| 2011/0018987 A1 | 1/2011 | Doi | |
| 2011/0096168 A1 | 4/2011 | Siann et al. | |
| 2011/0112701 A1 | 5/2011 | Johnson et al. | |
| 2011/0122251 A1 | 5/2011 | Schmidt | |
| 2011/0154999 A1 | 6/2011 | Schoch | |
| 2011/0185048 A1 | 7/2011 | Yew et al. | |
| 2011/0239794 A1 | 10/2011 | Krapf et al. | |
| 2011/0273556 A1 | 11/2011 | Lyons et al. | |
| 2012/0001768 A1 | 1/2012 | Radosavljevic et al. | |
| 2012/0019281 A1 | 1/2012 | Barbour, II | |
| 2012/0038458 A1 | 2/2012 | Toepke et al. | |
| 2012/0038760 A1 | 2/2012 | Kantzes et al. | |
| 2012/0154172 A1 | 6/2012 | O'Hara et al. | |
| 2012/0206129 A1 | 8/2012 | Mahan et al. | |
| 2012/0244290 A1 | 9/2012 | Mullin et al. | |
| 2012/0276867 A1 | 11/2012 | McNamee et al. | |
| 2012/0314086 A1 | 12/2012 | Hubel et al. | |
| 2012/0320189 A1 | 12/2012 | Stuart et al. | |
| 2013/0006570 A1 | 1/2013 | Kaplan | |
| 2013/0010287 A1 | 1/2013 | Tutton et al. | |
| 2013/0028477 A1 | 1/2013 | Schmieder et al. | |
| 2013/0057713 A1 | 3/2013 | Khawand | |
| 2013/0078908 A1 | 3/2013 | Smith | |
| 2013/0155249 A1 | 6/2013 | Neeley et al. | |
| 2013/0155474 A1 | 6/2013 | Roach et al. | |
| 2013/0162835 A1 | 6/2013 | Forland et al. | |
| 2013/0169799 A1 | 7/2013 | Hoelzl et al. | |
| 2013/0176418 A1 | 7/2013 | Pandey et al. | |
| 2013/0188058 A1 | 7/2013 | Nguyen et al. | |
| 2013/0250102 A1 | 9/2013 | Scanlon et al. | |
| 2013/0253551 A1 | 9/2013 | Boyle et al. | |
| 2013/0278264 A1 | 10/2013 | Boskamp | |
| 2013/0278771 A1 | 10/2013 | Magoun et al. | |
| 2013/0286408 A1 | 10/2013 | Castillo et al. | |
| 2013/0321621 A1 | 12/2013 | Menzel | |
| 2013/0321641 A1 | 12/2013 | McManus et al. | |
| 2013/0342680 A1 | 12/2013 | Zeng et al. | |
| 2014/0002639 A1 | 1/2014 | Cheben et al. | |
| 2014/0036068 A1 | 2/2014 | Nguyen et al. | |
| 2014/0042319 A1 | 2/2014 | Pickett et al. | |
| 2014/0058797 A1 | 2/2014 | Roy et al. | |
| 2014/0062496 A1 | 3/2014 | Kwon et al. | |
| 2014/0085459 A1 | 3/2014 | Blanton et al. | |
| 2014/0104415 A1 | 4/2014 | Fox et al. | |
| 2014/0119213 A1 | 5/2014 | Devarasetty | |
| 2014/0176725 A1 | 6/2014 | Stuart et al. | |
| 2014/0184810 A1 | 7/2014 | Sekiguchi | |
| 2014/0219314 A1 | 8/2014 | Ryou | |
| 2014/0253735 A1 | 9/2014 | Fox et al. | |
| 2014/0266765 A1 | 9/2014 | Neeley et al. | |

(56) References Cited

U.S. PATENT DOCUMENTS

| | | | |
|---|---|---|---|
| 2014/0267699 A1* | 9/2014 | Dorrance | G01B 11/2755 382/104 |
| 2014/0267753 A1 | 9/2014 | Epperson et al. | |
| 2014/0267757 A1 | 9/2014 | Abramson et al. | |
| 2014/0270546 A1 | 9/2014 | Neeley et al. | |
| 2014/0278259 A1 | 9/2014 | Neeley et al. | |
| 2014/0313325 A1 | 10/2014 | Buehler et al. | |
| 2014/0327735 A1 | 11/2014 | Ruchet et al. | |
| 2015/0054492 A1 | 2/2015 | Mende et al. | |
| 2015/0063652 A1 | 3/2015 | Mangan et al. | |
| 2015/0170110 A1 | 6/2015 | Schluessel et al. | |
| 2015/0185251 A1 | 7/2015 | Heydron et al. | |
| 2015/0205135 A1 | 7/2015 | Border et al. | |
| 2015/0269742 A1 | 9/2015 | Bergstrom et al. | |
| 2015/0334225 A1 | 11/2015 | Bull et al. | |
| 2015/0365598 A1 | 12/2015 | Tanaka et al. | |
| 2015/0369730 A1 | 12/2015 | Schmidt et al. | |
| 2016/0025799 A1 | 1/2016 | Stolper et al. | |
| 2016/0076936 A1 | 3/2016 | Schoch et al. | |
| 2016/0076937 A1 | 3/2016 | Stuart et al. | |
| 2016/0076943 A1 | 3/2016 | Bohn et al. | |
| 2016/0080666 A1 | 3/2016 | Stuart et al. | |
| 2016/0080667 A1 | 3/2016 | Stuart et al. | |
| 2016/0105810 A1 | 4/2016 | Khurana et al. | |
| 2016/0105811 A1 | 4/2016 | Khurana et al. | |
| 2016/0116309 A1 | 4/2016 | Silva et al. | |
| 2016/0119592 A1 | 4/2016 | Stuart et al. | |
| 2016/0131607 A1 | 5/2016 | Silva et al. | |
| 2016/0173743 A1 | 6/2016 | Masarik | |
| 2016/0223588 A1 | 8/2016 | Fox | |
| 2016/0290869 A1 | 10/2016 | Frank et al. | |
| 2016/0300341 A1 | 10/2016 | Hay et al. | |
| 2017/0061663 A1 | 3/2017 | Johnson et al. | |
| 2017/0078544 A1 | 3/2017 | Ringsrud et al. | |
| 2017/0078545 A1 | 3/2017 | Kearsley et al. | |
| 2017/0111258 A1 | 4/2017 | Bezold et al. | |
| 2017/0116725 A1 | 4/2017 | Stuart et al. | |
| 2017/0140520 A1 | 5/2017 | Stuart et al. | |
| 2017/0374296 A1 | 12/2017 | Schmidt | |

FOREIGN PATENT DOCUMENTS

| | | |
|---|---|---|
| CN | 101672864 A | 3/2010 |
| CN | 103606276 A | 2/2014 |
| CN | 203422465 U | 2/2014 |
| CN | 103760448 A | 4/2014 |
| DE | 102004007314 A1 | 8/2005 |
| EP | 2230605 A1 | 9/2010 |
| EP | 2570879 A2 | 3/2013 |
| EP | 2683146 A1 | 1/2014 |
| EP | 2684731 A1 | 1/2014 |
| EP | 2778628 A2 | 9/2014 |
| JP | H05014781 A | 1/1993 |
| JP | 2008232637 A | 10/2008 |
| WO | 0203029 A1 | 1/2002 |
| WO | 2011131758 A1 | 10/2011 |
| WO | 2012170941 A2 | 12/2012 |
| WO | 2012170946 A2 | 12/2012 |
| WO | 2012170949 A1 | 12/2012 |
| WO | 2012170953 A2 | 12/2012 |
| WO | 2012170954 A2 | 12/2012 |
| WO | 2013052196 A1 | 4/2013 |
| WO | 2013052383 A1 | 4/2013 |
| WO | 2014012070 A1 | 1/2014 |
| WO | 2014043592 A2 | 3/2014 |
| WO | 2014082097 A1 | 5/2014 |
| WO | 2014085699 A1 | 6/2014 |
| WO | 2014093721 A1 | 6/2014 |
| WO | 2014093724 A1 | 6/2014 |
| WO | 2014170306 A1 | 10/2014 |

OTHER PUBLICATIONS

Fluke 3000 FC Series Test Tools Fluke, URL=http://www.mouser.com/catalog/specsheets/Fluke, download date Mar. 31, 2014, 12 pages.

Fluke Connect TM Wi-Fi Connection to Thermal Imager, Retrieved from URL=http://www.bergeng.com/mm5/downloads/fluke/FC_ti90_qreng000.pdf, download date May 31, 2014, 2 pages.

Measuring from a Safe Distance from the Fluke Connect app, URL=https://www.youtube.com/wach, download date May 12, 2014, 1 page.

Guoxiong et al., "Measurement and Control Circuit," China Machine Press, Version 3, Mar. 2008, Section 2.3, with partial English translation, 6 pages.

International Search Report, mailed Jan. 31, 2017, for International Application No. PCT/US2016/058331.

Li et al., "A Machine Vision Method for the Measurement of Vibration Amplitude," Meas. Sci. Technol. 18, 2007, 11 pages.

Son et al., "*Vibration displacement measurement technology for cylindrical structures using camera images*," Nuclear Engineering and Technology 47(4):488-499, 2015.

Ti125, Ti110, Ti105, Ti100, Ti95, and Ti90 Industrial-Commercial Imagers, URL=http://www.farnell.com/datasheets/1829789.pdf, download date May 31, 2014, 4 pages.

* cited by examiner

IMAGING TOOL FOR VIBRATION AND/OR MISALIGNMENT ANALYSIS

CROSS-REFERENCES

This application is a continuation of U.S. application Ser. No. 16/805,131, filed Feb. 28, 2020, which is a continuation of U.S. application Ser. No. 15/332,361, filed Oct. 24, 2016, which claims the benefit of U.S. Provisional Application No. 62/245,351, filed Oct. 23, 2015; U.S. Provisional Application No. 62/247,998, filed Oct. 29, 2015; and U.S. Provisional Application No. 62/248,097, filed Oct. 29, 2015, and which is a continuation of International Patent Application No. PCT/US16/58331, filed Oct. 22, 2016, the contents of which are hereby incorporated by reference in their entirety.

BACKGROUND

Vibration and/or misalignment can lead to a variety of issues in operating equipment. For example, vibration and/or misalignment can lead to excess heat being generated in the operating equipment, loss of efficiency of equipment, increased wear and tear on the equipment, and the like. In some precision processes, excess vibration and/or misalignment can lead to an inability to successfully perform such processes to the satisfaction of an operator.

Typical analysis of such vibration and/or misalignment provides little and/or incomplete information. For example, in rotating equipment such as motors, pumps fans, air-handlers and other shaft driven or shaft-coupled equipment, traditional vibration analysis tools can typically only see one type of vibration or misalignment at a time: parallel or angular. Such information can only provide so much guidance in correcting a detected problem.

In some cases, a user is forced to repeatedly shut down the equipment to incrementally adjust the alignment of the equipment until satisfactory operation is achieved. This can be costly to the system operator in terms of downtime, labor, increased part replacement frequency, and the like. Moreover, even when a user achieves alignment considered to be satisfactory, additional improves may not be realized by the user, resulting in further inefficiencies and/or increasing the likelihood of recurring errors.

SUMMARY

Aspects of the present disclosure are directed toward systems and methods for analyzing vibration and/or misalignment of an object, for example, due to thermal changes in system dimensions. In exemplary embodiments, a plurality of sets of image data (e.g., visible light (VL) and/or infrared (IR) image data) representative of an object, wherein at least some of the sets of image data are captured while the equipment is in different operating state (e.g., hot and cold state) are analyzed. The plurality of images can be used to determine an amount of misalignment in the object.

In some embodiments, analyzing the plurality of images comprises registering the images relative to one another to determine the changes in dimensions of certain portions of an object. Additionally or alternatively, in some examples, the plurality of sets of image data comprises thermal image data representing the object in a cold state and the object in a hot state. The thermal image data can be used to calculate the temperature change (e.g., between the cold state and hot state) of a portion of the object. The calculated temperature change can be used with additional parameters (e.g., thermal expansion coefficients, initial dimensions, etc.) to determine an amount of thermal expansion of such portions. In addition to or alternatively to thermal image data, other temperature measurement techniques can be used to measure the cold and/or hot temperatures of the portions of the object for calculating thermal expansion. In some examples, the portions of the object analyzed comprises one or more feet configured to support the object off the ground.

In some embodiments, determined thermal expansion of portions of an object can be used to determine alignment calibration parameters for subsequent alignment processes to compensate for the thermal growth. In some examples, such alignment calibration parameters can be input into an alignment tool (e.g., a laser alignment tool) for calibrating the alignment tool for subsequent alignment processes.

In some embodiments, various steps in such processes can be performed by one or more processors included in one or more system components. For example, in various embodiments, thermal expansion, misalignment information, and/or alignment calibration parameters can be determined by any number of components, such as the alignment tool, an imaging tool, a test and measurement tool, an external device (e.g., a smartphone, tablet, etc.), a remote server, or combinations thereof. Parameters such as thermal and/or dimensional properties of the object, portions of the object, or the like, can be manually entered by a user, downloaded from a server, recalled from a memory, or the like, to facilitate various calculations.

Similarly, systems can include one or more non-transitory computer-readable media comprising executable instructions for collectively causing one or more programmable processors to carry out various processes. For example, such instructions can include instructions to receive image and/or temperature data, determine temperature changes, determine thermal growth and/or misalignment, and determine one or more alignment calibration parameters based on the determined thermal growth and/or misalignment and the like. Such one or more non-transitory computer-readable media can be included in a single component (e.g., an imaging tool, an external device, an alignment tool, etc.) or can be distributed across multiple components.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives. Additionally, figures used herein to facilitate descriptions of various embodiments are not necessarily to scale unless otherwise noted. Rather, figures are drawn to illustrate various concepts and configurations related to embodiments described herein.

An imaging tool can include thermal imaging components that may be used to detect heat patterns across a scene, including an object or objects, under observation. Such components in an imaging tool may detect infrared radiation given off by the scene and convert the infrared radiation into an infrared image indicative of the heat patterns. In some embodiments, the imaging tool may also capture visible light from the scene and convert the visible light into a visible light image. Depending on the configuration of the imaging tool, the imaging tool may include infrared optics to focus the infrared radiation on an infrared sensor and visible light optics to focus the visible light on a visible light sensor.

Various embodiments provide methods and systems for producing thermal images with reduced noise using averaging techniques. To further improve image quality and eliminate problems that may arise from averaging (e.g., blurring, ghosting, etc.), an image alignment process is performed on the thermal images prior to averaging.

Figure 1:
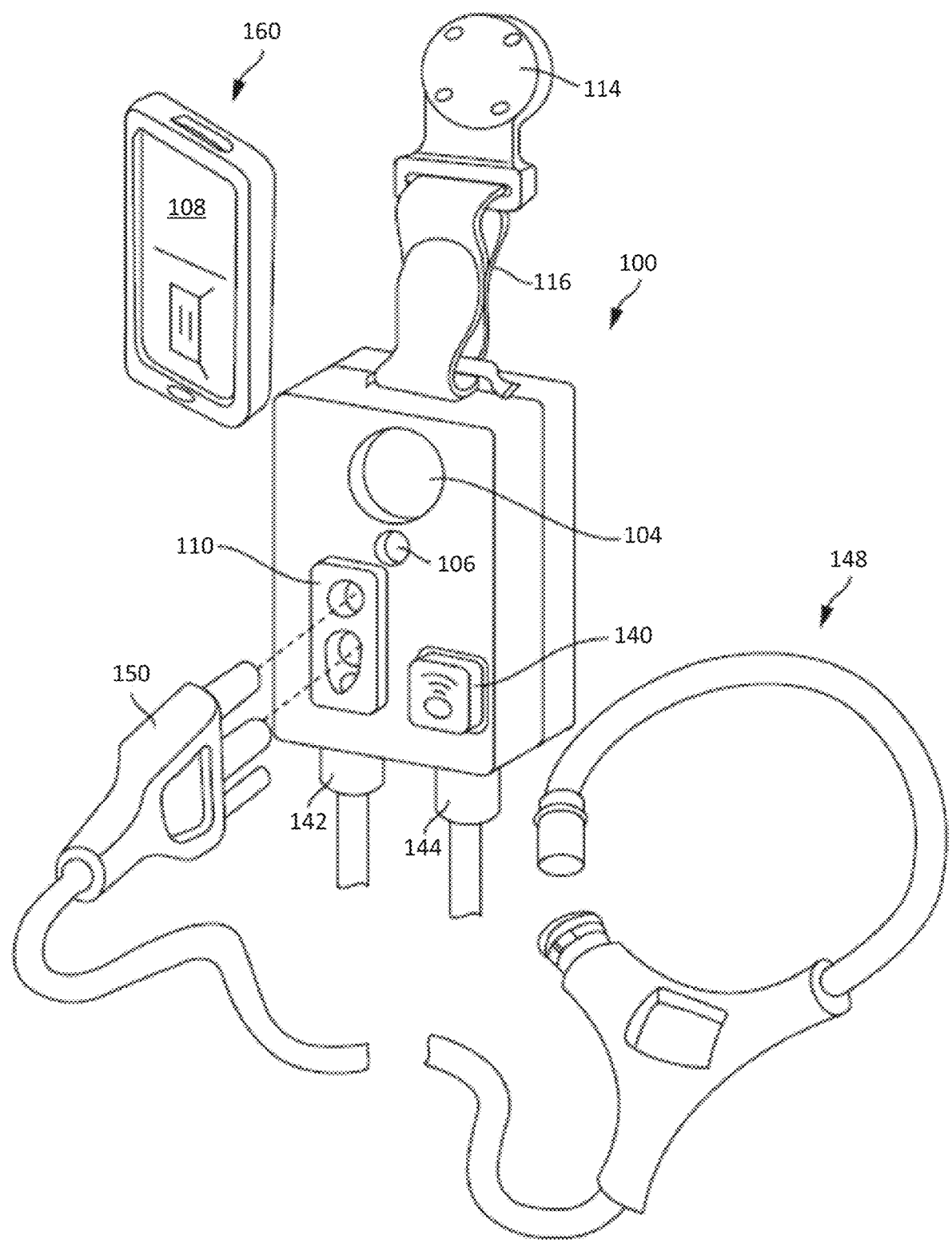
FIG. 1 shows a perspective view of an example imaging tool.

FIG. 1 shows a perspective view of an example imaging tool 100 capable of generating infrared and visible light image data. The imaging tool 100 includes a housing 102, an infrared lens assembly 104, and a visible light lens assembly 106. Housing 102 houses the various components of imaging tool 100. In the illustrated embodiment, the top portion of imaging tool 100 includes an attachment mechanism 114 for permanently or removably affixing the imaging tool 100 to a surface. In some instances, a user can affix the imaging tool 100 to a surface or structure proximate equipment under test so that the equipment under test is in the field of view of the imaging tool 100. The attachment mechanism 114 can include any appropriate material or construction for affixing to a surface or structure, such as a hook and loop material, a magnet, a snap, a clip, and the like. The attachment mechanism 114 can be secured to the imaging tool 100 via a strap 116. In other embodiments, the attachment mechanism 114 can be attached directly to the imaging tool 100.

Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Imaging tool 100 captures the visible light image and/or the infrared image in response to a variety of possible prompts as described elsewhere herein.

Imaging tool 100 may also include a focus mechanism (not shown) coupled to infrared lens assembly 104 that is configured to move at least one lens of the infrared lens assembly so as to adjust the focus of an infrared image generated by the imaging tool 100. Additionally or alternatively, the focus mechanism may move the FPA relative to one or more lenses of the infrared lens assembly.

In operation, imaging tool 100 detects heat patterns in a scene by receiving energy emitted in the infrared-wavelength spectrum from the scene and processing the infrared energy to generate an infrared (e.g., thermal) image. Imaging tool 100 may also generate a visible light image of the same scene by receiving energy in the visible light-wavelength spectrum and processing the visible light energy to generate a visible light image. As described in greater detail below, imaging tool 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, imaging tool 100 collects or captures the infrared energy and visible light energy substantially simultaneously (e.g., at the same time) so that the visible light image and the infrared image generated by the imaging tool 100 are of the same scene at substantially the same time. In these examples, the infrared image generated by imaging tool 100 is indicative of localized temperatures within the scene at a particular period of time while the visible light image generated by the imaging tool 100 is indicative of the same scene at the same period of time. In other examples, imaging tool 100 may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series. In some examples, the infrared lens assembly 104 may include lenses having diffractive or reflective properties or elements. Additional optical components such as mirrors (e.g., Fresnel mirrors) and the like may be included within or otherwise proximate to the infrared lens assembly 104.

In some examples, imaging tool 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move at least one lens to various focus positions, e.g., in response to instructions from imaging tool 100. In one application of such an example, imaging tool 100 may use a distance sensor such as a laser (not shown) to electronically measure a distance between an object in a target scene and the imaging tool 100, referred to as the distance-to-target. Imaging tool 100 may then control the automatically adjusting focus mechanism to move the at least one lens of infrared lens assembly 104 to a focus position that corresponds to the distance-to-target data determined by imaging tool 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by interfacing with the imaging tool 100.

During operation of imaging tool 100, an operator may wish to view a thermal image of a scene and/or a visible light image of the same scene generated by the imaging tool 100. For this reason, imaging tool 100 may include or otherwise be in communication with a display. In the example of FIG. 1, imaging tool 100 includes display 108 that is remote (e.g., separate) from infrared lens assembly 104 and visible light lens assembly 106 of imaging tool 100, such as embedded in an external device 160.

Exemplary external devices (160) can include, for example, smartphones, tablets, computers, remote facilities, and the like. The external device 160 can generally communicate with the imaging tool 100 via a wired or wireless communication. Wired connection can include USB, serial, or other known wired communication technology. Additionally or alternatively, wireless communication can include radio frequency (RF) communication, infrared (IR) communication, Wi-Fi, Zigbee, Bluetooth, or other known wireless communication technology. In some examples, the external device 160 can communicate with an imaging tool 100 via a network (e.g., the Internet, a local area network, or other known communication networks) via wired communication, wireless communication, or a combination thereof.

Imaging tool 100 can include a variety of user input media for controlling the operation thereof and adjusting different settings of the imaging tool 100. Example control functions may include adjusting the focus of the infrared and/or visible light optics, opening/closing a shutter, capturing an infrared and/or visible light image, or the like. In some examples, imaging tool 100 includes interface elements such as a depressible trigger control and/or buttons for controlling other aspects of the operation of the imaging tool 100. Different numbers or arrangements of user input media are possible, and it should be appreciated that the disclosure is not limited in this respect. For example, imaging tool 100 may include a touch screen display which receives user input by depressing different portions of the screen.

In some embodiments, user input media can be integrated into an external device 160 in communication with the imaging tool 100. In an exemplary embodiment, a smartphone or tablet (e.g., 160) having a touchscreen is in communication with an imaging tool (e.g., 100). The touchscreen of the smartphone or tablet can provide a soft button interface for a user to interact with the imaging tool, for example, via an application running on the external device.

In some examples, the imaging tool 100 includes an interface 110 capable of communicating with other equipment, such as with a measurement accessory 148 or other auxiliary measurement device. In the illustrated embodiment, imaging tool 100 includes interface 110 for receiving an interfacing plug 150 of the measurement accessory 148. The imaging tool 100 can receive a signal from the measurement accessory 148 via the interface 110 and generate measurement data therefrom. For example, in the illustrated embodiment, the auxiliary measurement accessory 148 can be configured to measure a parameter of equipment under test and/or the target scene, such as the current flowing through a conductor, the ambient temperature, or the measurement date, and communicate data to the imaging tool 100 representative of measured parameter. Accordingly, imaging tool 100 may include and/or function as an auxiliary measurement device generating measurement data representative of at least one parameter of a device under test. In some examples, the imaging tool 100, the auxiliary measurement accessory 148 or the combination of the auxiliary measurement accessory 148 and the imaging tool 100 may be referred to as test and measurement tools or combination tools. For example, in some embodiments, an imaging tool 100 can include test and measurement functionality, such as interfacing with an auxiliary measurement accessory (e.g., 148) to generate measurement data. In other examples, an imaging tool 100 directly or indirectly communicates with a separate test and measurement tool as described elsewhere herein.

The imaging tool 100 of FIG. 1 includes an IR imaging device (e.g., 104) and a VL imaging device (e.g., 106) for generating IR and VL image data representative of a target scene, respectively. IR and VL image data can be combined and displayed in any number of ways, such as those described in U.S. Pat. No. 7,535,002, entitled "CAMERA WITH VISIBLE LIGHT AND INFRARED BLENDING," which is assigned to the assignee of the instant application, and which is hereby incorporated by reference in its entirety. The IR and VL image data can be combined or otherwise displayed or analyzed by a user or a processing device. In some examples, the imaging tool 100 includes a processor for performing any combination of processing IR and VL image data, processing measurement data from the measurement accessory 148, initiating one or more operations by one or more of the VL imaging device, the IR imaging device, and the measurement accessory 148 in response to received information, combining received data from any of such tools, or any other processing functions.

The illustrated system of FIG. 1 includes an external device 160, which can be in wired or wireless communication with the imaging tool 100. The external device 160 can include a smartphone, tablet, or any other external device capable of performing any of receiving, processing, or displaying data. In some examples, the imaging tool 100 includes a button 140 for activating a wireless interface of the imaging tool 100. In some such examples, actuating button enables wireless communication between the imaging tool 100 and an external device such as 160. In some embodiments, the button 140 can enable wireless communication between the imaging tool 100 and an auxiliary measurement device, an external device 160, and/or a remote location, for example over a network. In some embodiments, wireless communication between the imaging tool 100 and an external device 160 need not be initiated by button 140. For instance, in some examples, the imaging tool 100 may be configured to communicate with any appropriate external device within communication range. In some examples, communication may be established automatically with an external device. In some such examples, communicating is established automatically with a device running appropriate software (e.g., a smartphone or tablet application). In still further embodiments, communication may be established from the external device.

The imaging tool 100 of FIG. 1 includes a communication link 142 for communicating or receiving data or other signals to or from other devices. For instance, in some examples, the imaging tool 100 can interface with the external device 160 or other equipment (e.g., an external auxiliary measurement device) via a wired connection to the communication link 142. In various embodiments, communication link 142 may provide for wired communication, wireless communication, or both.

The imaging tool 100 can include a power input 144 for receiving power from a power source. For instance, the power input 144 can be coupled to an external power supply, such as a wall socket or other power supply. Additionally or alternatively, the imaging tool 100 can include one or more batteries for powering the imaging tool 100 or can parasitically receive power from a powered proximate device. In some examples, the power input 144 may provide electrical power to the imaging tool, an integrated auxiliary measurement device (e.g., via interface 110), or both.

In some examples, the imaging tool 100 transmits data either wirelessly or via a wired connection (e.g., communication link 142) to a separate device, such as the external device 160 or other remote location. The separate device can analyze one or both of imaging data and measurement data, and can communicate commands back to the imaging tool 100 in response to one or more satisfied thresholds or predetermined conditions. Additionally or alternatively, external device 160 can receive any combination of measurement data, IR image data, and VL image data from the imaging tool 100. Accordingly, in some examples, the external device 160 can display any combination of such data, including measurement data (e.g., the amount of current flowing through a conductor), a VL image of the target scene, an IR image of the target scene, a combination VL and IR image of the target scene, and apparent temperature data of the target scene determined from the IR image data. In general, any combination of available data can be displayed.

While shown as directly interfacing with measurement accessory 148, imaging tool 100 can be in wired or wireless communication with an auxiliary measurement device configured to generate measurement data. Additionally or alternatively, an external device (e.g., 160) can be in communication with both the imaging tool 100 and an auxiliary measurement device and can perform some or all of the processing duties of received image and/or measurement data.

Figure 2:
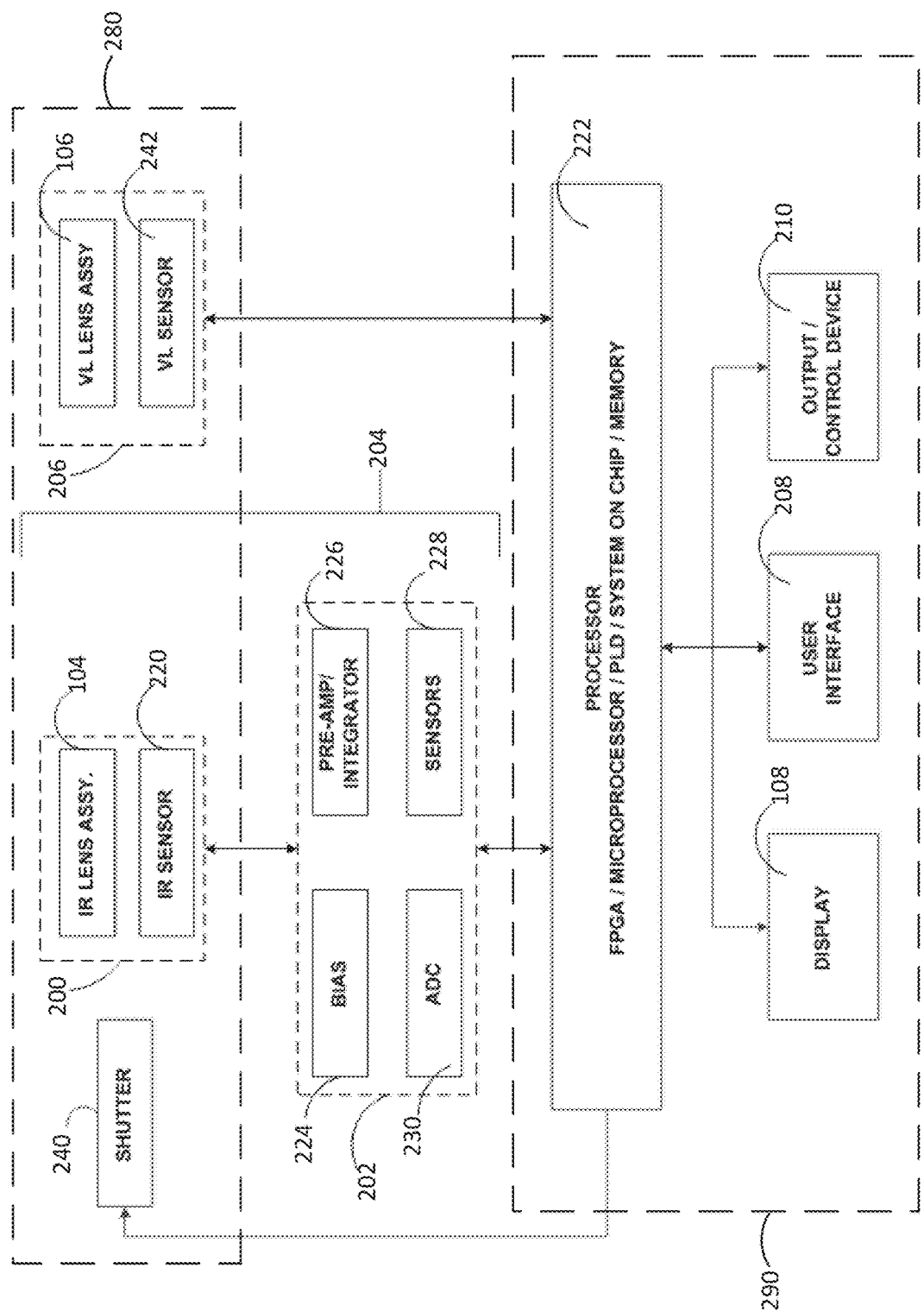
FIG. 2 is a functional block diagram illustrating components included in or in communication with an exemplary imaging tool.

FIG. 2 is a functional block diagram illustrating components included in or in communication with an exemplary imaging tool. Imaging tool includes an IR camera module 200, front end circuitry 202. The IR camera module 200 and front end circuitry 202 are sometimes referred to in combination as front end stage or front end components 204 of the imaging tool 100. Imaging tool 100 may also include a visible light camera module 206, a display 108, a user interface 208, and an output/control device 210 (e.g., external device 160). As described elsewhere herein, some such components, such as a display 108 or a user interface 208, can be located separately from the imaging tool (e.g., in external device 160).

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 2, infrared camera module 200 is illustrated as including infrared lens assembly 104 and infrared sensor 220. As described above with respect to FIG. 1, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a sensor pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 650×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the sensor pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g., an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g., 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the imaging tool 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the imaging tool 100 and (ii) to compensate for array-to-array variations in the average detector elements of the IR sensor 220. Such bias compensation can be automatically controlled by the imaging tool 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the imaging tool 100.

In some embodiments, the front end circuitry 202 can include one or more additional elements for example, an ADC 230 and/or one or more auxiliary measurement devices such as additional sensors or devices 228. Additional sensors 228 can include, for example, temperature sensors, visual light sensors (such as a CCD), pressure sensors, magnetic sensors, etc. Additionally or alternatively, auxiliary measurement devices can provide any variety of information, such as a time, date, or the like. Such sensors or other auxiliary measurement devices can provide additional calibration and detection information to enhance the functionality of the imaging tool 100. For example, temperature sensors can provide an ambient temperature reading near the IR sensor 220 to assist in radiometry calculations. A magnetic sensor, such as a Hall Effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter 240 can be externally or internally located relative to the lens and operate to open or close the view provided by the infrared lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within imaging tool 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause imaging tool 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before imaging tool 100 is used in another application. Processor 222 may also be implemented as a System on Chip that integrates some or all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of imaging tool 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at substantially a given point in time. That is, in some examples, a plurality of pixels making up the infrared image may be captured simultaneously. In other embodiments, sets of one or more pixels may be captured serially until each pixel has been captured.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. When displayed on a display 108, an infrared image can comprise a plurality of display pixels. Display pixels can have any defined relationship with corresponding sensor pixels. In some examples, each sensor pixel corresponds to a display pixel in an image representation of infrared data. In other examples, a plurality of sensor pixels may be combined (e.g., averaged) to provide infrared information for a single display pixel. In still other examples, a single sensor pixel may contribute to a plurality of display pixels. For example, a value from a single sensor pixel may be replicated at nearby pixels, such as in a simple upsampling procedure. In other examples, neighboring or otherwise nearby pixels may be averaged to create a new pixel value, such as in an interpolation procedure. Because relationships between display pixels and sensor pixels are defined with respect to imaging tool operation, the generic term "pixel" may refer to the sensor pixel, the display pixel, or the data as it is processed from the sensor pixel to the display pixel unless otherwise stated. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by imaging tool 100) or less than an entire infrared image (e.g., a lesser port of the entire target scene captured by imaging tool 100). Processor 222 may perform other image processing functions, as described in greater detail below.

Independent of the specific circuitry, imaging tool 100 may be configured to manipulate data representative of a target scene so as to provide an output that can be displayed, stored, transmitted, or otherwise utilized by a user.

Imaging tool 100 includes visible light camera module 206. Visible light camera modules are generally well known. For examples, various visible light camera modules are included in smartphones and numerous other devices. In some embodiments, visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 2, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108. In some examples, the visible light module 206 is configurable by a user, and can provide output, for example, to display 108, in a variety of formats. Visible light camera module 206 may include compensation functionality for varying lighting or other operating conditions or user preferences. The visible light camera module may provide a digital output including image data, which may include data in a variety of formats (e.g., RGB, CYMK, YCbCr, etc.).

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of imaging tool 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of imaging tool 100 a single time. By generating a frame of visible light data, processor 222 captures visible light image of a target scene at a given point in time. Processor 222 may also repeatedly measure the response of each visible light sensor element of imaging tool 100 so as to generate a dynamic thermal image (e.g., a video representation) of a target scene, as described above with respect to infrared camera module 200. In some examples, the visible light camera module 206 may include its own dedicated processor or other circuitry (e.g., ASIC) capable of operating the visible light camera module 206. In some such embodiments, the dedicated processor is in communication with processor 222 for providing visible light image data (e.g., RGB image data) to processor 222. In alternative embodiments, a dedicated processor for the visible light camera module 206 may be integrated into processor 222.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by imaging tool 100) or less than an entire visible light image (e.g., a lesser port of the entire target scene captured by imaging tool 100).

In some embodiments, one or both of infrared 200 and visible light 206 camera modules for acquiring IR and VL image data may be included in an image acquisition module 280. The image acquisition module may be in wired or wireless communication with a processing module 290 that includes a processor such as 222. Processing module 290 may receive image data from the image acquisition module 280 and perform subsequent processing steps as will be described herein. In some examples, processing module 290 may include portable processing devices, such as a smartphone or a tablet. In some such embodiments, various components of front end circuitry 202 may be included in the image acquisition module 280, the processing module 290, or both.

In these and other examples, processor 222 may control display 108 to concurrently display at least a portion of the visible light image captured by imaging tool 100 and at least a portion of the infrared image captured by imaging tool 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In such an arrangement, for a pixel or set of pixels in the visible light image representative of a portion of the target scene, there exists a corresponding pixel or set of pixels in the infrared image, representative of substantially the same portion of the target scene. In various embodiments, the size and/or resolution of the IR and VL images need not be the same. Accordingly, there may exist a set of pixels in one of the IR or VL images that correspond to a single pixel in the other of the IR or VL image, or a set of pixels of a different size. Similarly, there may exist a pixel in one of the VL or IR images that corresponds to a set of pixels in the other image. Thus, as used herein, corresponding does not require a one-to-one pixel relationship, but may include mismatched sizes of pixels or groups of pixels. Various combination techniques of mismatched sized regions of images may be performed, such as up- or down-sampling one of the images, or combining a pixel with the average value of a corresponding set of pixels. Other examples are known and are within the scope of this disclosure.

Thus, corresponding pixels need not have a direct one-to-one relationship. Rather, in some embodiments, a single infrared pixel has a plurality of corresponding visible light pixels, or a visible light pixel has a plurality of corresponding infrared pixels. Additionally or alternatively, in some embodiments, not all visible light pixels have corresponding infrared pixels, or vice versa. Such embodiments may be indicative of, for example, a picture-in-picture type display as previously discussed. Thus, a visible light pixel will not necessarily have the same pixel coordinate within the visible light image as does a corresponding infrared pixel. Accordingly, as used herein, corresponding pixels generally refers pixels from any image (e.g., a visible light image, an infrared image, a combined image, a display image, etc.) comprising information from substantially the same portion of the target scene. Such pixels need not have a one-to-one relationship between images and need not have similar coordinate positions within their respective images.

Similarly, images having corresponding pixels (i.e., pixels representative of the same portion of the target scene) can be referred to as corresponding images. Thus, in some such arrangements, the corresponding visible light image and the infrared image may be superimposed on top of one another, at corresponding pixels. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an exemplary combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like. In general, an alpha-blended combination of visible light and infrared images can comprise anywhere from 100 percent infrared and 0 percent visible light to 0 percent infrared and 100 percent visible light. In some embodiments, the amount of blending can be adjusted by a user of the imaging tool. Thus, in some embodiments, a blended image can be adjusted between 100 percent visible light and 100 percent infrared.

Additionally, in some embodiments, the processor 222 can interpret and execute commands from user interface 208, and/or output/control device 210. This can involve processing of various input signals and transferring those signals to the front end circuitry 202 via a connection therebetween. Components (e.g., motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

Processor can further include other components to assist with the processing and control of the imaging tool 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with imaging tool 100 via user interface 208, which may include buttons, keys, or another mechanism for receiving input from a user. The operator may receive output from imaging tool 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale. In other examples, display 108 is configured to display an infrared image in a color palette such as, e.g., amber, ironbow, blue-red, or other high contrast color scheme. Combinations of grayscale and color palette displays are also contemplated. In some examples, the display being configured to display such information may include processing capabilities for generating and presenting such image data. In other examples, being configured to display such information may include the ability to receive image data from other components, such as processor 222. For example, processor 222 may generate values (e.g., RGB values, grayscale values, or other display options) for each pixel to be displayed. Display 108 may receive such information and map each pixel into a visual display.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of imaging tool 100 and, in some examples, may include a rechargeable or non-rechargeable battery and a power generation circuit.

During operation of imaging tool 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by imaging tool 100.

Imaging tools can be employed in various systems and configurations to perform monitoring and/or analysis functions. For example, in some instances, an exemplary imaging tool can be used to characterize operation of a piece of equipment under test based on the heat pattern of the equipment. Portions of the equipment operating at a temperature that is too high or too low can be an indication of equipment malfunction or other undesirable operating conditions. Observing the thermal profile of the equipment can be useful in identifying and addressing such issues.

In some cases, equipment under test is easily accessible by a technician who can manually perform thermal analysis of the equipment in order to observe any trends or anomalies in the heat pattern of the equipment. However, in other cases, equipment can be difficult to access, making manual inspection more cumbersome. Additionally or alternatively, a system or facility having many pieces of equipment can make an inspection process of each piece of equipment difficult and/or time intensive. Moreover, some facilities are not staffed with a trained technician such as a thermographer capable of performing thermal image analysis.

Aspects of this disclosure are generally directed toward systems and methods for providing enhanced thermal analysis for a target scene. In some embodiments, one or more imaging tools can be deployed proximate each piece of equipment for which thermal analysis is desired. In some such examples, such imaging tools can communicate with external devices such as smartphones, tablets, computers, remote monitoring facilities, and the like to facilitate observation of the thermal profile of the equipment. Some such systems are described in U.S. patent application Ser. Nos. 14/921,128, filed Oct. 23, 2015, and entitled "IMAGING SYSTEM EMPLOYING FIXED, MODULAR MOBILE, AND PORTABLE INFRARED CAMERAS WITH ABILITY TO RECEIVE, COMMUNICATE, AND DISPLAY DATA AND IMAGES WITH PROXIMITY DETECTION" and 14/855,989, filed Sep. 16, 2015, and entitled "DISPLAY OF IMAGES FROM AN IMAGING TOOL EMBEDDED OR ATTACHED TO A TEST AND MEASUREMENT TOOL," each of which is assigned to the assignee of the instant application and is hereby incorporated by reference in its entirety. In such arrangements, an imaging tool can remain in the same position for continuous or periodic monitoring of a piece of equipment from substantially the same point of view.

Additionally or alternatively, in some embodiments, the imaging tool can include or otherwise be in communication with one or more auxiliary measurement devices configured to acquire data representative of one or more parameters of the target scene and/or the equipment under test. Auxiliary measurement devices can include any of a variety of devices, such as test and measurement tools described in U.S. patent application Ser. No. 14/855,884, filed Sep. 16, 2015, and entitled "TEST AND MEASUREMENT SYSTEM WITH REMOVABLE IMAGING TOOL," which is assigned to the assignee of the instant application and is hereby incorporated by reference in its entirety. Exemplary auxiliary measurement devices can include, but are not limited to, digital multimeters, current measurement tools, power quality tools, vibration tools, portable oscilloscope tools, laser alignment tools, ultrasonic test tools, insulation resistance testers, multi-function electrical test tools, single-function electrical test tools, contact temperature measurement tools, humidity measurement tools, air-flow measurement tools, air temperature measurement tools, air quality and particulate measurement tools, clocks, calendars, or other devices capable of providing information representative of aspects of the target scene. The imaging tool and the auxiliary measurement device(s) can be used individually and/or together to analyze behavior of the equipment under test.

In some such examples, the imaging tool can be in wired or wireless communication with the auxiliary measurement device and/or an external device as described elsewhere herein. Similarly, the auxiliary measurement device can be in wired or wireless communication with the imaging tool and/or an external device. In some examples, the imaging tool and the auxiliary measurement device are in communication with one another as well as at least one common external device. In some such examples, one of the auxiliary measurement device and the imaging tool can be in communication with the external device via the other of the auxiliary measurement device and the imaging tool.

While FIGS. 1 and 2 describe aspects of an imaging tool 100 including both visible light and infrared imaging components, it will be appreciated that aspects of the disclosure may be carried out by imaging tools including only visible light, only infrared, or a combination of visible light and infrared imaging components. Some exemplary systems and processes as described herein include infrared image data and/or visible light image data.

As discussed elsewhere herein, vibration and/or misalignment in equipment can lead to various issues and inefficiencies in operating the equipment. In various systems, exemplary symptoms of excessive vibration and/or misalignment can include high casing temperatures at or near equipment bearings, high discharge oil temperatures, excessive amount of oil leakage at the bearing seals, loose foundation bolts, shim packs or dowel pins, loose or broken coupling bolts, flexible coupling designs running hot, rubber powder inside the coupling shroud, similar pieces of equipment are vibrating less or seem to have a longer operating life, unusually high number of coupling failures or they wear quickly, the shafts are breaking (or cracking) at/or close to the inboard bearings or coupling hubs, or excessive amounts of grease (or oil) on the inside of the coupling guard.

In some examples, an imaging tool and/or a test and measurement tool or accessory can be used for aligning equipment, such as a drive side coupling and a load side coupling in a powertrain. For example, various gages (e.g., feeler gauge, dial gauge, etc.) can measure initial misalignments between a drive side coupling and a load side coupling. Similarly, one or more lasers disposed on or otherwise in communication with the test and measurement tool, such as a laser alignment tool, can be used to facilitate alignment. Thus, a user (or automated tool) noticing, for example, one or more such exemplary symptoms of excess vibration and/or misalignment can use such tools to perform alignment processes.

Figure 3A:
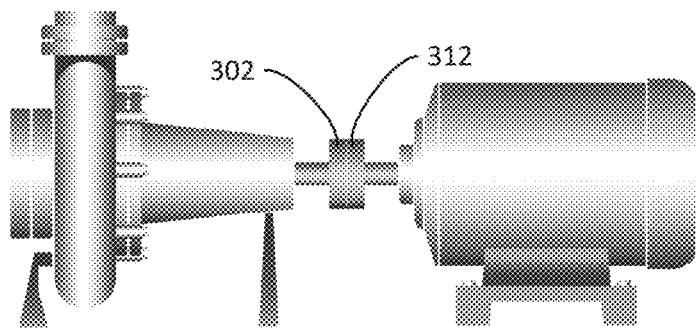
FIG. 3A is a side view of a first and second machine having couplings in alignment.
Figure 3B:
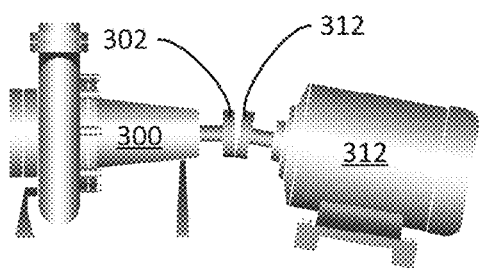
FIG. 3B is a side view of a first and second machine having couplings with an angular misalignment.
Figure 3C:
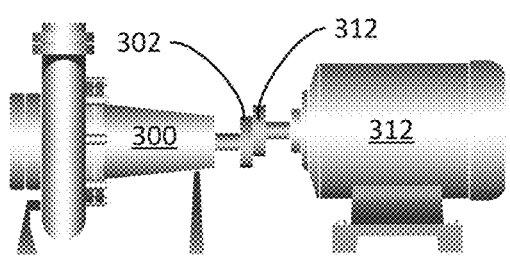
FIG. 3C is a side view of a first and second machine having couplings with an offset misalignment.

FIGS. 3A-3E show a variety of possible alignment configurations between components of operating equipment. FIGS. 3A-3C are side views of a first machine 300 interfacing with a second machine 310 via couplings 302, 312. In the configuration of FIG. 3A, the couplings 302, 312 of the first 300 and second 310 machines are in alignment. In the configuration of FIG. 3B, the second machine 310 is tilted up relative to the first machine 300, creating a vertical angular misalignment between machines 300 and 310. In the configuration of FIG. 3C, the second machine 310 is raised above the first machine 300, creating a vertical offset between machines 300 and 310.

Figure 3D:
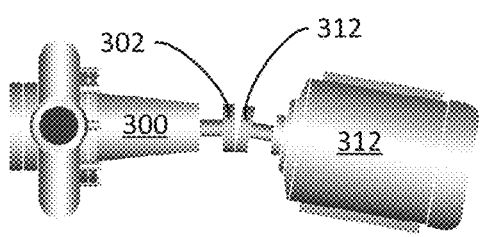
FIG. 3D is a top view of a first and second machine having couplings with an angular misalignment.
Figure 3E:
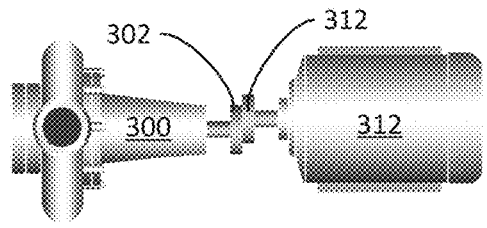
FIG. 3E is a top view of a first and second machine having couplings with an offset misalignment.

FIGS. 3D and 3E show top views of the first machine 300 interfacing with the second machine 310 via couplings 302, 312. In the configuration of FIG. 3D, the second machine 310 is tilted to the side relative to the first machine 300, creating a horizontal angular misalignment between machines 300 and 310. In the configuration of FIG. 3E, the second machine 310 is shifted to the side relative to the first machine 300, creating a horizontal offset between machines 300 and 310.

An exemplary notation for calculated offsets includes a Linear Offset, defined as the distance between the shaft rotation axes (e.g., axis 304 of the first machine 300 and the axis 314 of the second machine 310) at the center of the coupling (e.g., between coupling 302 and coupling 312). Angular Offset can be defined as the length of a coupling multiplied by the tangent of the angle between that coupling (e.g., the drive side coupling) and the other (e.g., the load side coupling). Stated differently, this value can correspond to the distance from one end of one coupling (e.g., the drive side coupling) and the line extending from the other end of the coupling parallel to the other coupling (e.g., the load side coupling).

Figure 3F:
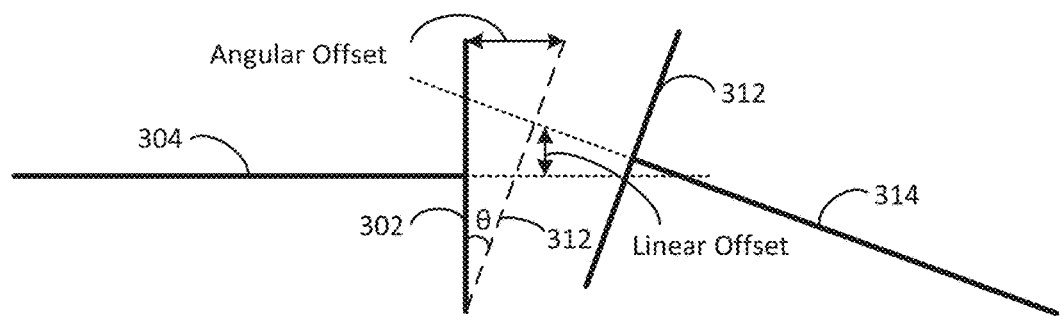
FIG. 3F illustrates conceptually a linear offset and an angular offset between two couplings.

FIG. 3F illustrates conceptually the Linear Offset and the Angular Offset between two couplings. The exemplary illustration shows an axis 304 of the first machine 300 and coupling 302 being offset from an axis 314 of the second machine 310 and coupling 312. As shown, the axes 304, 314 are extrapolated using dotted lines to extend past the center of the couplings 302, 312, and the distance between the axes 304, 314 at the center is referred to as the Linear Offset. The illustration further includes a dashed line 320 extending from an edge of the coupling 302 that is parallel to coupling 312. The angle θ between the dashed line 320 and coupling 302 represents the angular misalignment between the axes. The Angular Offset is shown as being the diameter of coupling 302 multiplied by the tangent of the angle θ. It will be appreciated that in the illustrated example, the axis 304 of the first machine 300 is shows as being horizontal. However, in some instances, neither axis 304 nor axis 314 is substantially horizontal. In such embodiments, the Angular Offset may have contributions from the angular measures of both axes 304, 314.

In some examples, one or both of the test and measurement tool and the imaging tool can include a distance-to-target detector, such as a laser distance measurement tool, configured to determine the distance between the equipment under test and the imaging tool. The imaging tool can be capable of detecting one or both of visible light (VL) and infrared (IR) radiation from a target scene and generating corresponding VL and IR image data, respectively. Such VL and IR radiation can be detected, for example, via VL and IR imaging devices as part of the imaging tool. VL and IR imaging devices can be integrated into a single unit, or can be separate units in communication with the system.

In some embodiments, the imaging tool captures IR image data representative of the thermal signature of equipment under test, such as, for example, a drive side coupling and a load side coupling of a junction between two pieces of equipment (e.g., in a powertrain). The acquired IR image data can be analyzed by a user, the imaging tool, the test and measurement tool, or another device capable of performing appropriate analysis of the IR image data to determine properties of the equipment under test. In the case of a user analysis, the IR image data can be presented to a user on a display for analysis. The display can be incorporated into the imaging tool, the test and measurement tool, or a mobile device or remote location to which the IR image data is transmitted via a wired or wireless communication.

Analysis of the IR image data can be used to provide misalignment information of the equipment under test. For example, analysis of the IR image data can be used to determine a probability that possible misalignment between a drive side and a load side of a coupling is more pronounced on one side of the coupling or another. Similarly, analysis of the IR image data can be used to narrow down or determine the origin of misalignment, such as a drive side of the coupling, the load side of the coupling, a motor bearing, a bearing within the load, and the like. In general, heat patterns observable from the IR image data can provide indications to a user or other equipment performing analysis regarding the location or origin of misalignment during operation of equipment under test.

As described elsewhere herein, in some examples, analysis of the image information can be communicated to the test and measurement tool. In various embodiments, the image data can be communicated to the test and measurement tool via a wired or wireless communication, and can be communicated automatically or in response to a manual data transmission. In some embodiments, image data or other data derived from the image data can be communicated automatically to the test and measurement tool in response to the image data satisfying one or more predetermined conditions, such as described, for example, in U.S. patent application Ser. No. 14/856,046, filed Sep. 16, 2015, and entitled "INFRARED CAMERAS USED AS A METHOD TO TRIGGER OPERATION AND/OR RECORDING OF TEST AND MEASUREMENT DEVICES," which is assigned to the assignee of the instant application, and which is hereby incorporated by reference in its entirety. Additionally or alternatively, in some examples, information from or regarding the image data can be manually entered into the test and measurement tool. Accordingly, the test and measurement tool can receive image data (e.g., IR image data) or other data related thereto and supplement measurement data with such received data.

Figure 4:
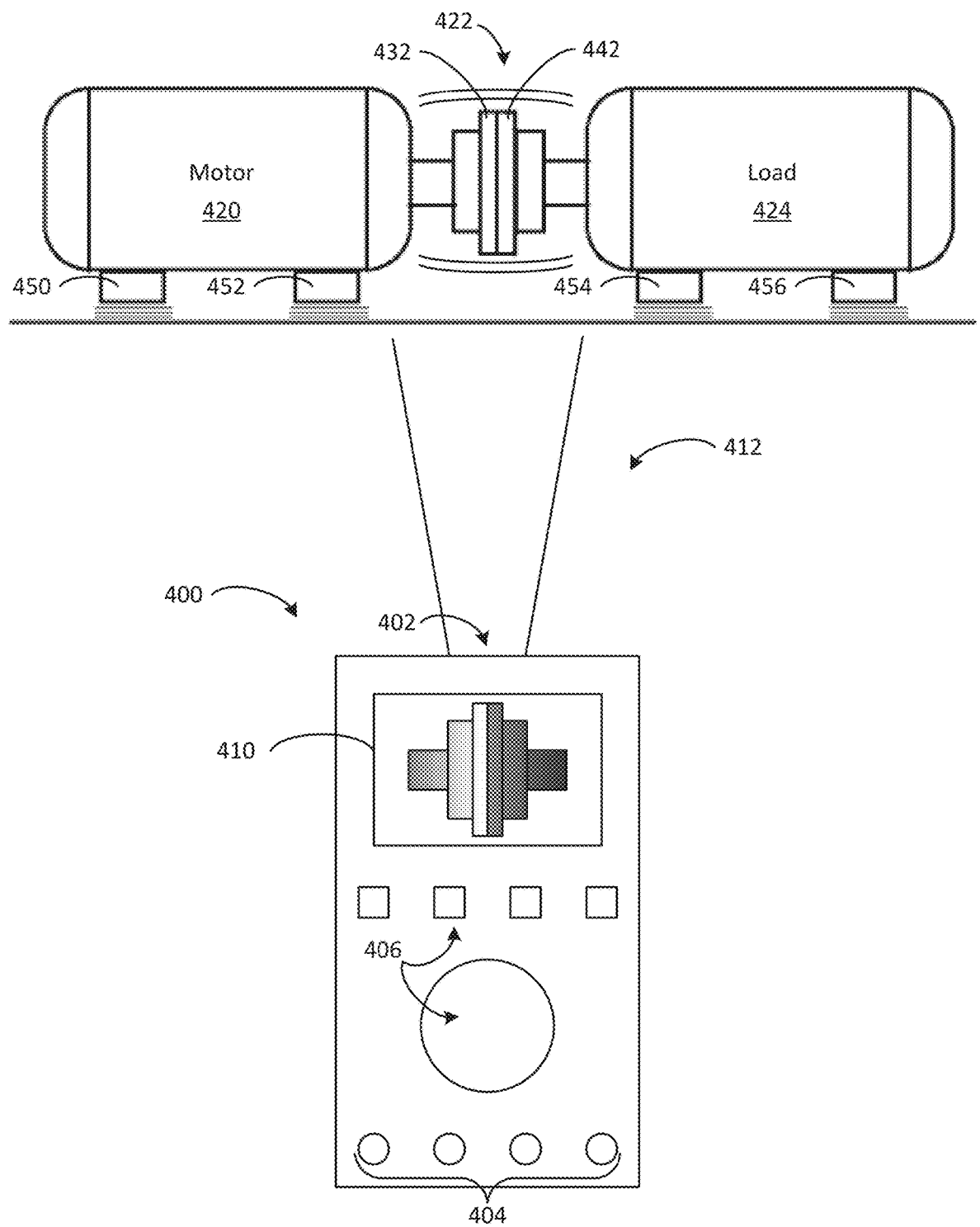
FIG. 4 is an exemplary diagram illustrating operation of an imaging tool and a test and measurement tool.

FIG. 4 is an exemplary diagram illustrating operation of an imaging tool and a test and measurement tool. In the illustrated embodiment, an alignment tool 400 includes a built-in imaging tool 402. While shown in FIG. 4 as being integrated into a single device, imaging tool 402 and the alignment tool 400 can be separate, communicating devices such as described in U.S. patent application Ser. No. 14/855,884, which has been incorporated by reference. The alignment tool 400 can include inputs 404 for receiving data via wired connection. For example, the alignment tool 400 can be in wired communication with one or more sensors disposed on or proximate equipment under test for performing an alignment measurement and/or analysis. In some embodiments, alignment tool 400 includes a wireless connection, capable of wirelessly communicating with such sensors and need not include or utilize inputs 404. In some examples, the alignment tool comprises a laser alignment tool configured to assist in alignment of components.

The alignment tool 400 can include a user interface 406 for receiving inputs from a user. The user interface 406 can include any combination of buttons, dials, or other interface components. The alignment tool 400 can further include a display 410 for presenting any combination of acquired data to a user. For instance, the display 410 can present any combination of image data acquired by the imaging tool 402 and measurement data (e.g., alignment information) acquired by the alignment tool 400. In some examples, the display 410 can present information that was generated from a combination of image data and measurement data.

In the illustrated embodiment, the alignment tool 400 is configured to analyze equipment under test, including a coupling 422 between a motor 420 and a load 424 coupled to the motor via coupling 422. Coupling 422 has a drive side 432 facing the motor 420 and a load side 442 facing the load 424. In the illustrated arrangement, the coupling 422 is within the field of view 412 of the imaging tool 402. Accordingly, the imaging tool 402 can acquire image data representative of the coupling 422 for analysis. In some embodiments, the imaging tool 402 is configured to generate IR image data representative of a target scene. In the illustrated embodiment, the display 410 includes thermal image data comprising a grayscale palletized representation of the coupling 422. As shown, the drive side 432 of the coupling 422 is a much brighter color than the load side 442, indicating a significantly higher temperature on the drive side 432 of the coupling 422 when compared to the load side 442. Such IR image data can indicate to the user or the alignment tool that alignment issues may be present on the motor 420 side of the coupling 422.

In some instances, the alignment tool 400 can perform alignment measurements to detect alignment or misalignment between the motor 420 and the load 424 via coupling 422. For instance, test and measurement tool can include a laser alignment tool such as the Fluke® 830 Laser Alignment Tool, configured to make alignment measurements and provide measurement data regarding detected alignment information, the User's Manual and Quick Reference Guide of which are hereby incorporated by reference in their entireties. Analysis of the image data can provide supplementary information regarding the probability of cause, the most appropriate or fastest alignment set-up recommendation regarding any detected misalignment, and the like. Such supplementary information can be presented to the user.

In some examples, analysis of the image data can prompt a measurement by the alignment tool 400. For instance, in the event that the image data includes IR image data, and a temperature in the IR image data exceeds a predetermined threshold, the alignment tool 400 can perform an alignment measurement. In various embodiments, the image data meeting one or more predetermined conditions can automatically trigger an alignment measurement, or such a condition can prompt a user to initiate such a measurement. For example, infrared image data that shows one side of a coupling becoming significantly hotter than the other side may be detected automatically and initiate an alignment measurement or procedure.

Similarly, if alignment information from the alignment tool 400 meets a predetermined condition, the imaging tool 402 can capture image data representative of the equipment under test, either automatically or by a prompt to a user who then initiates the capture of image data. These and other techniques by which the satisfying of one or more predetermined conditions can initiate one or more operations by one or more system components, such as those described in U.S. patent application Ser. No. 14/856,046, which is incorporated by reference, are possible.

Figure 5:
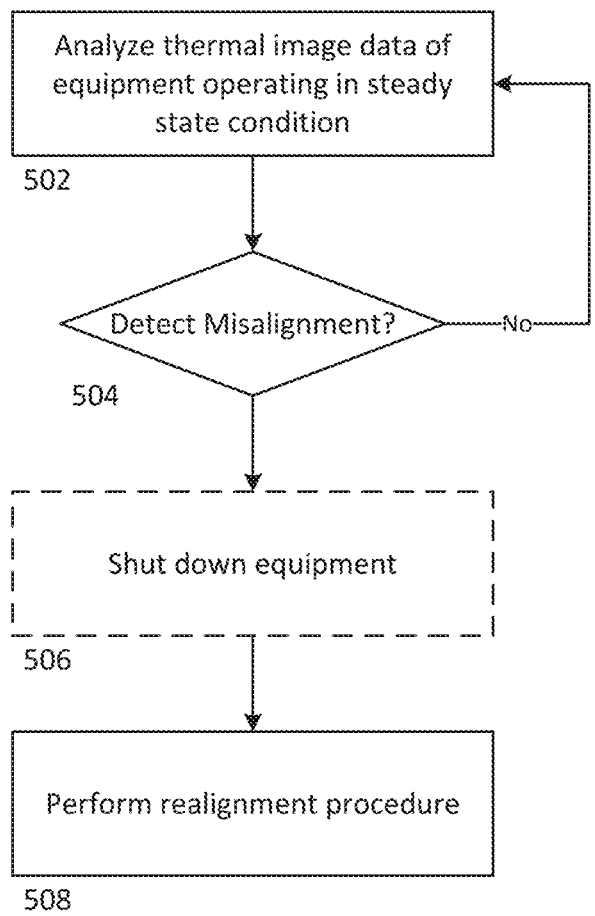
FIG. 5 shows a process flow diagram illustrating an exemplary process for detecting and addressing misalignment using infrared image data.

FIG. 5 shows a process flow diagram illustrating an exemplary process for detecting and addressing misalignment using infrared image data. In the exemplary method, the thermal image data of equipment operating in a steady state condition is analyzed (502). Misalignment is detected (504), for example, by determining if one side of a coupling is significantly hotter than the other. Such determination can be performed manually or automatically. In some automated embodiments, misalignment is detected if one side of a coupling exceeds a predetermined temperature threshold while the other side does not. For instance, with reference to FIG. 4, excessive heat on the drive side 432 of coupling 422 may be indicative of misalignment. Additionally or alternatively, the operating temperature of both sides of the coupling can be compared to a historical database of typical operating temperature to detect anomalous behavior, such as described in U.S. patent application Ser. No. 15/190,792, entitled "Thermal Anomaly Detection," which was filed Jun. 23, 2016, is assigned to the assignee of the instant application, and is incorporated by incorporated by reference in its entirety. In various embodiments, misalignment can be detected if one or both sides of the coupling exhibit anomalous behavior.

In an exemplary embodiment, infrared image data of coupling 422 is analyzed either automatically or by a user. Upon analysis of the infrared imaging data, if no misalignment is detected, the equipment continues to operate, and the thermal image data can be analyzed again at a later time. In the event that misalignment is detected, a realignment procedure can be performed (508). For example, a laser alignment tool or other appropriate tool can be used to improve the alignment between components. In some examples, prior to performing realignment (508), the equipment needs to be shut down (506).

As mentioned, in some examples, the equipment is shut down (506) prior to performing a (re)alignment procedure. For instance, in some examples, laser alignment techniques are performed when the equipment under test is in a non-operating, ambient state ("cold"). For example, an alignment process can be performed prior to equipment operation in an effort to minimize issues during operation due to any misalignment in the equipment prior to beginning operation. Additionally or alternatively, an alignment processes can be performed after misalignment is detected during operation, for example, due to components moving over time. Accordingly, alignment can be analyzed and any appropriate adjustments can be made to correct alignment errors before the equipment is used or to adjust for misalignment that manifests into the system over time.

In some configurations, as the equipment is powered on and eventually reaches a steady state operating condition ("hot"), thermal expansion of various materials in the equipment, such as in shafts, couplings, feet, etc. can further contribute to misalignment during equipment operation. However, the thermal expansion of components of the equipment can vary from component to component based on the component's material, shape, or other design parameters. Moreover, the thermal expansion can be non-uniform depending on such parameters. The subsequent combined overall non-uniformity caused by this thermal expansion often manifests itself in continued misalignment of the system regardless of the apparent accuracy of the "cold" alignment process. Thus, even a "cold" alignment process performed in response to detected misalignment during previous operation may not result in a fully aligned system during operation.

As described herein, in some configurations, an imaging tool can be used to acquire infrared (IR) image data of the equipment under test. IR image data representative of the equipment under test can be captured when the equipment is in the "cold" state and in the "hot" state. In some examples, such IR image data can be captured both before and after "cold" alignment of the equipment. Thus, in some examples, at least four IR images are captured—a "cold" image prior to "cold" alignment, a "hot" image prior to "cold" alignment, a "cold" image after "cold" alignment, and a "hot" image after "cold" alignment. Combinations and comparisons of such IR image data can be analyzed to observe thermal effects on alignment in both "hot" and "cold" states, and how such thermal effects can affect the "cold" alignment.

In some embodiments, such image data can be used alone or in conjunction with before and after "cold" alignment data to determine a thermal offset for use during subsequent "cold" alignment processes. For instance, in some embodiments, a thermal offset can include an amount and direction to adjust an alignment calibration in order to achieve the best-case alignment of equipment in both the "cold" and "hot" operating conditions. In some examples, points in the various sets of IR image data are registered so that deviations due to misalignment can be observed or detected automatically. Such analysis can be performed manually or automatically using any combination of the imaging tool, the test and measurement tool, or another device (e.g., mobile device). Analysis of each of the four sets of IR image data (and, in some embodiments, alignment data) can lead to a faster and more accurate thermal offset value when compared to a simplified hot/cold comparison.

The thermal offset can be saved in a memory in one or more of the imaging tool, the test and measurement tool, or another object or device in communication with the system for future use. In subsequent "cold" alignment procedures, the thermal offset can be incorporated such that the misalignment is minimized for "cold" and "hot" conditions. In various embodiments, the thermal offset can be such that a greater degree of alignment is favored in the "hot" state or the "cold" state, or can attempt to achieve a similar amount of alignment in both the "hot" and "cold" states. In some examples, such a favored state in the thermal offset can be automatically programmed into the imaging tool or test and measurement tool, or can be manually selected or adjusted by a user.

The determined thermal offset can be incorporated into the test and measurement tool (e.g., laser alignment tool) in order to assist in an alignment procedure. For instance, the thermal offset can be presented to the user to alert the user to adjust the alignment measurement accordingly. In other examples, the thermal offset can be programmed directly into the test and measurement tool so that a user performs an alignment process as usual, and the thermal offset is automatically taken into account in the test and measurement tool operation. Such incorporation of the determined thermal offset can improve overall alignment of the equipment under test, particularly during operation when thermal effects can cause misalignment of previously "cold" aligned systems.

In some examples, IR image data of the equipment under test in a variety of states ("hot" or "cold," aligned or unaligned) can be stored in memory and analyzed over time. Such analysis can indicate changing thermal offset values for specific pieces of equipment under test, and can be used to determine an evolving thermal offset value with time to continue to provide improved alignment procedures. Additionally or alternatively, thermal offset values for a first piece of equipment under test can be compared with detected thermal offset values for similar equipment (e.g., similar materials, operation, load, etc.) for comparison, or can be used as a starting point for determining a thermal offset value of a second piece of equipment.

Figure 6:
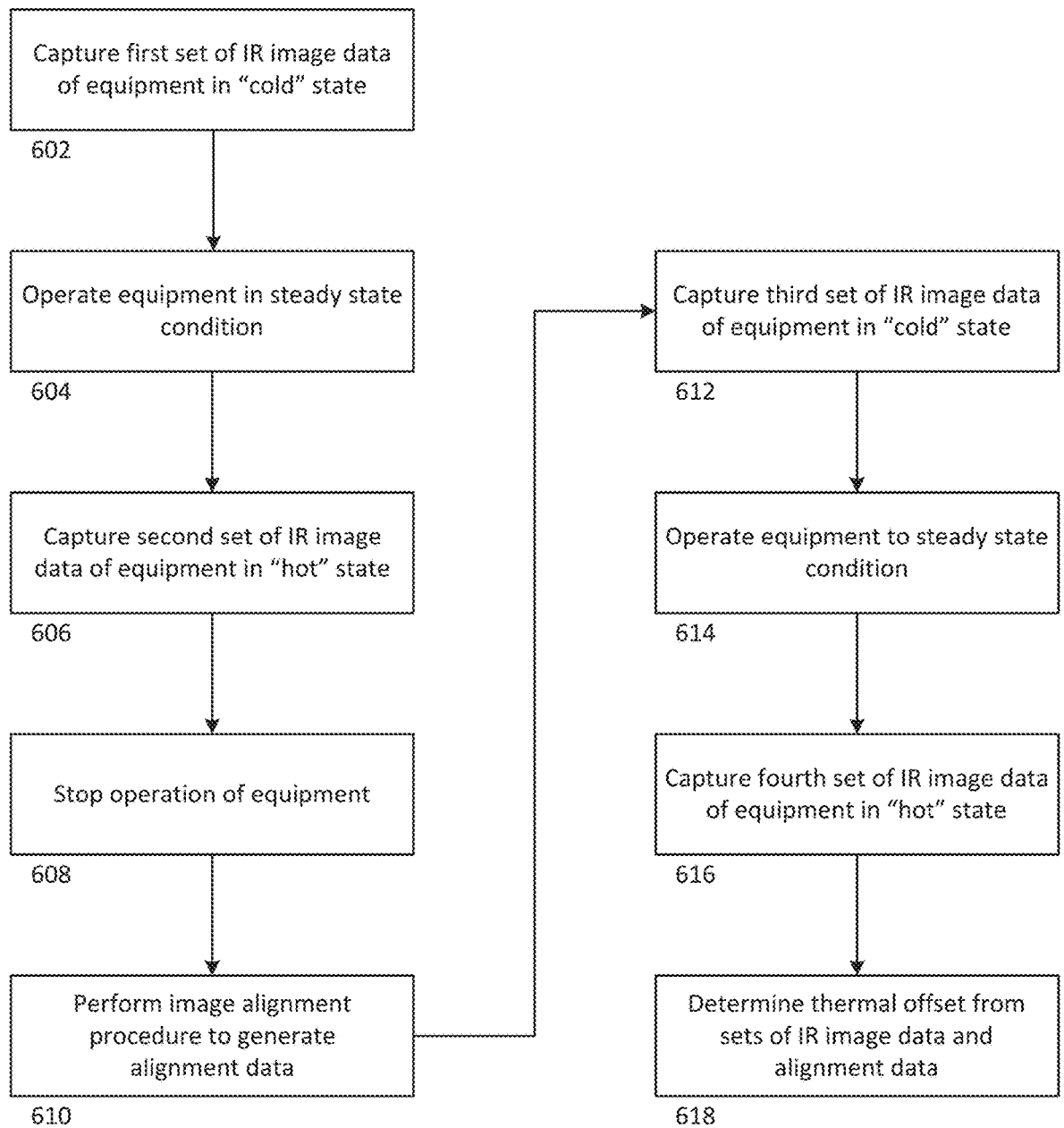
FIG. 6 is a process flow diagram illustrating an exemplary method for determining a thermal offset.

FIG. 6 is a process flow diagram illustrating an exemplary method for determining a thermal offset. The method of FIG. 6 can be performed by a single tool or a system including an alignment tool and an imaging tool. The steps of the method can be performed or initiated by a user, a component of the system or device otherwise in communication with the system (e.g., a controller), or a combination thereof. The system can capture a first set of IR image data of the equipment under test in a "cold" state (602). That is, an IR image of the equipment under test can be captured prior to operation of the image. Next, the equipment can be operated in a steady state condition (604). The steady state condition allows for the temperature of various components and materials of the equipment to achieve and maintain a steady state temperature, which can be higher than the temperature of the equipment in the "cold" state. The system can then capture a second set of IR image data of the equipment in the "hot" state (606).

After the second set of IR image data is captured (step 606), the operation of the equipment under test can be stopped (608), and the system can perform an image alignment procedure on the equipment under test (610). Performing the image alignment procedure (610) can generate alignment data from the alignment tool. After alignment, the system can capture a third set of IR image data (612), and operate the equipment in a steady state condition after the alignment procedure (614). The system can capture a fourth set of IR image information representative of the equipment in the "hot" state (616).

It will be appreciated that such images may be captured in a variety of orders. For example, as described elsewhere herein, a "hot" image prior to "cold" alignment may indicate misalignment, such as described with respect to FIG. 4. Thus, the same IR image used to determine that misalignment is present can be captured as the "hot" image prior to "cold" alignment. The "cold" image prior to "cold" alignment could be captured prior to the initial machine startup, or could be captured after the machine is shut down after observing possible misalignment. Thus, the "cold" image prior to "cold" alignment could be captured before or after the "hot" image prior to misalignment. Once "cold" alignment is performed, a "cold" image after "cold" alignment can be captured, the machine can be started, and after it has reached operating conditions, a "hot" image after "cold" alignment can be captured.

The system can analyze (e.g., via a controller or via inputs by a user) any combinations of the first, second, third, and fourth sets of IR image data and determine a thermal offset (618). For example, the system can perform a registration step to align the sets of IR image data for comparison, combination, or any other image-to-image analysis process. During image analysis, various changes in the target scene, such as the sizes, locations, or other lines associated with components of the equipment under test, can be observed. For instance, in some embodiments, edges of components can be detected automatically such as described in U.S. patent application Ser. No. 14/222,153, filed Mar. 21, 2014, and entitled "VISIBLE LIGHT IMAGE WITH EDGE MARKING FOR ENHANCING IR IMAGERY," and U.S. patent application Ser. No. 14/837,757, filed Aug. 27, 2015 and entitled "EDGE ENHANCEMENT FOR THERMAL-VISIBLE COMBINED IMAGES AND CAMERAS," each of which is assigned to the assignee of the instant application, and is hereby incorporated by reference in its entirety. By performing such analysis, in combination with the thermal information associated with the IR image information, the system can analyze various shifts, expansions, and temperature changes of equipment components in the field of view of the imaging tool when the equipment is operating or not operating, and when it has bene aligned and when it has not.

The analysis of such properties allows for the determination of a thermal offset for the equipment under test. The thermal offset can take into account the amount of heating, shifting, and expansion observed in the sets of image data when comparing various "hot" and "cold" states both before and after a "cold" alignment. In some examples, aspects of the "cold" alignment procedure can be incorporated into the determination of the thermal offset. The thermal offset can be used to improve the alignment of the equipment in a variety of ways. In one example, the thermal offset can be incorporated into the traditional alignment process performed by the alignment tool. In such an embodiment, a user performs an alignment process as usual, and the alignment tool accounts for the thermal offset. In some examples, the user can toggle on and off the incorporation of the thermal offset into alignment determination. The system can include a display or other indication alerting the user of the incorporation (or a lack of incorporation) of the thermal offset. In some other embodiments, the thermal offset is presented to the user while the alignment process is being performed, encouraging the user to adjust the alignment process to incorporate the determined thermal offset.

As discussed elsewhere herein, the test and measurement tool (e.g., an alignment tool) and the imaging tool can operate as part of a single unit, or can be separate tool in communication with one another. In some exemplary embodiments, the imaging tool can acquire the various sets of IR image data and determine the thermal offset prior to communicating the thermal offset to the test and measurement tool for use in subsequent alignment processes. Alternatively, the imaging tool can communicate the sets of IR image data to the test and measurement tool, which can analyze the IR image data and determine and incorporate the thermal offset. In still further embodiments, image data can be communicated to a third device (e.g., a mobile device or other remote or external location) for analysis. The third device can analyze the IR image data and determine the thermal offset, which can then be communicated to the test and measurement tool. In any of such embodiments, the test and measurement tool can communicate initial "cold" alignment data to whichever device is determining the thermal offset, and the alignment data can be used in conjunction with the acquired sets of IR image data to determine the thermal offset.

In some systems, the dominant or significant contribution to thermally-induced offsets is from thermal growth of supports that physically support operating equipment off of the ground. For example, with reference to FIG. 4, motor 420 is supported by back feet 450 and front feet 452, while the load 424 is supported by front feet 454 and back feet 456. Any growth of these supports, especially unequal growth due to, for instance, unequal temperatures of the supports, can lead to misalignment. Such misalignment, for example, in precision rotation equipment, can lead to large operating deficiencies if not corrected for.

Figure 7A:
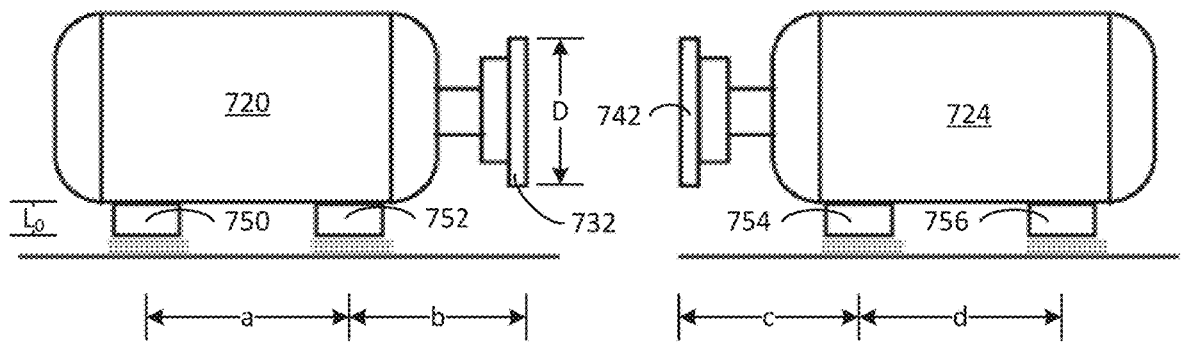
FIG. 7A is a diagram illustrating various dimensions of a system including a motor and a load, each including a coupling.

FIG. 7A is a diagram illustrating various dimensions of a system including a motor and a load, each including a coupling. In the illustrated embodiment, motor 720 includes back feet 750 and front feet 752, separated by a distance a. The motor 720 includes a drive side coupling 732 that is separated from the front feet 752 by a distance b. Similarly, the load includes front feet 754 separated from back feet 756 by a distance d, and a load side coupling 742 that is separated from the front feet 754 by a distance c. In the illustrated example, the drive side coupling 732 and load side coupling 742 have a diameter D at the coupling interfacing surface. While shown as separated in FIG. 7A, during operation, the motor 720 and load 724 can be coupled via couplings (732 and 742) so that the distance between the front feet 752 of the motor 720 and the front feet 754 of the load 724 is b+c. According to the illustrated embodiment, feet 750-756 each have an initial starting length of $L_0$, though it will be appreciated that in various configurations, feet supporting components of a system can having differing initial lengths.

Figure 7B:
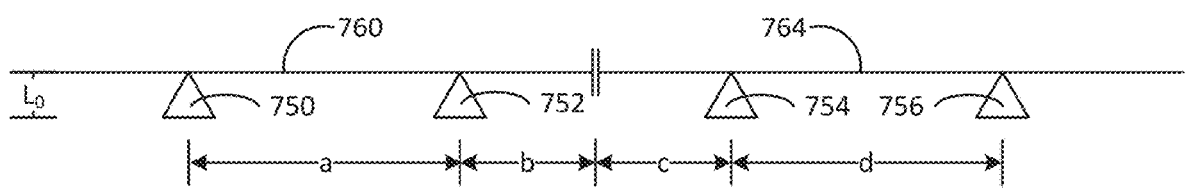
FIG. 7B is a schematic representation of the room temperature alignment axes of a motor coupled to a load such as shown in FIG. 7A.

FIG. 7B is a schematic representation of the room temperature alignment axes of a motor coupled to a load such as shown in FIG. 7A. In the illustrated embodiment, axis 760 of the motor is supported by feet 750 and 752, and is aligned with the axis 764 of the load, supported by feet 754 and 756. It will be appreciated that, in the illustrated embodiment, feet 705, 752, 754, and 756 need not directly contact the axes 760, 764 as shown. Rather, FIG. 7B shows that the motor and load feet are sized so that axes 760 and 764 are substantially aligned when the feet are at room temperature. For example, FIG. 7B can represent the alignment of room temperature motor and load axes after a "cold" alignment as described elsewhere herein.

Figure 7C:
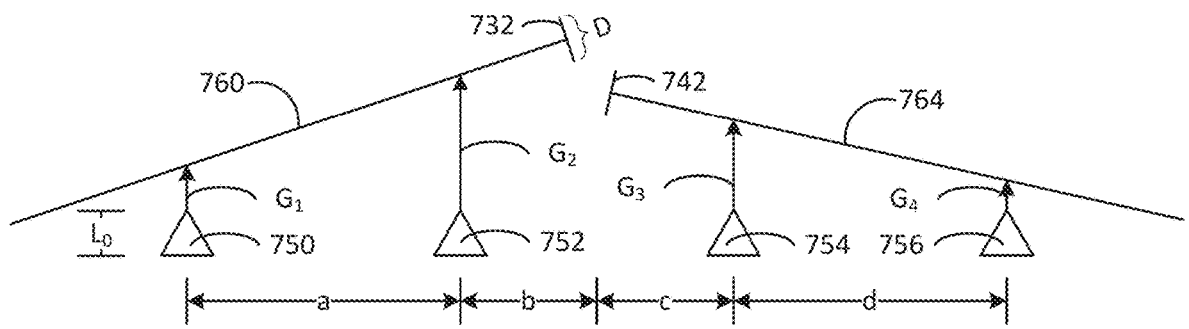
FIG. 7C shows a schematic representation of a change in motor and load axis alignment due to thermal expansion during operation.

FIG. 7C shows a schematic representation of a change in motor and load axis alignment due to thermal expansion during operation. As shown, feet 750 have expanded by a length of $G_1$, feet 752 have expanded by a length of $G_2$, feet 754 have expanded by a length of $G_3$, and feet 756 have expanded by a length of $G_4$. Thus, since each set of feet 750-756 had an initial length of $L_0$, the final lengths of feet 750, 752, 754, and 756 are $L_0+G_1$, $L_0+G_2$, $L_0+G_3$, and $L_0+G_4$, respectively. Such growth is typically a function of the initial "cold" length of the feet, the material of the feet, and the "hot" operating temperature of the feet. Thus, since it is not guaranteed that each set of feet is the same length, materials, or reaches the same operating temperature, there is no necessary relationship between each amount of growth $G_1$-$G_4$. These changes in growth lengths can lead to misalignments between the motor axis 760 and the load axis 764 (e.g., as shown in FIGS. 3A-3F). As described elsewhere herein, misalignments can include both linear and angular offsets.

Figure 8:
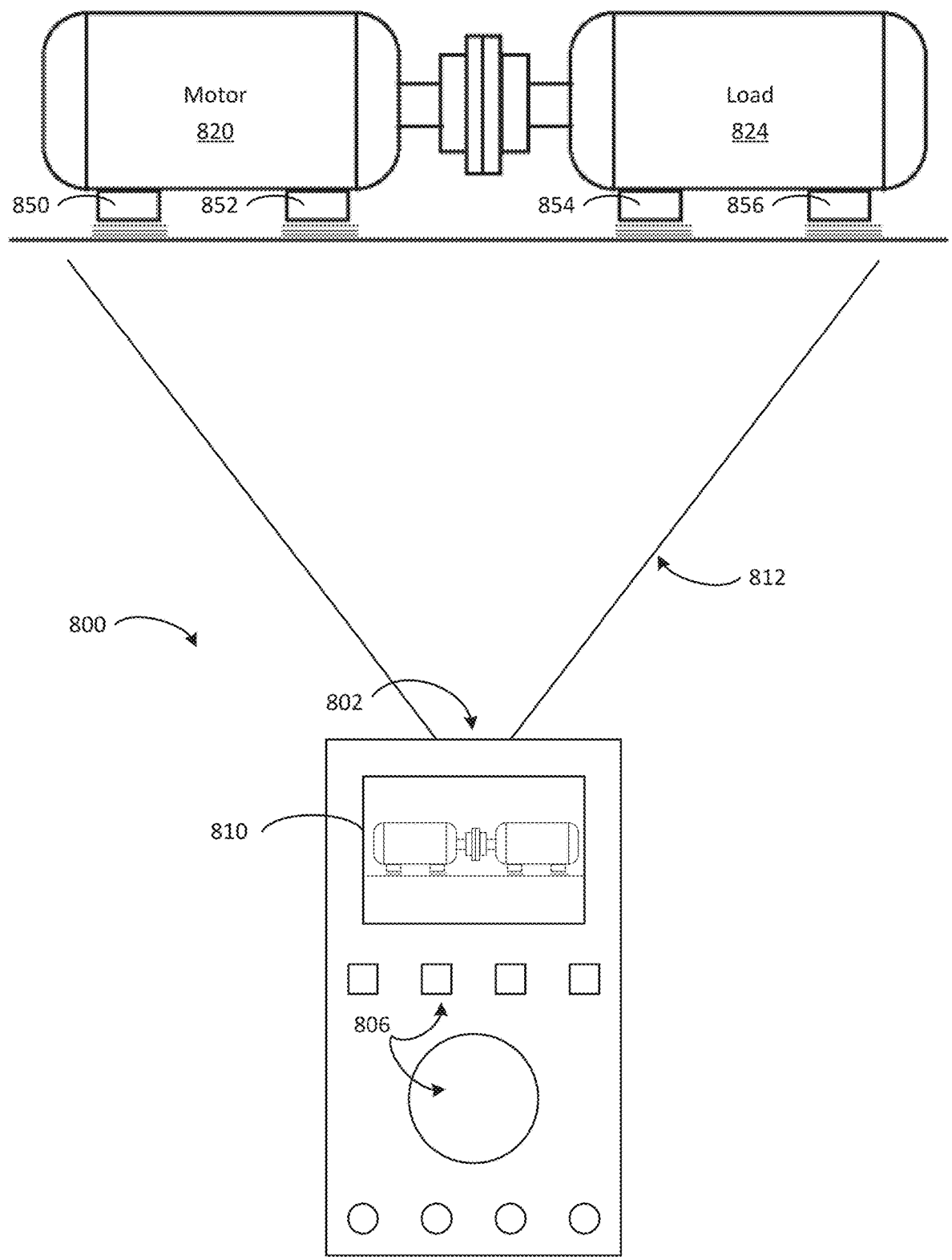
FIG. 8 is an exemplary diagram illustrating an arrangement of a thermal imaging camera analyzing a system comprising a motor and a load.

In some examples, a thermal imaging camera can be used to analyze a system and calculate misalignment due to thermal expansion of the feet of equipment (e.g., motor and a load). FIG. 8 is an exemplary diagram illustrating an arrangement of a thermal imaging camera analyzing a system comprising a motor and a load. In the illustrated example, a motor 820 is supported by feet 850 and 852 and is coupled to a load 824 via coupling 822. The load 824 is supported by feet 854 and 856. As described elsewhere herein, thermal expansion of feet 850-156 can lead to misalignment of the motor 820 and load 824 at coupling 822.

An imaging tool 802 has a field of view 812 including the motor 820 and load 824, and includes a display 810 showing image data (e.g., infrared image data) of the motor 820 and load 824. As described elsewhere herein, the imaging tool 802 can be integrated into combination tool with a test and measurement tool, such as a laser alignment tool, a vibration analysis tool, or the like. The combination tool 800 can be used to perform a variety of functions, such as an imaging function, a measurement function, or the like, for example, via interface components 806.

The imaging tool can include a thermal imaging camera, which can be used to determine the temperatures of feet 850, 852, 854, and 856. For example, a user may identify the locations of feet in a thermal image on the display 810 to determine the temperature thereof. In various embodiments, the user can identify a spot on the feet at which the temperature is measured. In other examples, the user can select an area corresponding to the area (or a subset of the area) of the feet and calculate an average temperature from a plurality of locations on each of the feet.

The measured temperate of the feet can be used in conjunction with other properties of the feet to calculate a predicted thermal growth of each of the feet. For instance, the linear growth of a set of feet can be a function of the initial length of the feet, the temperature of the feet, and a material-dependent coefficient of expansion of the feet. With further reference to FIG. 7C, growth $G_1$ of feet 750, for example, can be calculated according to equation 1 below:

$$\text{Thermal Growth } (G) = (T - T_0) \times L \times C \quad (1)$$

wherein:

T is the temperature of the feet (e.g., in ° F.), $T_0$ is the initial "cold" temperature of the feet (e.g., in ° F.), L is the initial height of the feet (e.g., the height of the motor axis) (e.g., in inches), and C is the coefficient of expansion (e.g., in mils/inch/° F.).

It will be appreciated that units mentioned in the above example (e.g., mils, inches, ° F.) are exemplary, and that other units can be used that result in a length dimension for the thermal growth.

Accordingly, combining temperature information regarding the feet of equipment with other material and dimensional properties of the feet can allow a user to calculate the thermal growth of the feet during operation. In some embodiments, a thermal imaging camera capable of measuring the temperature of each set of feet 750-756 is further capable of determining the thermal growth of each set of feet. For instance, in some embodiments, a user is invited to enter other parameters, such as the initial lengths and/or temperatures of feet, material from which the feet are made, thermal expansion coefficients for feet, and the like, and the imaging tool can use equation (1) to calculate the thermal expansion.

Knowing the growth of each set of feet 750-756 can allow a user to calculate the offset(s) introduced between the motor 720 and the load 724 due to thermal expansion of the feet. For example with further reference to FIG. 7C, geometric analysis of the generic misalignment yields equations 2 and 3 presented below for calculating a Vertical Offset (e.g., a Linear Offset in the vertical direction due to vertical expansion of feet) and a Vertical Angularity (e.g., an Angular Offset in the vertical direction due to vertical expansion of feet).

$$\text{Vertical Offset} = (G_2 - G_3) - \frac{b(G_1 - G_2)}{a} + \frac{c(G_4 - G_3)}{d} \quad (2)$$

$$\text{Vertical Angularity} = D\left[\frac{(G_1 - G_2)}{a} + \frac{(G_4 - G_3)}{d}\right] \quad (3)$$

wherein:

$G_1$ is the thermal growth of feet 750 (e.g., as calculated via equation 1), $G_2$ is the thermal growth of feet 752 (e.g., as calculated via equation 1), $G_3$ is the thermal growth of feet 754 (e.g., as calculated via equation 1), $G_4$ is the thermal growth of feet 756 (e.g., as calculated via equation 1), a is the distance between feet 750 and feet 752, b is the distance between feet 752 and drive side coupling 732, c is the distance between load side coupling 742 and feet 754, d is the distance between feet 754 and feet 756, and D is the diameter of the drive side 732 and load side 742 coupling.

It will be appreciated that different equations from equations 2 and 3 can be used to determine linear and/or angular offsets resulting from thermal expansion depending on the geometry of the system. For example, alternative equations can be used for equipment having different numbers of sets of supporting feet, such as a single foot (or set of feet) or three or more sets of feet. In general, the process of determined thermal growth of each foot (or set of feet) can be used to geometrically determine the offsets resulting from the thermal growth using equations 2 and 3 or other equations or processes.

Offset and angularity measurements (e.g., Angular Offsets such as Vertical Angularity and/or Linear Offsets such as Vertical Offset) can be input into an alignment tool to calibrate an alignment setup for compensating for thermal expansion. For example, a laser alignment tool can receive calculated Vertical Offset and Vertical Angularity values. The laser alignment tool can instruct a user to align components using such values so that the components are aligned once the observed thermal expansion occurs. As described elsewhere herein, in some examples, such a laser alignment tool can operate by instructing the user to include calibration offsets. That is, the laser alignment tool can instruct the user in such a way that the user is aware that calibration offsets are incorporated in the alignment. Alternatively, the laser alignment tool can incorporate calibration offsets internally so that the user aligns the components as usual, and the compensation offsets are incorporated automatically.

Figure 9:
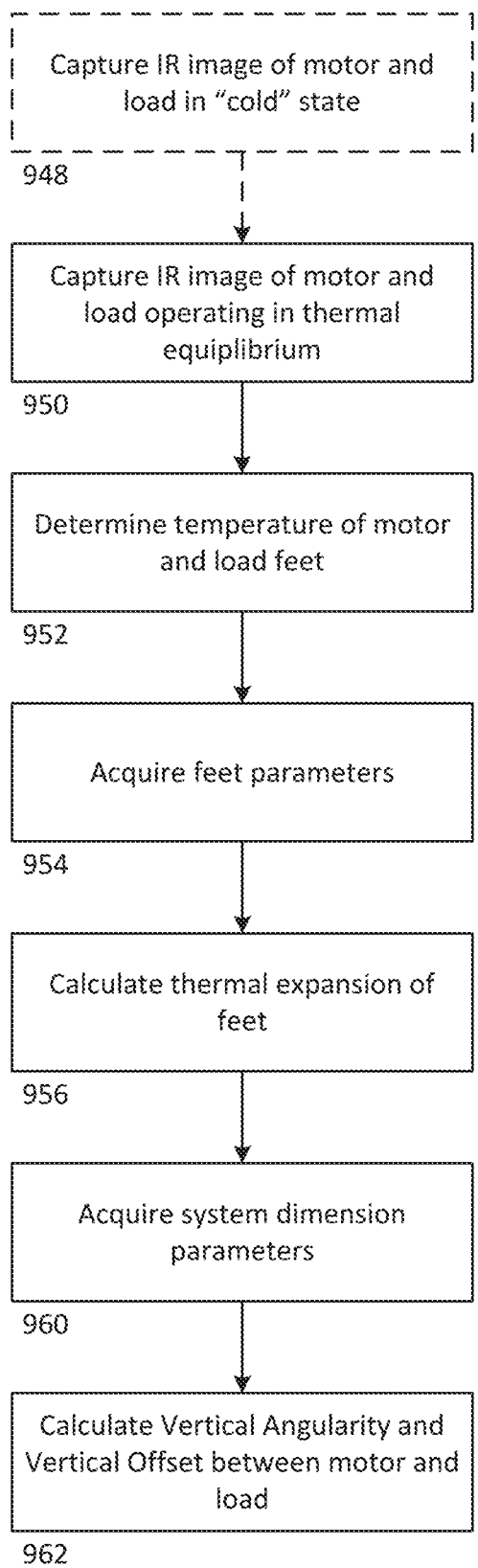
FIG. 9 is a process flow diagram illustrating an exemplary process for calculating Vertical offset and Vertical Angularity between a motor and a load.

As described, temperature measurements of feet susceptible to thermal expansion can be used to calculate the amount of thermal expansion experienced by the feet, which can be used to calculate Vertical Offset and Vertical Angularity caused by the thermal expansion. FIG. 9 is a process flow diagram illustrating an exemplary process for calculating Vertical offset and Vertical Angularity between a motor and a load. The method of FIG. 9 includes capturing an IR image of a motor and load operating in a thermal equilibrium condition (950). That is, portions of the motor and load have reached an equilibrium operating temperature so that the temperatures of components are unlikely to further change. In some examples, the capturing of the IR image (950) is done in conjunction with or in response to the analysis of thermal image data of equipment operating in a steady state condition (step 502) during the process described with respect to FIG. 5. In some examples, the captured IR image can be stored in a memory, such as a memory in an imaging tool, a test and measurement tool, an external device, the cloud, etc. Next, the method includes the step of determining the temperature of the motor and load feet (952), for example, from the captured IR image, and acquiring foot parameters (954), such as the initial temperature and length, as well as thermal growth coefficients of the feet.

The method can further include the step of calculating the thermal expansion of the feet (956), for example, using the determined temperature and acquired parameters of the load feet and the motor feet. The method further includes acquiring system dimension parameters (960), such a horizontal spacing between sets of feet in the motor, between sets of feet in the load, and/or between feet of the motor and/or load and a coupling therebetween. Finally, the method includes the step of calculating the Vertical Angularity and the Vertical offset between the motor and the load (962). Such calculations can be performed according, for example, utilizing the calculated thermal expansion of the feet (e.g., from step 956) and the acquired system parameters (e.g., from step 960) in conjunction with equations 2 and 3 presented above. In some examples, the calculated thermal expansion can be stored in memory associated with the captured IR image. The calculated thermal expansion can be correlated to the IR image data for additional analysis as is discussed elsewhere herein. Additionally or alternatively, in some examples, corresponding VL image data can be captured and stored associated with the IR image data (e.g., as captured in steps 948 and/or 950).

In various embodiments, various steps of the method can be permuted and/or omitted. For example, in some implementations, capturing an IR image (950) may be omitted, and determining the temperature of the motor and load feet (952) can be performed using, for example, contact temperature sensors of the like. In some examples, system dimension and/or feet parameters can be acquired (960) prior to determining the operating temperature of the motor and load feet (952), for example, before the equipment is even started. For instance, in some embodiments, a method can include the step of capturing an IR image of the motor and the load in a "cold" state (948).

Additionally, various steps in the method of FIG. 9 can be performed by any of a variety of components. For instance, in an exemplary embodiment, the method of FIG. 9 is performed entirely via an imaging tool comprising an infrared camera module. With further reference to FIGS. 8 and 9, in such an implementation, the imaging tool 802 can be used to capture IR image data of the motor 820 and the load 824 (950). The captured IR image data can be used to determine the temperature of the feet 850, 852 of the motor 820 and the feet 854, 856 of the load 824 (952). As described elsewhere herein, in some embodiments, a user can select a portion of the IR image via a display 810 that corresponds to the locations of feet 850-856 for determining the temperature thereof. In other examples, the IR image can include a known scene, for example, in the case of a fixed imaging tool, such as described, for example, in U.S. patent application Ser. No. 14/855,844, filed Sep. 16, 2015, and entitled "METHOD OF ATTACHING CAMERA OR IMAGING SENSOR TO TEST AND MEASUREMENT TOOLS," or U.S. patent application Ser. No. 15/190,792, each of which is assigned to the assignee of the instant application and is incorporated by reference in its entirety, or by using a rephotography process such as disclosed in U.S. patent application Ser. No. 13/331,644, filed Dec. 20, 2011, and entitled "THERMAL IMAGING CAMERA FOR INFRARED REPHOTOGRAPHY," which is also assigned to the assignee of the instant application and is incorporated by reference in its entirety. In such examples, the imaging tool can be programmed with predetermined locations of feet 850-856 (e.g., known pixel coordinates).

The imaging tool can be configured to acquire parameters of the feet (954), for example, from a user via interface 806 manually entering parameters or selecting parameters from a predefined template (e.g., associated with the particular motor 820/load 824 system) stored in memory. In some examples, parameters such as the initial temperatures ($T_0$) of the feet can be determined from a variety of sources, such as thermal image data of a "cold" system, contact temperature measurements of the feet when the system is no operating, room temperature measurements, or the like. Such data can be acquired from, for example, an imaging tool and/or a test and measurement tool and/or stored in and later recalled from memory of an imaging tool, test and measurement tool, external device, remote server (e.g., the cloud), or the like. The imaging tool can utilize the foot parameters and temperature for calculating the thermal expansion of the feet 850-856 (956).

The imaging tool can be similarly configured to acquire system dimension parameters (960), for example, from a user via interface 806 manually entering parameters or selecting parameters from a predefined template (e.g., associated with the particular motor 820/load 824 system) stored in memory. Based on the acquired system dimension parameters and calculated thermal expansion of feet 850-856, the imaging tool can calculate the Vertical Angularity and Vertical Offset between the motor 820 and the load 824. In some embodiments, system dimensions can be calculated using an imaging tool and/or a test and measurement tool. For example, distance-to-target data can be used to determine the relationship between pixel size and physical scene dimensions. In an exemplary process, a distance-to-target sensor (e.g., as part of an imaging tool or associated test and measurement tool) can be used to establish the distance between the imaging tool and feet 850-856. If the locations of the feet are identified (e.g., by way of a template, user input, etc.), the imaging tool (or images acquired by the imaging tool) can be used to measure distances between the feet (e.g., dimensions a and d). A similar method can be used to determine distances between the front feet and the respective couplings (e.g., dimensions b and c).

In some exemplary systems, acquiring foot parameters (954) and/or system dimension parameters (960) can be performed by a user manually entering parameters (e.g., foot dimensions, thermal expansion coefficients, and/or motor/load dimensions) into the imaging tool 802. In some examples, the imaging tool 802 can be preprogrammed for performing certain calculations in certain settings (e.g., alignment analysis of a given motor/load system), and may already have such parameters stored in memory. In still further examples, such parameters can be stored in a template that can be installed on the imaging tool for performing analysis of a particular motor/load combination. Such a template can be selected, for example, from a plurality of templates stored on a server (e.g., in the cloud or a local computer or network) for use when appropriate. The template can be downloaded to the imaging tool via a wired or wireless connection either in response to a user command or automatically. For examples, in some examples, the template can be downloaded and/or implemented automatically based on a proximity detection relative to the particular motor 820/load 824 system, for example, via proximity detection such as described in U.S. patent application Ser. No. 14/921,128, which is incorporated by reference.

In some embodiments, the imaging tool can be integrated into or otherwise in communication with a test and measurement tool and/or one or more external devices, such as, for example, a laser alignment tool. In some such embodiments, the imaging tool can communicate any variety of data to the test and measurement tool. For example, in some embodiments, the imaging tool can communicate the calculated offsets (e.g., Vertical Angularity, Vertical Offset) to a laser alignment tool for use in subsequent alignment processes. Alternatively, in some examples, the imaging tool can be used to determine the temperature of feet (e.g., 850-856 in FIG. 8) and can communicate such temperature data to a test and measurement tool (e.g., a laser alignment tool) for further analysis. For instance, a laser alignment tool can use the received temperature information to calculate the thermal expansion and offset values for use in subsequent alignment processes. In still further examples, the imaging tool can calculate the thermal growth of the feet (e.g., 850-856 in FIG. 8) based on thermal image data and communicate the thermal growth values to a test and measurement (e.g., laser alignment) tool for further processing (e.g., calculating offset values).

Additionally or alternatively, the imaging tool can be in communication with an external device such as an external computer, smartphone, tablet, or the like via wired or wireless communication. As described, for example, in U.S.

patent application Ser. No. 14/855,884, which is incorporated by reference, such an external device can include capabilities such as processing, analysis, display, and the like. In some embodiments, the external device can be configured to receive data from the imaging tool to facilitate misalignment correction. For example, such an external device can receive any combination of thermal image data, determined foot temperature, calculated thermal expansion of feet, and calculated offset values. In some embodiments, the external device can be used to calculate any unknown values. For instance, the external device may receive foot temperature measurements and calculate thermal expansion of the feet based on received and/or known parameters of the feet, such as the length, material, and/or thermal expansion coefficient. In other examples, the external device can be used to determine the foot temperature from received thermal image data. Such data can be received by the external device a variety of ways such as those described elsewhere herein, including via a template corresponding to a particular motor/load system downloaded from a database. The external device can be configured to communicate received and/or calculated misalignment data (e.g., Vertical Angularity and/or Vertical Offset values) to an alignment tool for performing subsequent alignment processes.

In general, steps associated with calculating offsets arising from thermal growth of feet supporting operating equipment can be performed in a variety ways by a variety of devices, such as an imaging tool, a test and measurement tool, or an external device. Such calculated offset data can be used, for example, by a laser alignment tool to calibrate alignment of equipment so that the alignment of the equipment is optimized during steady state operation and thermal equilibrium.

As described elsewhere herein, imaging tools can be capable of detecting one or both of visible light (VL) and infrared (IR) radiation from a target scene and generating corresponding VL and IR image data, respectively. Such VL and IR radiation can be detected, for example, via VL and IR imaging devices (e.g., VL camera module 206 and IR camera module 200 in FIG. 2) as part of the imaging tool. VL and IR imaging devices can be integrated into a single unit, or can be separate units in communication with the system.

In some embodiments, the imaging tool captures IR image data representative of the thermal signature of the equipment under test. The acquired IR image data can be analyzed by a user, the imaging tool, the test and measurement tool, or another device capable of performing appropriate analysis of the IR image data. In the case of a user analysis, the IR image data can be presented to a user on a display for analysis. The display can be incorporated into the imaging tool, the test and measurement tool, or a mobile device or remote location to which the IR image data is transmitted via a wired or wireless communication In some systems, test and measurement tools are configured to perform vibrational analysis, for example, via one or more accelerometers or other vibration analysis accessories disposed on the equipment under test and in communication with the test and measurement tool. One or both of the test and measurement tool and the imaging tool can include a distance-to-target detector, such as a laser distance measurement tool, configured to determine the distance between the equipment under test and the imaging tool.

As described elsewhere herein, system components (e.g., imaging tools, test and measurement tools, and the like) can be standalone components, or any combination of components can be integrated into a single unit. For example, in some embodiments, each of a test and measurement tool, and an imaging tool, the imaging tool including a VL imaging device, an IR imaging device, and a distance-to-target detector can be integrated into a single unit. Such a unit can include a user interface for allowing a user to interact with the system, such as entering commands, acquiring data, visualizing data, and/or recalling previously-stored data from an internal or external memory or other data storage location (e.g., remote location or cloud accessible by the one or more of the imaging tool and the test and measurement tool). The unit can include a display for presenting data to a user, such as any combination of measurement data, image data, operating parameters, and the like.

In various embodiments, one or both of the imaging tool and the test and measurement tool can be used to determine information regarding vibration and/or misalignment of the equipment under test. As described elsewhere herein, misalignment of interfacing components can be detected, for example, based on evidence from IR image data. Additionally or alternatively, in some examples, the test and measurement tool can include or otherwise be in communication with accelerometers positioned on the equipment under test to measure the acceleration of the equipment. Measurements showing excessive acceleration can be a result of excessive vibrations of the equipment under test, which in some instances can lead to equipment damage and/or inefficient operation. Such vibration can be caused by misalignments such as those described elsewhere herein, for example, with respect to FIG. 3. Thus, systems described herein as performing vibration analysis include systems capable of performing misalignment analysis, and similarly, systems described herein as performing misalignment analysis include systems capable of performing vibration analysis.

In some embodiments, if the measured acceleration exceeds a predetermined threshold, an alert or alarm can be indicated by the test and measurement tool. Such alarms can be graphical, audible, or vibrational locally at the test and measurement tool, or can be transmitted via a wired or wireless connection to another device or location. In some examples, an alarm level can correspond to the detected level of vibration and/or misalignment by accelerometers. Accordingly, such alarm detection can include a plurality of alarm levels.

In various embodiments, alarm conditions can be detected and corresponding alarm data can be used to trigger one or more subsequent operations such as described in U.S. patent application Ser. No. 14/856,046, which is incorporated by reference. Additionally or alternatively, alarm data can be communicated to alternative locations such as a central control station and/or to a mobile device, e.g., of a technician, such as described in U.S. Provisional patent application Ser. No. 14/921,128, which is incorporated by reference.

In various embodiments, imaging tools can be used in a variety of ways to determine potential vibration and/or misalignment of an object under analysis, some of which will be described with the assistance of a series of figures. In some instances, as described with respect to FIG. 4, certain recognized thermal patterns, for example, of a coupling between pieces of equipment can indicate possible misalignment and/or vibration of such components.

In some examples, other aspects of image data (e.g., VL and/or IR image data) can be used to detect vibration (e.g., due to misalignment) in operating equipment. For instance, with further reference to FIG. 4 the imaging tool 402 has a field of view 412 that includes the motor 420, the coupling 422, and the load 424. However, in some examples, the field of view 412 can be adjusted to include a single component of interest. In some configurations, the coupling 422 between the motor 420 and the load 424 vibrates during use, causing undesirable stress on the motor system. The imaging tool 402 can be used to analyze the degree of vibration and/or misalignment of the coupling 422.

Figure 10A:
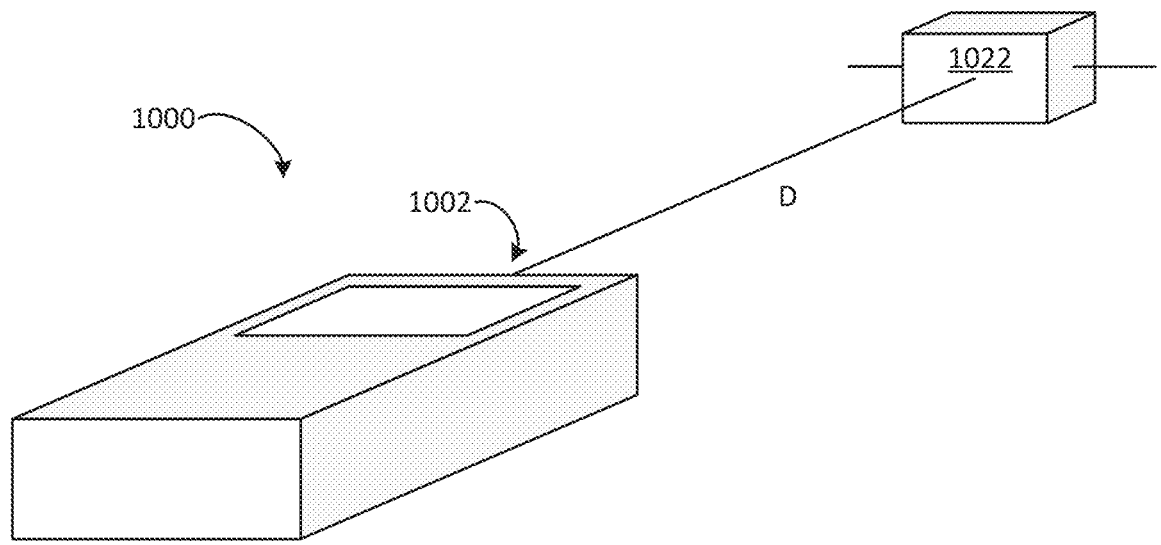
FIG. 10A is a perspective view of an imaging tool analyzing the vibration and/or misalignment of a coupling in a stationary state.
Figure 10B:
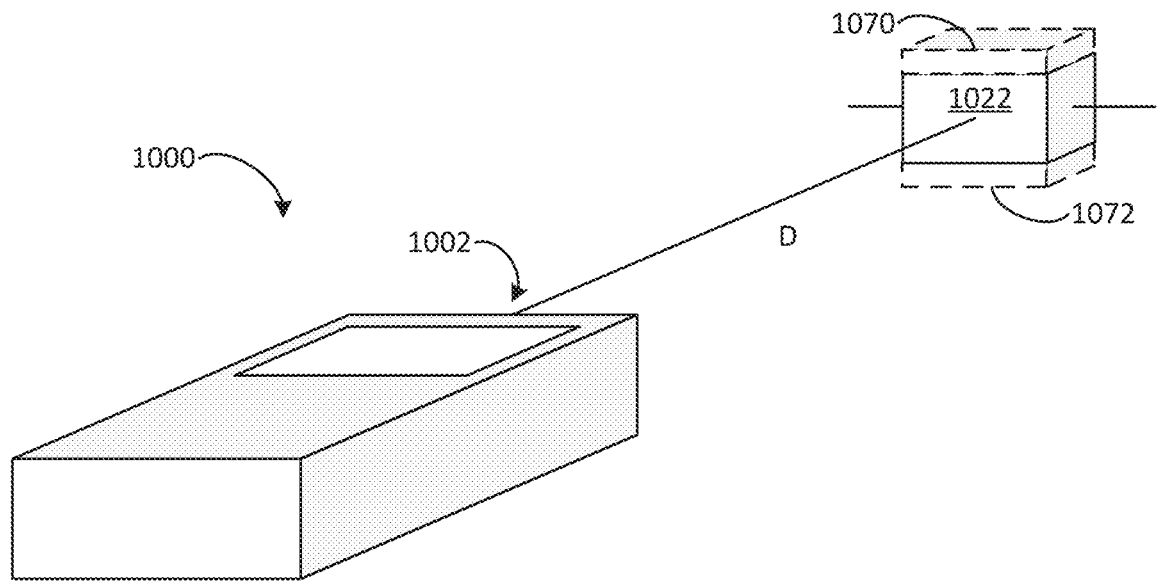
FIG. 10B is a perspective view of an imaging tool analyzing the vibration and/or misalignment of a coupling in a vibrating state.

FIGS. 10A and 10B are perspective views of an imaging tool analyzing the vibration and/or misalignment of a coupling in stationary and vibrating state, respectively. As shown, an imaging tool 1002 of a vibration and/or misalignment testing system 1000 is directed at a coupling 1022, e.g., between a motor and an object, in order to generate image data representative of the coupling 1022. The vibration and/or misalignment testing system is positioned such that the imaging tool 1002 is a distance D from the equipment under test, in the illustrated embodiment, coupling 1022. In FIG. 10A, the coupling is stationary and is imaged as such. However, in the situation of FIG. 10B, the coupling is vibrating during operation. The vibration and/or misalignment of the coupling 1022 causes image distortion illustrated by the broken outlines 1070, 1072, illustrating the position of the edge of the coupling 1022 at points of maximum deflection in opposite directions. Such deflection can be observed by the imaging tool 1002 of the vibration and/or misalignment testing system 1000. For example, because vibration and/or misalignment causes the coupling 1022 to deflect to positions represented by outlines 1070, 1072, image data generated by the imaging tool 1002 can show one or both of outlines 1070, 1072 due to averaging of a series of scenes or the exposure time of the imaging tool 1002 being sufficiently long so that the coupling 102 deflects through each position within the exposure time. In some examples, the vibration and/or misalignment testing system 1000 can quantitatively determine the degree of deflection of the coupling 1022 based on analysis of the image distortion for comparison with a threshold.

Figure 11A:
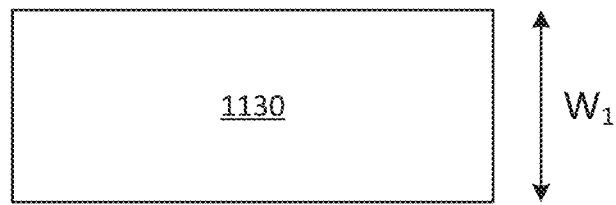
FIG. 11A shows exemplary image data of an object in a neutral position.
Figures 11B, 11C:
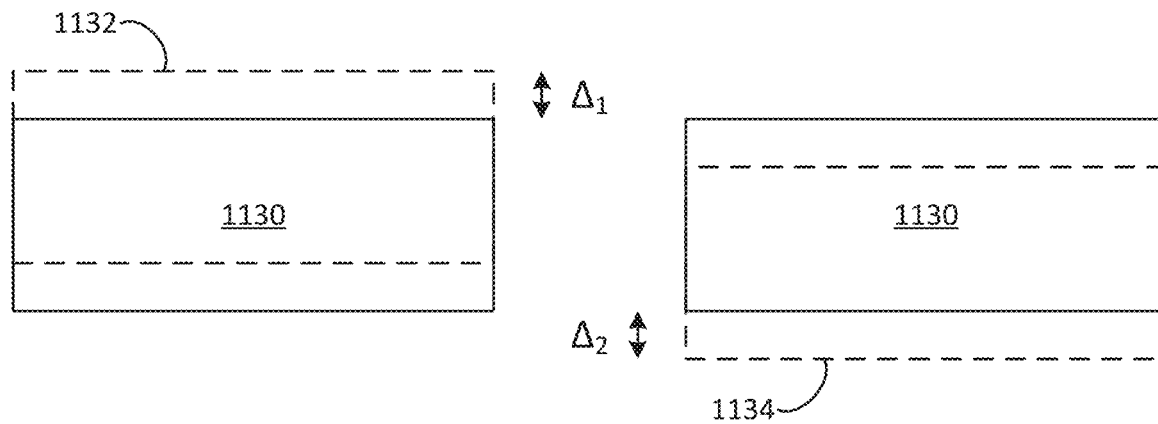
FIG. 11B shows exemplary image data of the object showing a first deflection.
FIG. 11C shows exemplary image data of the object showing a second deflection.

FIGS. 11A-11D illustrate an exemplary method in determining the amount of deflection of an object utilizing a vibration and/or misalignment testing system including an imaging tool. An object 1130 (e.g., a coupling between a motor and a load driven by the motor) is detected by the vibration and/or misalignment testing system. The distance D from the imaging tool to the object 1130 can be determined via a distance measurement tool of the system. Such a distance-to-target measurement can be used to determine the actual width $W_1$ of the object 1130 (e.g., by converting pixel coordinate distances to actual distances using the distance to target measurement). FIGS. 11B and 11C illustrate the behavior of object 1130 during operation due to vibration and/or misalignment. As shown in FIG. 11B, the object 1130 can deflect a distance $\Delta_1$ in a first direction, as illustrated by broken lines 1132. As shown in FIG. 11C, the object 1130 can similarly deflect a distance $\Delta_2$ in a second direction as illustrated by broken lines 1134. In various examples, $\Delta_1$ and $\Delta_2$ can be the same or different values. Differences in $\Delta_1$ and $\Delta_2$ can be indicative of a greater deflection in a given direction. In the context of alignment analysis between pieces of equipment, deflection that is greater in on direction over another can be used to analyze the nature of possible misalignment. The magnitude(s) of deflection distances $\Delta_1$ and $\Delta_2$ can be indicative of a severity of misalignment between the equipment.

Figure 11D:
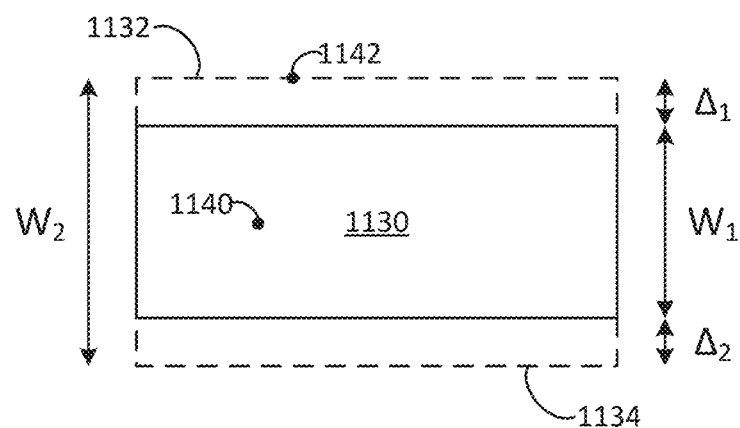
FIG. 11D shows exemplary image data of the object showing deflection in two directions.

FIG. 11D illustrates an exemplary view of the object 1130 captured by an imaging tool during operation. If the object 1130 is vibrating during operation, the apparent edges 1132 and 1134 of the object can appear to be displaced further apart than when the object 1130 is stationary, resulting in a blurred image. Accordingly, the imaging tool can utilize the detected apparent edges 1132 and 1134 of the blurred image along with the distance-to-target measurement to determine an apparent width $W_2$ of the object 1130 (i.e., the width of the "blurred" object). With regard to FIGS. 11B and 11C and as shown in FIG. 11D, according to the illustrated embodiments, $W_2 = W_1 + \Delta_1 + \Delta_2$.

Figure 12:
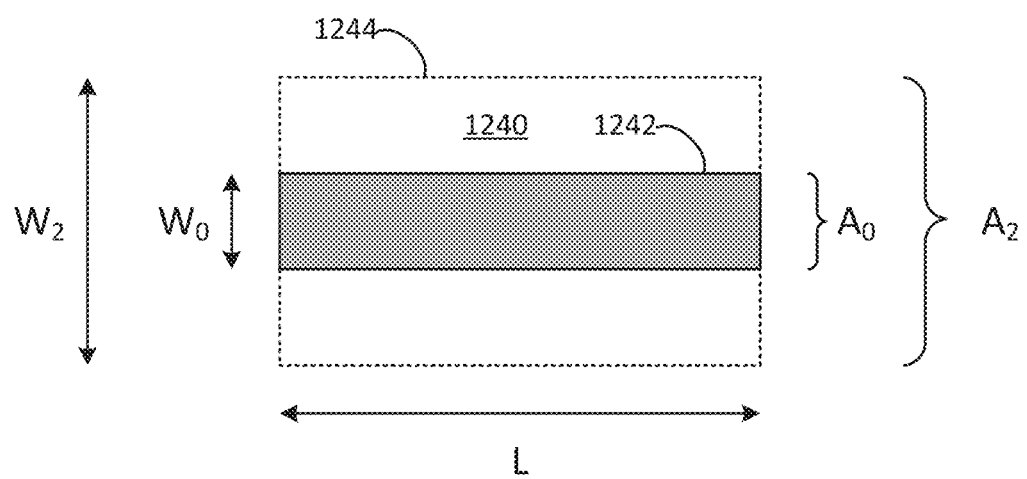
FIG. 12 shows exemplary image data of an object showing deflection in two directions and illustrates a method for detecting vibration and/or misalignment of an object.

The vibration and/or misalignment testing system can acquire images of the object 1130 of FIGS. 11A and 11D (i.e., while stationary and during operation). Such images can be aligned and compared. The difference in apparent widths of the object 1130 can be determined ($W_2 - W_1 = \Delta_1 + \Delta_2$) using a variety of various geometric and trigonometric calculations, and the amount deflection of the object 1130 during operation can be determined. Various pieces of information can be taken into account in determining the deflection, including the distance to target, the apparent deflection determined as a number of pixels in corresponding image data, zoom or magnification data of the imaging tool, and the like. In some examples, distances can be calibrated by a user for providing a translation between pixel coordinates in image data and a physical measure of displacement in the target scene. Such a calibration can be performed in addition to or alternatively to a distance-to-target measurement. Another method for detecting vibration and/or misalignment of an object is illustrated in FIG. 12. An imaging tool can be used to capture an image of an object 1240 during steady-state operation. Image analysis techniques can be performed to determine apparent sharp edges compared to soft or blurred edges. For instance, with reference to FIGS. 11B and 11C, the object can be linearly displaced from a neutral location by some displacement amount due to vibration and/or misalignment of the object. Accordingly, across various captured images, the object can appear to be in a variety of locations. Over time and across various images, at least a portion of the object will appear more often in certain locations of an image when compared to other locations. For example, the location of the center of the object when the object is not vibrating will be more likely to include at least a portion of the object in any given image when compared to the location of the edge of the object at a point of maximum deflection. That is, with reference to FIG. 11D, for an image captured at any moment, at least a portion of the object 1130 is more likely to appear at point 1140 in the image when compared to point 1142. Accordingly, a temporal average or other form of image combination or analysis can be used to determine a degree of deflection due to vibration and/or misalignment of the object.

With reference to FIG. 12, the object is shown having a hard edge 1242 and a soft edge 1244. In the simplified example of FIG. 12, the hard edge 1242 represents a portion of the image in which a portion of the object 1240 is present at all times. Soft edge 1244, shown in broken lines, represents the outermost extent of the object during steady state operation. That is, due to deflection in multiple directions, apparent edges (1244) appear at the furthest extent of object deflection. As a result, images captured over time and temporally averaged may appear having a soft edge 1244 outlining the furthest extent of the object 1240 deflection, and a hard edge 1242 outlining locations in which the object 1240 is always present. In various embodiments, the location of edges such as hard edge 1242, soft edge 1244, apparent edges 1132, 1134, edges of an idle object, or other edges, can be manually detected and entered by a user via a user interface, or can otherwise be detected automatically using any number of known edge detection techniques. Some such techniques are described in U.S. patent application Ser. Nos. 14/222,153 and 14/837,757, each of which is incorporated by reference.

The vibration and/or misalignment testing system can analyze the resulting image data of FIG. 12 to determine information regarding the vibration and/or misalignment of the object. For instance, the vibration and/or misalignment testing system can determine the width of the hard edge 1242 ($W_0$) and the width of the soft edge 1244 ($W_2$). Analyzing a relationship between $W_2$ and $W_0$ (e.g., determining the difference $W_2$–$W_0$ or the proportion $W_2/W_0$) can provide information regarding the degree of deflection of the object 1240 due to vibration and/or misalignment. Such image data analysis can be performed on VL or IR image data. In some examples, similar analysis can be performed by comparing thermal gradients determined from IR image data.

The analyzed relationship of $W_0$ and $W_2$ can be compared to one or more predetermined threshold or alarm values as described above. The analyzed image information can be combined with measurement data, such as data from accelerometers received by the test and measurement tool, for further analysis. As described above, any combination of detected alarm conditions can result in a variety of operations performed by the vibration and/or misalignment testing system. Any combination of image data, alarm data, measurement data, and the like can be displayed to a user via a display, or can be transmitted to a mobile device or remote location or display and analysis as described above.

As described previously, a distance-to-target measurement (or other calibration) can permit the dimensioning of pixels in the image data. That is, a conversion between pixels and a unit of distance in the target scene can be established. Thus, actual distance values for $W_0$ and $W_2$ can be established and compared to thresholds concerning a true distance of deflection.

In some embodiments, in addition or as an alternative to analyzing $W_0$ and $W_2$, the vibration and/or misalignment testing system can determine the length L (or other dimension) of the object 1240 to determine a hard area $A_0$ and a soft area $A_2$ of the object during operation. Accordingly, analysis regarding the apparent area of the object 1240 due to deflection can be performed and similarly compared with a variety of thresholds for detecting vibration and/or misalignment alarm data.

As mentioned elsewhere herein, various aspects of image distortion in a coupling between components can provide insight into possible misalignment between such components. In some examples, image distortion as a result of the vibration and/or misalignment can be analyzed for shape, interval, duration, or other parameters in order to provide more accurate understanding of the nature of the vibration and/or misalignment present.

While shown in FIGS. 11A-D and 12 as being simply linear deflections, as described elsewhere herein, misalignments can be linear, angular, or a combination thereof. FIGS. 13A-F illustrate image distortion corresponding to a variety of different offset conditions that can occur due to misalignment between equipment couplings. FIGS. 13A-F show a coupling comprising drive side and load side couplings. The coupling, including the drive side and load side couplings, is outlined in a solid line. Image distortion areas extend outside of the solid line border of the couplings showing deflection from the neutral alignment configuration.

Figures 13A, 13B:
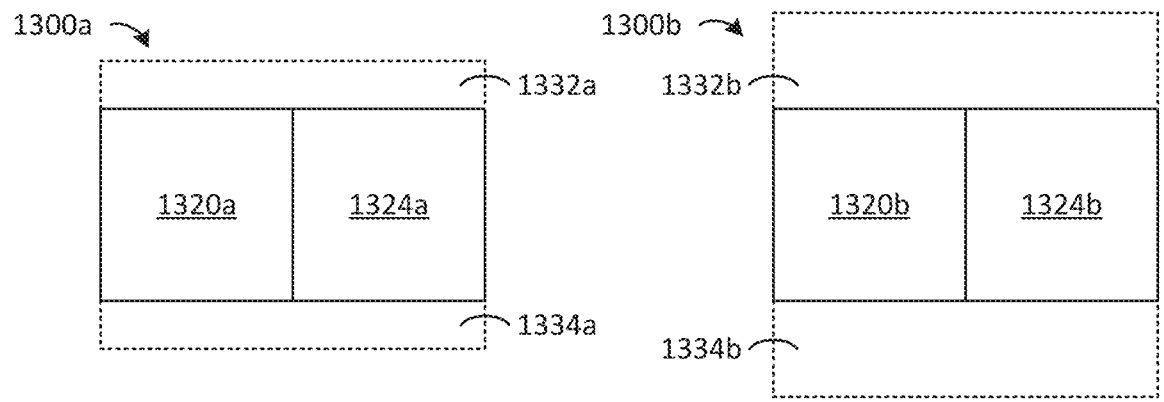
FIG. 13A shows exemplary image data representing a first example of image distortion.
FIG. 13B shows exemplary image data representing a second example of image distortion.

FIG. 13A shows a coupling 1300a having a drive side coupling 1320a and a load side coupling 1324a. Image distortion areas 1332a and 1334a show deflection of the coupling both up and down. In the illustrated example of FIG. 13A, both of areas 1332a and 1334a are substantially the same size and shape, and are substantially horizontally symmetrical. This implies that each of drive side coupling 1320a and load side coupling 1324a deflect approximate the same amount as the other, and approximately the same amount in either direction and that the deflection is substantially linear.

FIG. 13B shows a coupling 1300b having a drive side coupling 1320b and a load side coupling 1324b. Image distortion areas 1332b and 1334b show deflection of the coupling both up and down. Similar to the illustrated example in FIG. 13A, in the illustrated example of FIG. 13B, both of areas 1332a and 1334a are substantially the same size and shape, and are substantially horizontally symmetrical. Thus, similarly, each of drive side coupling 1320a and load side coupling 1324a deflect approximate the same amount as the other, and approximately the same amount in either direction and that the deflection is substantially linear. However, as shown, the deflection areas 1332b and 1334b are larger than deflection areas 1332a and 1334a in FIG. 13A, implying greater deflection of coupling 1300b than coupling 1300a.

Figures 13C, 13D:
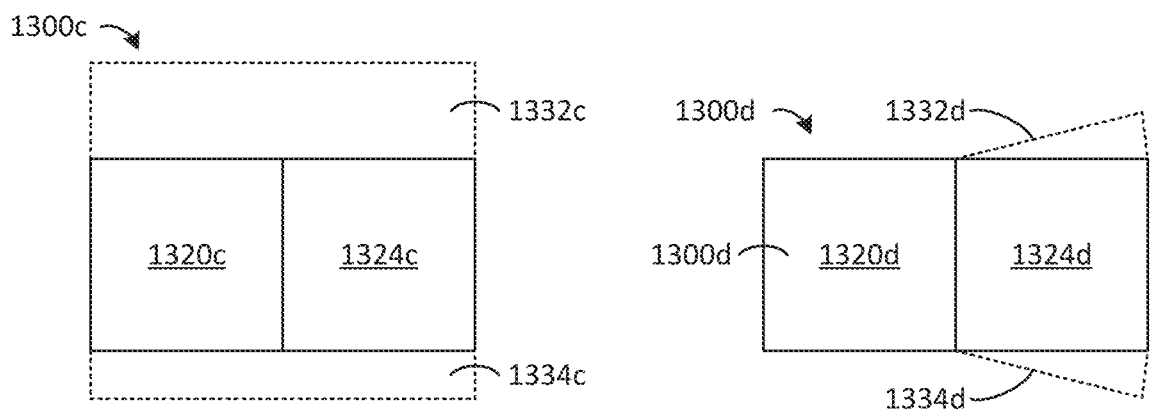
FIG. 13C shows exemplary image data representing a third example of image distortion.
FIG. 13D shows exemplary image data representing a fourth example of image distortion.

FIG. 13C shows a coupling 1300c having a drive side coupling 1320c and a load side coupling 1324c. Image distortion areas 1332c and 1334c show deflection of the coupling both up and down. In the example of FIG. 13C, deflection area 1332c is larger than area 1334c, implying that the coupling 1300c tends to deflect upward a greater amount than it deflects downward. Each deflection area 1332c, 1334c is substantially horizontally symmetrical, implying that the deflection, while biased in one direction, is generally linear.

FIG. 13D shows a coupling 1300d having a drive side coupling 1320d and a load side coupling 1324d. Angled image distortion areas 1332d and 1334d are shown surrounding load side coupling 1324d. The angled shape of deflection areas 1332d and 1334d implies an angular misalignment of the load side coupling 1324d. Because there is little or no portion of deflection areas 1332d, 1334d surrounding drive side coupling 1320d, the drive side coupling 1320 does not appear to have significant misalignment based on the shown image data.

Figures 13E, 13F:
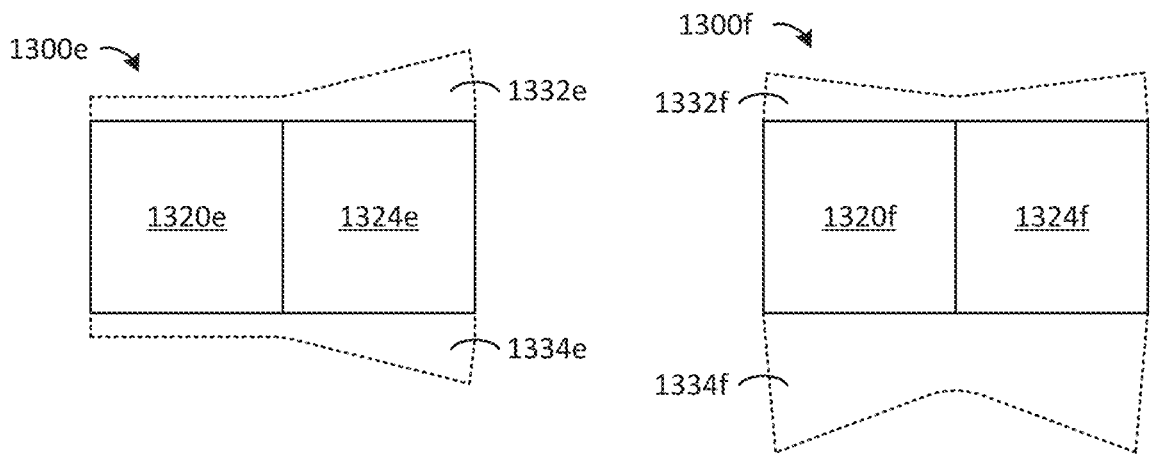
FIG. 13E shows exemplary image data representing a fifth example of image distortion.
FIG. 13F shows exemplary image data representing a sixth example of image distortion.

As described above with respect to FIGS. 13A-D, image data can be used to detect linear and/or angular misalignments. In some examples, image data can show evidence of a combination of linear and angular misalignments. FIG. 13E shows a coupling 1300e having a drive side coupling 1320e and a load side coupling 1324e. Distortion areas 1332e and 1334e surround the length of coupling 1300e. Proximate the drive side coupling 1320e, distortion areas 1332e and 1334e are substantially flat, indicating linear misalignment on the drive side with little angular misalignment. On the other hand, proximate the load side coupling 1324e, the distortion areas 1332e and 1334e include an angled portion (indicating an angular misalignment) that is offset from the solid line border of the coupling 1300e (indicating a linear misalignment). Thus, the image distortion of FIG. 13e shows a linear misalignment across the entire coupling 1300, as well as angular misalignment on the load side coupling 1324e.

FIG. 13F shows a coupling 1300f having a drive side coupling 1320f and a load side coupling 1324f. Image distortion area 1332f shows angled areas on both the load side and the drive side, and the angled areas are offset from the solid line border of the coupling 1300f. Thus, the image distortion area 1332f indicates angular misalignment on both the drive side coupling 1320f and the load side coupling 1324f, as well as linear misalignment of the coupling 1300f. Similarly, image distortion area 1334f indicates angular misalignment on both the drive side coupling 1320f and the load side coupling 1324f and linear misalignment of the coupling 1300f. However, the linear deflection of distortion area 1334f is greater than that of distortion area 1332f, indicating that the linear offset may be biased toward in the downward direction.

Thus, as described with respect to FIGS. 13A-F, different image distortion shapes and sizes can be indicative of various details of misalignment, including the type, origin, direction, and the like. In some examples, as described elsewhere herein, the size (e.g., linear dimension, area, etc.) of the distortion areas can be indicative of the severity of misalignment.

Figure 14A:
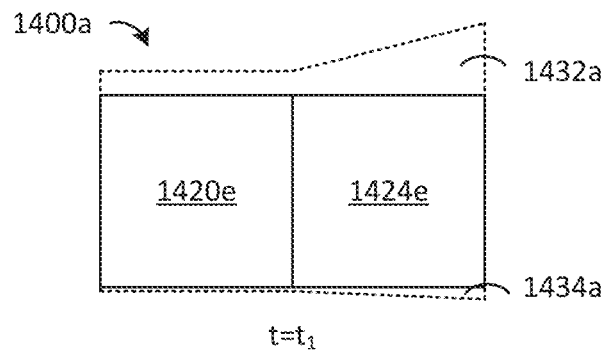
FIG. 14A shows exemplary image data of operating equipment captured at a first time.
Figure 14B:
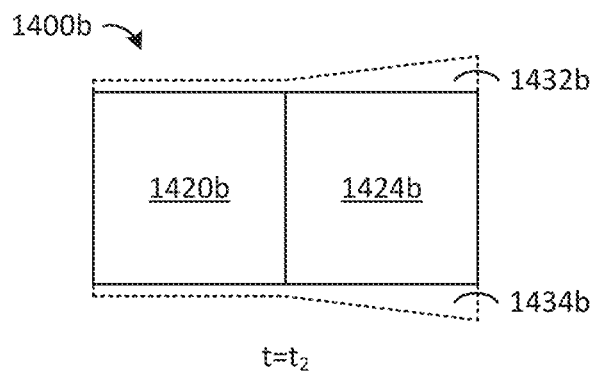
FIG. 14B shows exemplary image data of operating equipment captured at a second time.
Figure 14C:
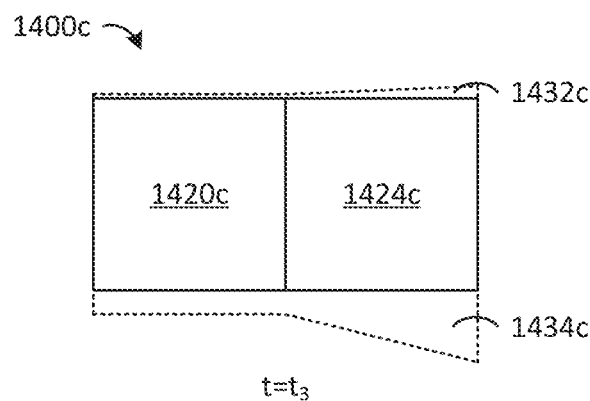
FIG. 14C shows exemplary image data of operating equipment captured at a third time.

As described elsewhere herein, image distortion can be caused as a result of image averaging or an exposure time that is sufficiently long for the coupling to be displaced sufficiently during a single exposure. In some other examples, a high-speed and/or slow motion camera (e.g., VL camera or IR camera) can be used to capture a series of images that show the motion of an object (e.g., a coupling) over a period of time. For examples, FIGS. 14A-C show a series of image data captured at a variety of times ($t_1$, $t_2$, $t_3$) of operating equipment. FIG. 14A shows image data captured at time=$t_1$ representing a coupling 1400a having a drive side coupling 1420a and a load side coupling 1424a. Similar to FIGS. 13A-F, FIG. 14A shows image distortion areas 1432a and 1434a. Image distortion area 1432a is significantly larger than area 1434a, indicating that in the time during which the image data was captured, e.g., including an exposure time or images averaged in averaging process, the load side coupling 1424a was generally angled upward, and the coupling 1400a was generally shifted upward.

FIG. 14B shows image data captured at time=$t_2$ representing a coupling 1400b having a drive side coupling 1420b and a load side coupling 1424b. FIG. 14B shows image distortion areas 1432b and 1434b being approximately equal in size and shape. Thus, in the time during which the image data was captured, the coupling 1400b spent about the same amount of time deflected upward and downward from neutral, and that load side coupling 1424b spent about the same amount of time angled upward and downward.

FIG. 14C shows image data captured at time=$t_3$ representing a coupling 1400c having a drive side coupling 1420c and a load side coupling 1424c. FIG. 14C shows image distortion area 1434c being significantly larger than area 1432c, indicating that in the time during which the image data was captured, the load side coupling 1424c was generally angled downward, and the coupling 1400c was generally shifted downward.

FIGS. 14A-C represent image data that is captured over time short duration of time. For example, with respect to FIG. 14A, the time during which image data is captured (e.g., an exposure time) is enough for sufficient motion of coupling 1400a to cause image distortion. However, the time is short enough that the coupling 1400a has not travelled through its entire range of motion (e.g., minimal downward deflection has occurred). A series of such images (e.g., FIGS. 14A-C) can be analyzed to track misalignment by way of motion analysis of the coupling.

Figure 15A:
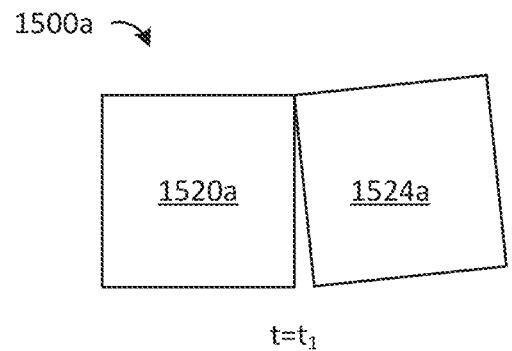
FIG. 15A shows exemplary image data representing the alignment of two objects at a first time.
Figure 15B:
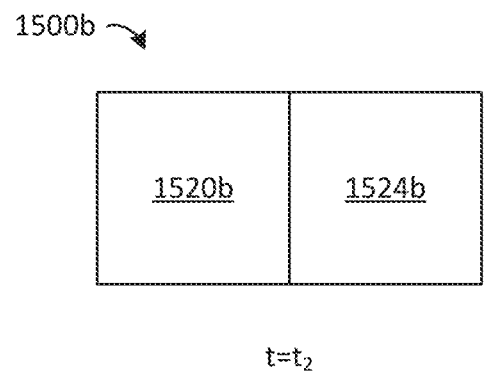
FIG. 15B shows exemplary image data representing the alignment of two objects at a second time.
Figure 15C:
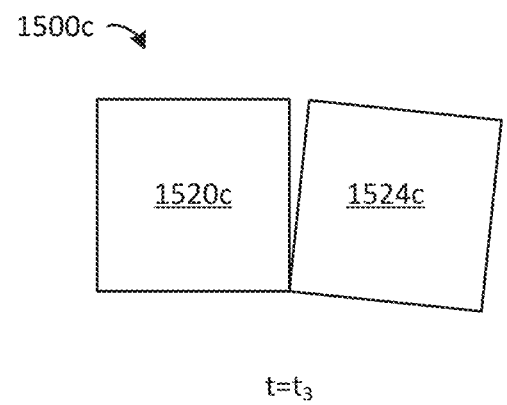
FIG. 15C shows exemplary image data representing the alignment of two objects at a third time.

FIGS. 15A-C similarly show motion of an object by way of a series of captured images. However, in the image data of FIGS. 15A-C, the images are captured in a sufficiently short time so that the object does not substantially move during image capture. FIG. 15A shows image data captured at time=$t_1$ representing a coupling 1500a having a drive side coupling 1520a and a load side coupling 1524a. FIG. 15A shows, the load side coupling 1524a being generally angled upward relative to drive side coupling 1520a at time $t_1$.

FIG. 15B shows image data captured at time=$t_2$ representing a coupling 1500b having a drive side coupling 1520b and a load side coupling 1524b. FIG. 15B shows, the drive side coupling 1520b and the load side coupling 1524b being generally aligned at time $t_2$.

FIG. 15C shows image data captured at time=$t_3$ representing a coupling 1500c having a drive side coupling 1520c and a load side coupling 1524c. FIG. 15C shows, the load side coupling 1524c being generally angled downward relative to drive side coupling 1520c at time $t_3$.

Tracking the motion of images over time to observe vibration and/or misalignment, such as shown in FIGS. 14A-c and 15A-C, can be done in a variety of ways. For example, as discussed elsewhere herein, in some embodiments, high speed or slow motion image capture (e.g., utilizing short exposure times and/or fast frame rates) can be used to capture images sufficiently quickly to perform such analysis. Additionally or alternatively, when using visible light image data for such motion analysis, capturing the image data can comprise periodically illuminating an otherwise dark object (e.g., similar to a strobe light effect) during image capture. Thus, the captured image data only includes the object during a short period of time, such as shown in FIGS. 14A-C or 15A-C.

Figure 16A:
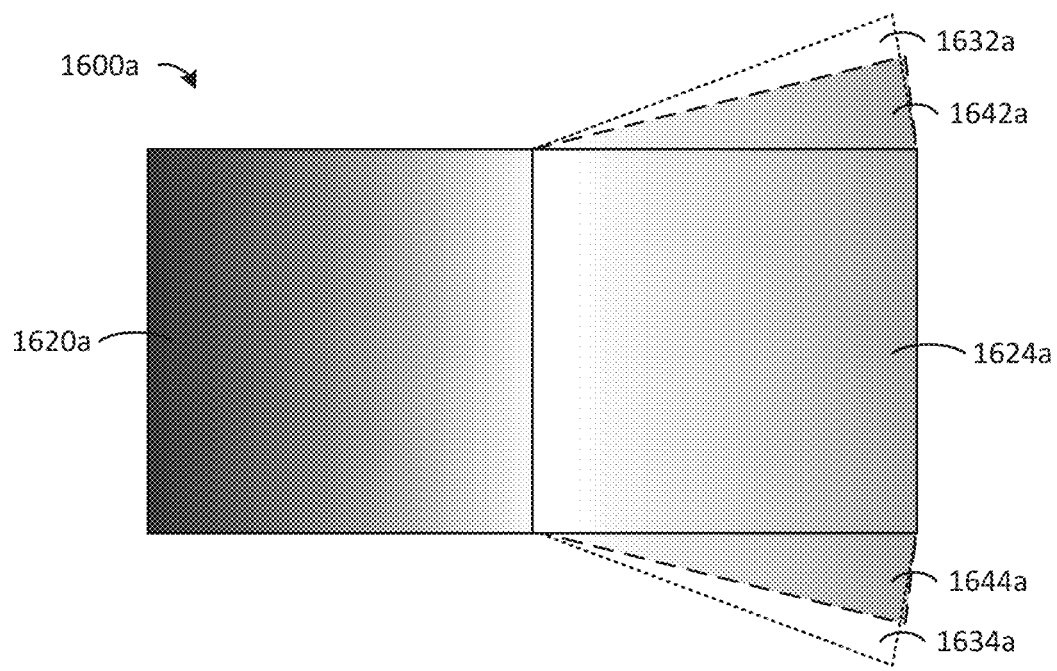
FIG. 16A shows combined VL and IR image data representing vibration and/or misalignment.

As mentioned elsewhere herein, in various embodiments, image distortion of either VL image data or IR image data can be indicative of vibration and/or misalignment. In some embodiments, combinations of VL and IR image data can be used to analyze vibration and/or misalignment. For example, FIG. 16A shows a combined VL and IR image of a misalignment. FIG. 16A shows a coupling 1600a having a drive side coupling 1620a and a load side coupling 1624a. The scene in FIG. 16A shows IR image data of the drive side coupling 1620a and load side coupling 1624a represented in a grayscale palette, wherein the load side coupling 1624a is shown as brighter (hotter) than the drive side coupling 1620a. IR image distortion areas 1642a and 1644a show angular misalignment in the IR image data. However, the representation in FIG. 16A further includes image distortion areas 1632a and 1634a, which do not include IR image data. Rather, such image distortion areas represent image distortion in the VL image data. That is, in some instances, image distortion in the VL image data (e.g., 1632a, 1634a) can be different than image distortion in the IR image data (e.g., 1642a, 1644a). Thus, in some examples, both IR and VL image data of coupling 1600a can be captured (e.g., via an imaging tool having an IR camera module and a VL camera module) and combined, for example, using various alpha-blending techniques, picture-in-picture displays, or other IR and VL image display techniques, such as those described in U.S. Patent Publication No. 2013/0321641, corresponding to U.S. patent application Ser. No. 13/963,802, and entitled "VISIBLE LIGHT AND IR COMBINED IMAGE CAMERA," which was filed Aug. 9, 2013, is assigned to the assignee of the instance application, and is hereby incorporated by reference in its entirety. Analyzing both the IR and VL image distortion can provide additional data regarding the nature of vibration and/or misalignment in the observed system.

In some examples of IR and VL image combination, IR image data is only included in the resulting image when the IR image data satisfies a threshold (e.g., temperature alarms). As described elsewhere herein, image distortion areas can appear to be less intense than areas in the image in which the object is always (or more often) present during vibration and/or misalignment. Thus, in some instances, an IR threshold can be used to exclude IR image data from the image distortion while retaining IR image data on the object itself.

Figure 16B:
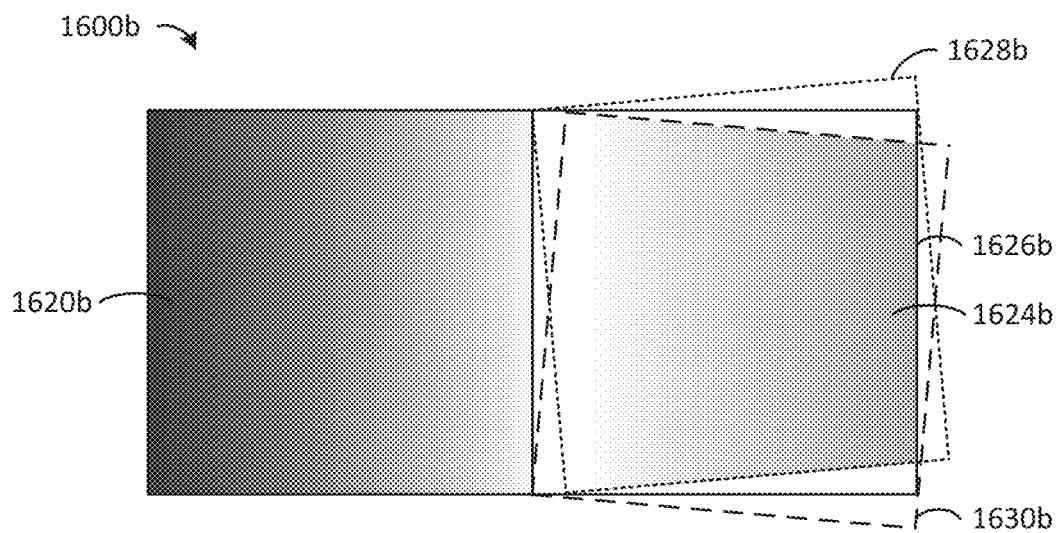
FIG. 16B shows combined VL and IR image data representing vibration and/or misalignment.

FIG. 16B shows an example of combined VL and IR image data using IR thresholds. FIG. 16B shows a coupling 1600b having a drive side coupling 1620b and a load side coupling 1624b. The scene in FIG. 16B shows IR image data of the drive side coupling 1620b and load side coupling 1624b represented in a grayscale palette, wherein the load side coupling 1624b is shown as brighter (hotter) than the drive side coupling 1620b. Load side coupling 1624b is shown having three different outlines illustrating different position states of the coupling 1624b. Solid line 1626b represents the outline of the coupling 1624b when it is in a neutral state (e.g., not angled upward or downward), dotted line 1628b represents the outline of the coupling 1624b when it is deflected upward, and dashed line 1630b represents the outline of the coupling 1624b when it is deflected downward. During operation, the coupling 1624b can move between the states represented by outlines 1626b, 1628b, and 1630b. Thus, in some examples incorporating IR image data thresholds, IR image data may be excluded from portions of the image in which the coupling 1624b is not always present.

In the illustrated example of FIG. 16B, IR image data is only shown at the intersections of each of outlines 1626b, 1628b, and 1630b. That is, in the illustrated example, IR image data is excluded in portions of the image in which the coupling 1624b is not always present. Image distortion shown by outlines 1628b and 1630b may be observable via corresponding VL image data. In some examples, such a display can allow a user to clearly identify image distortion in the image as well as analyze the thermal profile of the equipment.

Analysis of VL and/or IR image distortion can be used to determine information regarding the alignment and/or vibration of operating equipment. In some examples, a distortion image is generated based on captured VL and/or IR image data. For example, image data captured from an image tool can be used to generate the distortion image for presentation on a display. As described elsewhere herein, the image data can be processed and the distortion image can be generated and displayed in any of a variety of ways and locations. For instance, captured image data can be processed via a processor located in the imaging tool, a test and measurement tool, an external device, or the like. Similarly, the distortion image can be generated and/or displayed on a display located on the imaging tool, a test and measurement tool, an external device, or the like.

A user can view the generated distortion image to analyze the operating status of the equipment. In some instances, a user may decide that sufficient image distortion is present, and initiate an alignment process, such as performing a "cold" alignment process (e.g., via a laser alignment tool), calculating thermal growth of the feet of operating components (e.g., as described with respect to FIGS. 7-9), or the like.

Additionally or alternatively, the distortion image can be processed to facilitate misalignment and/or vibration analysis. Processing can occur, for example, in the imaging tool, the test and measurement tool, an external device, or the like. In some examples, processing the distortion image comprises detecting one or more edges corresponding to the edges of the distortion areas. Edges can be detected and, in some embodiments, enhanced for display such as described in U.S. patent application Ser. Nos. 14/222,153 and 14/837,757, each of which is incorporated by reference. In other examples, image distortion areas and/or edges can be detected by subtracting a "resting" image of the equipment from an image of the operating equipment. Differences in the images can indicate portions of the image of the operating equipment that include image distortion. Detected and/or emphasized edges and/or distortion areas in the display can assist a user in analyzing the amount of image distortion in the image data. Additionally or alternatively, edges of or areas corresponding to the resting or neutral "aligned" position of the equipment (e.g., based on analysis of the distortion image data and/or previously captured image data representing the equipment in a neutral state) can be emphasized so that image distortion areas can be easily seen compared to the neutral state of the equipment.

As described, in some cases, the edges of the image distortion areas can be automatically identified, e.g., via image processing techniques. Additionally or alternatively, a user may manually identify the edges of the image distortion areas on a display via a user interface, such as by manually tracing the outline of such areas. In some embodiments, establishing the defining edges of the image distortion areas, whether manually, automatically, or a combination thereof, allows for automated analysis of the image distortion. Such automated analysis can be performed via the imaging tool or another tool in communication therewith, such as a test and measurement tool, an external device, or the like.

For example, in some embodiments, once the boundaries of the image distortion areas are identified, the area of the image distortion areas can be determined. The physical area of the distortion can be indicative of the severity of the misalignment and/or vibration. In some examples, the number of image pixels within the identified distortion area can be used as a measure of the area. In other examples, additional data such as a distance to target measurement (e.g., distance D in FIGS. 10A and 10B, which can be obtained via a test and measurement tool, a focal distance measurement, or the like) can be used to establish physical dimensions in the image data. Some such techniques are described in U.S. Patent Publication No. 2012/0320189, corresponding to U.S. patent application Ser. No. 13/164,211, and entitled "THERMAL IMAGER THAT ANALYZES TEMPERATURE MEASUREMENT CALCULATION ACCURACY," which was filed Jun. 20, 2011, is assigned to the assignee of the instant application, and is incorporated herein by reference in its entirety. In various such examples, pixel counts can be converted to physical areas, for example, using a pixel field of view calculation. In other examples, shape analysis of the image distortion areas can be used to determine the area mathematically.

The calculated area of the image distortion can be used as a metric of the severity of the image distortion, and accordingly as a metric of the severity of vibration and/or misalignment in the equipment. In some examples, the determined area of the image distortion can be compared to a threshold, and the user can be alerted if the determined area exceeds the threshold. Alerts can include visible alerts on a display (e.g., the display on which the image data is displayed or another display), an audible alert, a vibrational alert (e.g., on a device having vibrating functionality, such as a smart phone or tablet), or other alerts. In some embodiments, the alert can indicate the severity of the distortion. For example, in various examples, an audible alert can increase in volume or pitch as the determined area increases. Similarly, a vibrational alert can increase in intensity as the determined area increases.

In addition to severity of vibration and/or misalignment, shape analysis of the image distortion can be used to provide information regarding the vibration and/or misalignment. For example, in some embodiments, a processor is configured to analyze the shape of the image distortion to determine whether any detected misalignment is likely to be linear, angular, or a combination thereof (e.g., such as the differences shown in FIGS. 13A-F) and/or which portion(s) of the equipment are likely contributing to the misalignment. In some examples, a detected shape of image distortion is compared to a database of patterns. Such a database can be preloaded onto the imaging device or other processing device in communication therewith (e.g., a test and measurement tool, external device, etc.), or can be accessed from a remote server, such as the cloud.

In various examples, the database can be populated in a variety of ways. For instance, in some embodiments, the database can be populated by images captured by the user of the particular equipment under analysis operating in states deemed acceptable. In other examples, a database can be populated by images from a plurality of users operating similar equipment that are aggregated, for example, on a server such as the cloud. Databases populated by a plurality of locations can include a database hosted by a single company operating a plurality of locations or by a host company receiving information from a plurality of customer sites, for example. In still other examples, a database can be populated by a predefined collection of images established by a manufacturer or industry expert. In some examples, a database can be populated by combinations of a variety of such sources, and in still further examples, can be populated by a user-selectable combination of sources of image data. Thus, in addition or alternatively to severity, alerts can indicate additional information regarding possible misalignment and/or vibration. For example, alerts can indicate whether misalignment is likely to be linear, angular, or combination thereof. Additionally or alternatively, alerts can indicate a direction in which any misalignment is biased.

Some systems can be programmed with default alerts, such as absolute area thresholds above which excess vibration/misalignment is assumed. In some examples, default alert thresholds are based on the size of the object (e.g., a percentage deflection) and/or a detected distance to target (e.g., when pixel counts are used as a measure of areas). Additionally or alternatively, one or more thresholds can be established by a user. In some examples, a user can input such thresholds into the imaging tool or other tool capable of processing image data (e.g., a test and measurement tool and/or an external device). User adjustable thresholds can be based on the equipment being monitored. For example, a user may input particular thresholds recommended by a manufacturer of a piece of equipment. Similarly, a user may download an operating file or template associated with the operating equipment which includes the thresholds to be used.

In some embodiments, the determined area is compared to a statistical history of typical image distortion area values associated with particular equipment from when the equipment is operating in a known acceptable condition. Thresholds can be determined based on deviations from "normal" image distortion, such as described in U.S. patent application Ser. No. 15/190,792, which is incorporated by reference. Additionally or alternatively, thresholds can be dependent on data acquired from other tools, such as one or more test and measurement tool. For example, image distortion area thresholds can be a function of equipment temperature (e.g., based on IR image data or other temperature measurement tool), equipment vibration (e.g., from a test and measurement tool including or communicating with one or more accelerometers or other vibration sensor) or the like.

As described elsewhere herein, IR image data (e.g., in a database) can be stored with corresponding offset data (e.g., Vertical Angularity and/or Vertical Offset as described with respect to FIG. 9). In some such examples, the image distortion present in an IR image or corresponding VL image displaying a known misalignment, determined image distortion information can be associated with the known misalignments. Thus, in some examples, databases of image and/or image distortion data can be used to determine or estimate one or more offset value(s) based on previously captured data correlating known offsets to image distortion values. As is described elsewhere herein, determined image distortion information and/or associated offset information can be communicated to other components, such as a laser alignment tool for facilitating offset calibration. Additionally or alternatively, once image distortion analysis is performed, the image data, including the image distortion and/or any associated values can be added to the database for future comparison.

As described elsewhere herein, in various embodiments, in addition to or alternatively to the deflection information determined from image data from the imaging tool of the vibration and/or misalignment testing system, measurement data from one or more accelerometers received by a test and measurement tool can be used to monitor vibration and/or misalignment of an object (e.g., 1130 in FIGS. 11A-D). One or both of the image data and measurement data can be used to indicate vibration and/or misalignment of an object to a user. For instance, in some examples, one or both of image data and measurement data can be compared to a variety of alarm levels or predetermined thresholds to trigger an indication of a detected presence or excess of vibration and/or misalignment. Alarms can be based on, for example, an amount of deflection or a percentage of deflection based on the size of the object. Based on any combination of detected data, the vibration and/or misalignment testing system can provide an alarm (e.g., visual, audible, vibrational, etc.), a warning message, or any other appropriate information to a user. In general, any alerts or other operations can be performed in response to detected thresholds or alarm levels in one or a combination of measurement and image data, such as those described in U.S. patent application Ser. No. 14/856,046, which incorporated by reference.

Any combination of measurement data, image data, and alarm data can be presented to a user on a display. The display can be integrated into one or both of the imaging tool and the test and measurement tool, for example, of a vibration and/or misalignment testing system. In some embodiments, one or both of the imaging tool and the test and measurement tool can be in communication with a mobile device or other remote location having a display, such that any combination of received data can be presented on the mobile device or remote location. Some such examples are described in U.S. Provisional patent application Ser. No. 14/855,989, which is incorporated by reference. Such local, mobile, or remote displays can generally include any combination of image data (including VL image data, IR image data, and combined IR and VL image data), graphical indications, color alarms or other image data representations (e.g., palettization of IR image data), numerical values, audible notifications, or any other appropriate display data.

As described, in some examples, the tool (e.g., imaging tool and/or test and measurement tool) is capable of determining a distance to target measurement. The distance to target measurement can be used to determine physical dimensions based on pixel coordinate distances in an image, for example. In some embodiments, the distance to target measurement can be used to determine or supplement vibration and/or misalignment data. For example, a real-time observation of the distance to target may reveal object vibration and/or misalignment in the direction of the tool. In such configurations, an imaging tool may not be able to accurately determine the amount of deflection of the object toward and away from the imaging tool. However, such deflection may be observable via changes in the distance between the tool and the object. Accordingly, in some embodiments, distance to target data may be used for observing vibration and/or misalignment of an object.

In general, the vibration and/or misalignment testing system can perform any number of image analysis processes to determine information regarding the amount of deflection of an object during operation. In some examples, image data of an object operating in a steady state condition can be compared to image data of the stationary object. In other examples, image data of an object during steady state operation can be analyzed to determine information regarding deflection due to vibration and/or misalignment without requiring a non-operating, neutral image for comparison. Image data can be analyzed and combined with measurement data regarding vibration and/or misalignment of the object, such as measurement information received by the test and measurement tool from one or more accelerometers disposed on the object. Combinations of image data and measurement data can be compared to any number thresholds and alarm values for triggering subsequent operations or alerting a user of the detected alarm condition(s). Any combination of acquired data can be displayed locally on a display, for instance on the test and measurement tool or the imaging tool, or can be transmitted by wired or wireless communication to a mobile device or a remote location for viewing and analysis. Any combination of the imaging tool, test and measurement tool, mobile device, remote location, or any other component within or in communication with the vibration and/or misalignment testing system can include one or both of memory for storing any combination of image data, measurement data, or any other acquired data, and a processor for receiving and processing such data. The processor can compare data to a variety of thresholds stored in memory and effect one or more subsequent operations based on the threshold comparisons.

In some embodiments, any combination of measurement data and image data can be plotted, graphed, analyzed, or trended over time. Time-analysis of such data can provide additional details in monitoring behavior of the object under test. In such measurements, time duration can be used as a threshold requirement for meeting alarm conditions. For example, an exemplary alarm condition can require that the detected deflection exceed a predetermined distance and persist for a predetermined amount of time prior to triggering the alarm condition. In some examples, combinations of data (e.g., any combination of image data, including thermal IR image data, measurement data, and time) can be used to assist in diagnosing specific causes of excess vibration and/or misalignment of an object under test. For instance, combined measurement information (e.g., acceleration data) and IR image data can indicate the location of a potential misalignment resulting in excess vibration and/or misalignment.

In addition or alternatively to providing alarm indications of excess vibration and/or misalignment, in some examples, a system can be configured to present a user with a characterization of the vibration and/or misalignment. For example, as described herein, image distortion data and/or vibration data can be analyzed, for example, with respect to historical data and/or predefined values to determine the severity and/or type of vibration and/or misalignment present. In some examples, such analysis can be used to categorize the vibration and/or misalignment into one or more categories. Categories can be related to severity of misalignment (e.g., minor, moderate, or major misalignment detected), type of misalignment (e.g., linear, angular, or a combination thereof), source or location of misalignment, and the like. Such categorization of operating equipment can be presented to a user on a display, for example, on a display of an imaging tool, test and measurement tool, or an external device. In some examples, distinctions between different categories (e.g., between minor and moderate misalignment) can correspond to alarm levels such as those discussed elsewhere herein.

Figure 17:
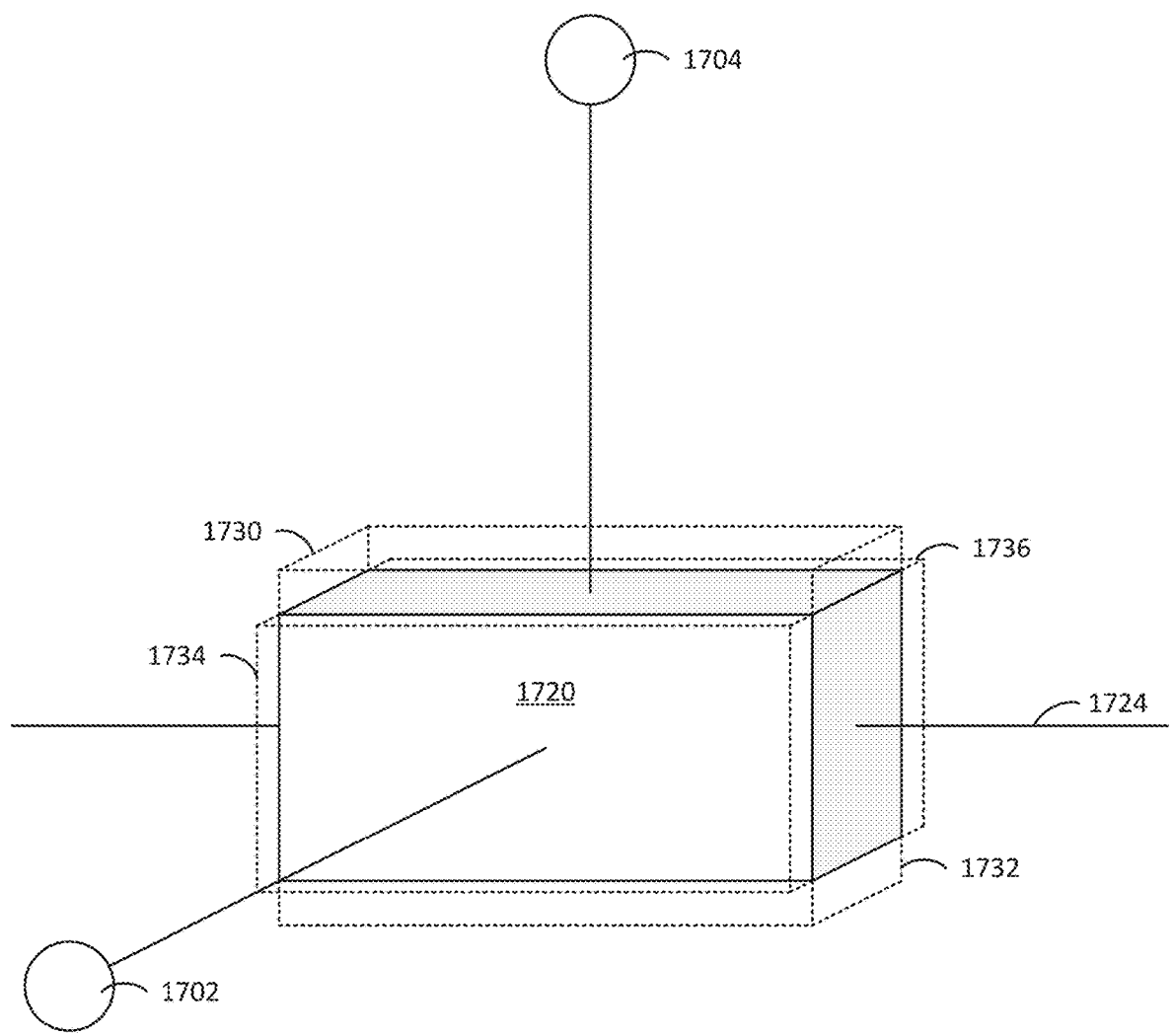
FIG. 17 is a perspective view of a configuration for analyzing image distortion in multiple dimensions.

While often shown and described in the disclosure as analyzing distortion in a single dimension (e.g., up and down), it will be appreciated that techniques as described herein can be applied in one or more dimensions. FIG. 17 is a perspective view of a configuration for analyzing image distortion in multiple dimensions. In the illustrated configuration, object 1720 is supported via an axis 1724. In some examples, object 1720 corresponds to coupling(s) having rotational axis 1724. As shown, imaging tool 1702 is arranged to view the front of the object 1720. Vertical deflection upward and downward, outlined by dotted lines 1730 and 1732, respectively, can be observed as image distortion via imaging tool 1702 viewing object 1720 from the front. It will be appreciated that, due to its orientation and position, imaging tool 1702 could also observe horizontal deflection (e.g., along the axis 1724). Such deflection is possible, though uncommon and/or often small along rotational axis 1724, and is not shown in FIG. 17. However, in the event horizontal deflection is present, such deflection could be observed as image distortion by imaging tool 1702.

Deflection in the direction toward and away from imaging tool 1702 can be difficult to observe via the imaging tool 1702. In some examples, imaging tool 1702 can observe apparent changes in size or focal distance of object 1720 that can be useful to determining front to back deflection of the object 1720. Additionally or alternatively, a second imaging tool 1704 can be positioned facing the object 1720 from a different angle in order to view different directions of object 1720 deflection. In the illustrated embodiment, imaging tool 1704 is positioned facing the top side of object 1720. Thus, front-to-back deflection outlined by dotted lines 1734 and 1736 can be easily observed as image distortion by imaging tool 1704. While shown as being oriented perpendicular to imaging tool 1702, the second imaging tool 1704 can be oriented at a different angle and still be capable of observing front-to-back deflection of the object as long as the angle looks at least partially up or down toward the object 1720. It will be appreciated that imaging tool 1704 as shown in FIG. 17 is also capable of observing any present side-to-side deflection (e.g., along axis 1724) of object 1720.

In the illustrated example of FIG. 17, the fields of view of imaging tool 1702 and 1704 differ by approximately 90 degrees. It will be appreciated that other orientations are possible, wherein the fields of view of imaging tools 1702 and 1704 differ by some other amount. Moreover, while shown as including separate imaging tool 1702, 1704, in some examples, different fields of view can be provided by separate imaging modules housed in a single imaging tool. For example, parallax offsets between imaging modules (e.g., a VL camera module and an IR camera module, two VL camera modules, two IR camera modules, etc.) can provide different fields of view of object 1720 for multi viewpoint image distortion analysis.

Figure 18:
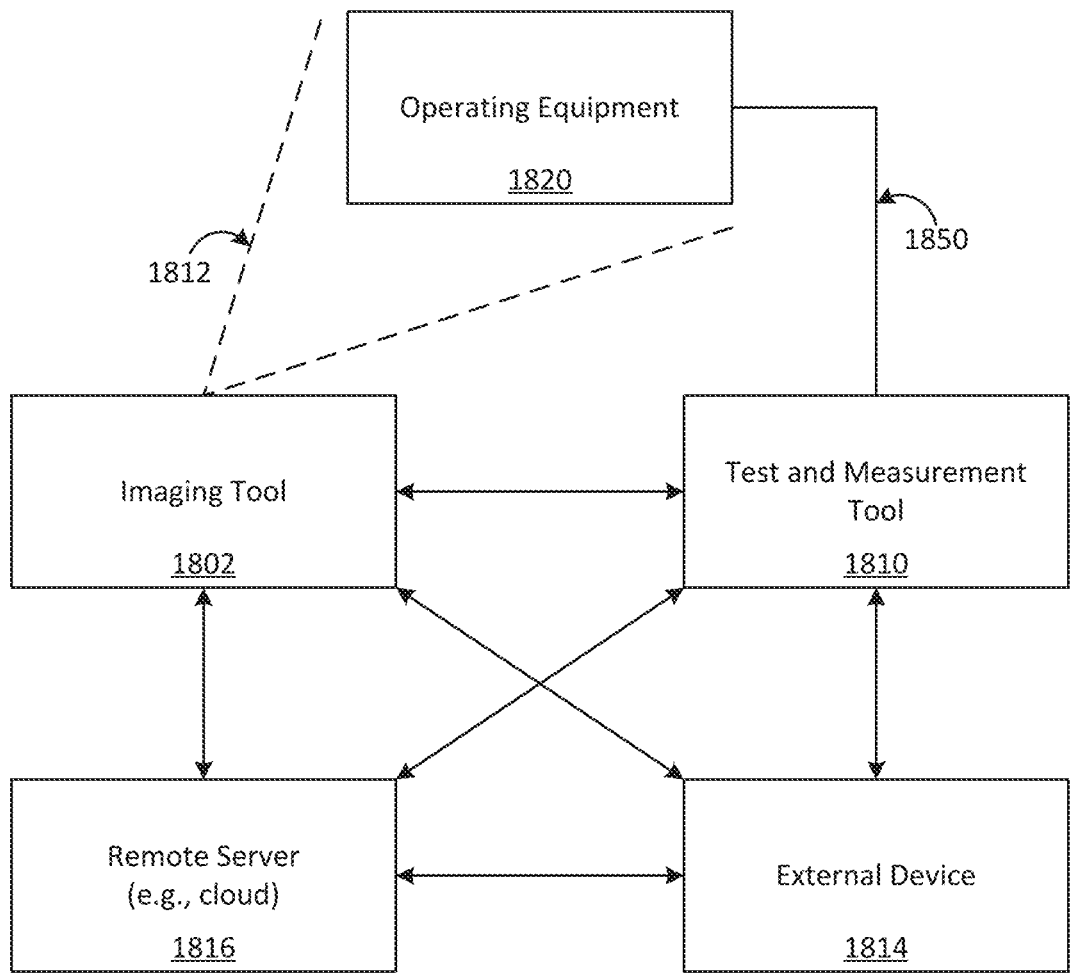
FIG. 18 is a schematic system-level diagram showing various components for analyzing vibration and/or alignment of equipment.

As described elsewhere herein, systems according to various embodiments can include a variety of components for facilitating analysis of vibration and/or alignment of operating equipment. FIG. 18 is a schematic system-level diagram showing various components for analyzing vibration and/or alignment of equipment. The illustrated system includes an imaging tool 1802 having a field of view 1812 that includes operating equipment 1820. As described elsewhere herein, imaging tool 1802 can be capable of generating IR and or VL image data representative of the operating equipment 1820. Such image data can be used, for example, for performing image distortion analysis, temperature calculations (e.g., for thermal expansion), system measurements, or the like.

The system further includes a test and measurement tool 1810 interfacing with the operating equipment 1820 via lead 1850. The test and measurement tool 1810 can be configured to acquire measurement data representative of at least one parameter of the operating equipment 1820. For example, in some embodiments, the test and measurement tool 1810 is capable of receiving vibration data indicative of the vibration of the operating equipment 1820. Vibration data can indicate an amount of vibration in the operating equipment 1820 in one, two, or three dimensions, and can be indicative of misalignment in the operating equipment 1820.

Additionally or alternatively, the test and measurement tool 1810 can include laser alignment functionality for analyzing the alignment of the operating equipment 1820, such as the alignment between drive and load side couplings. Additionally, the laser alignment feature can be used to perform an alignment process by which a user can adjust an alignment in the operating equipment 1820. In various embodiments, the imaging tool 1802 and the test and measurement tool 1810 can be integrated into a single combination tool having both imaging and test and measurement functionality. In other examples, the imaging tool 1802 and test and measurement tool 1810 can be in two-way communication with one another. Thus, processing, displaying, and/or saving of image data and/or measurement data can be performed in the imaging tool 1802 and/or the test and measurement tool 1810.

The system of FIG. 18 further includes an external device 1814. The external device 1814 can include a separate device capable of interfacing with the imaging tool 1802 and/or the test and measurement tool 1810. The external device 1814 can include a memory and/or a processor, and can be configured to process and/or store image data and or measurement data. Exemplary external devices can include a smartphone, tablet, computer, wearable device, or the like.

The exemplary system includes a remote server 1816 such as a cloud-based server that can be configured to interface with one or more of the imaging tool 1802, the test and measurement tool 1810, and the external device 1814. The remote server can be configured to process and or store image data and/or measurement data. Additionally or alternatively, the remote server can store various templates, historical data, operating profiles, or the like, for example, as described elsewhere herein.

As shown in the illustrative example of FIG. 18, each of the imaging tool 1802, test and measurement tool 1810, external device 1814, and the remote server 1816 are in communication with one another, for example, via wired or wireless communication. In some examples, communication can be achieved via a network, such as a wide area network, a local area network, or the like. In other examples, wireless local communication can be achieved via Wi-Fi communication, Bluetooth, Infrared, or the like.

In some examples, each system component is capable of direct communication with each other component. In other embodiments, a system component may communicate with another system component indirectly. For example, in an exemplary embodiment, imaging tool 1802 is in communication with an external device 1814 (e.g., a smartphone), which is in turn in communication with the remote server (1816). In some such examples, the external device 1814 can facilitate communication of data between the imaging tool 1802 and the remote server 1816.

Tools (e.g., imaging tool 1802 and test and measurement tool 1810) in direct or indirect communication can be used in combination to provide enhanced analysis of operating equipment 1820. For example, image data from imaging tool 1802 can be analyzed (e.g., for calculating offsets and/or image distortion as described elsewhere herein) to determine alignment data, which can be utilized by a test and measurement tool (e.g., 1810) capable of performing alignments for improving alignment efficacy.

As described elsewhere herein, processing of various data (e.g., image data, measurement data, etc.) can be performed in a variety of locations (e.g., in the imaging tool 1802, test and measurement tool 1810, external device 1814, remote server 1816, etc.). In some examples, processing functions can be split between devices (e.g., imaging tool 1802 processes image data to generate IR and/or VL image, external device post-processes generated image to analyze images for image distortion). Various combinations are possible.

In some embodiments, data from one tool can prompt further analysis of the operating equipment 1820. For example, in some instances, measurement and or image data can indicate the possibility of excess vibration and/or misalignment. For example, excess vibration detected via a test and measurement tool 1810 and/or IR image data such as described with respect to FIG. 4 can indicate possible misalignment of the operating equipment 1820. Based on such detected potential misalignment, further analysis of the alignment can be performed, such as calculating thermal offsets due to thermal expansion of the equipment (e.g., as described with respect to FIGS. 7A-C and 8), image distortion analysis, analysis of vibration data from a test and measurement tool 1810, or combinations thereof. Additional or alternative actions can be performed, such as shutting down the operating equipment 1820 and performing an alignment procedure.

In some examples, data indicative of excess vibration (e.g., IR image data or vibration data from a test and measurement tool) can trigger an alert recommending a user initiate one or more additional alignment analysis procedures (e.g., image distortion analysis, thermal growth analysis, etc.). Such an alert can be presented, for example, on a display. In some examples, the alert is communicated to an external device, such as a user's mobile device, or a remote location such as a central service location, such as described in U.S. patent application Ser. No. 14/921,128, which is incorporated by reference, in order to prompt further analysis of the system.

Additionally or alternatively to such an alert, in some embodiments, data (e.g., IR image data or vibration data from a test and measurement tool) or other symptoms indicative of misalignment or excess vibration such as those described elsewhere herein can trigger one or more automated actions, such as described in U.S. patent application Ser. No. 14/856,046, which is incorporated by reference. For example, automated actions can include performing thermal growth analysis and/or image distortion analysis. Such analysis can be performed by a variety of tools, such as an imaging tool 1802, a test and measurement tool 1810, a combination tool, an external device 1814, a remote server 1816 or the like. In some such examples, the automated further analysis can be analyzed, for example, with respect to a threshold, historical data, or the like, and if the analysis indicates sufficient misalignment, the system can perform further action, such as alerting a user as described elsewhere herein or automatically shutting down the operating equipment 1820. In various examples, different thresholds (e.g., amounts of thermal growth and/or image distortion) can lead to different actions. For example, a first threshold can result in alerting a user of excessive vibration and/or misalignment of operating equipment 1820, and a second threshold can cause the operating equipment 1820 to be automatically shut down.

In some examples, manually or automatically initiated alignment analysis (e.g., based on image distortion, measured thermal growth, etc.) can be used to determine alignment calibration data for programming into an alignment tool (e.g., a laser alignment tool). In some embodiments, calculated misalignments are communicated to a user (e.g., automatically, such as in an alert, or after a manually initiated analysis), and the user can input such calibration data into an alignment tool. In other examples, calibration data (whether the result of automated or manual initiation) can be automatically communicated from a system component (e.g., imaging tool 1802, test and measurement tool 1810, external device 1814, or remote server 1816) to the alignment tool for calibrating subsequent alignment processes. Once the alignment calibration data is programmed into the alignment tool, a system operator can perform an alignment process, such as adding shims under pieces of equipment or performing other alignment adjustment processes, while using the alignment tool and calibrated alignment data to guide the alignment as described elsewhere herein.

Accordingly, various system components can be configured to operate cooperatively in order to analyze and adjust the alignment of operating equipment 1820. As described herein, various steps in the analysis can be performed in a variety of locations and/or by a variety of devices. For example, systems as described herein can include a processing system comprising one or more processors capable of collectively performing steps in the processes described herein. That is, different system components (e.g., an imaging tool 1802, test and measurement tool 1810, external device 1814, and/or remote server 1816, etc.) can include processing capabilities for performing one or more processes described herein. Collectively, the system components work in concert to perform the processes carried out by the system as a whole. FIGS. 19-24 are process flow diagrams illustrating exemplary cooperative action of various system components in vibration and/or misalignment analysis and alignment set-up process.

Figure 19:
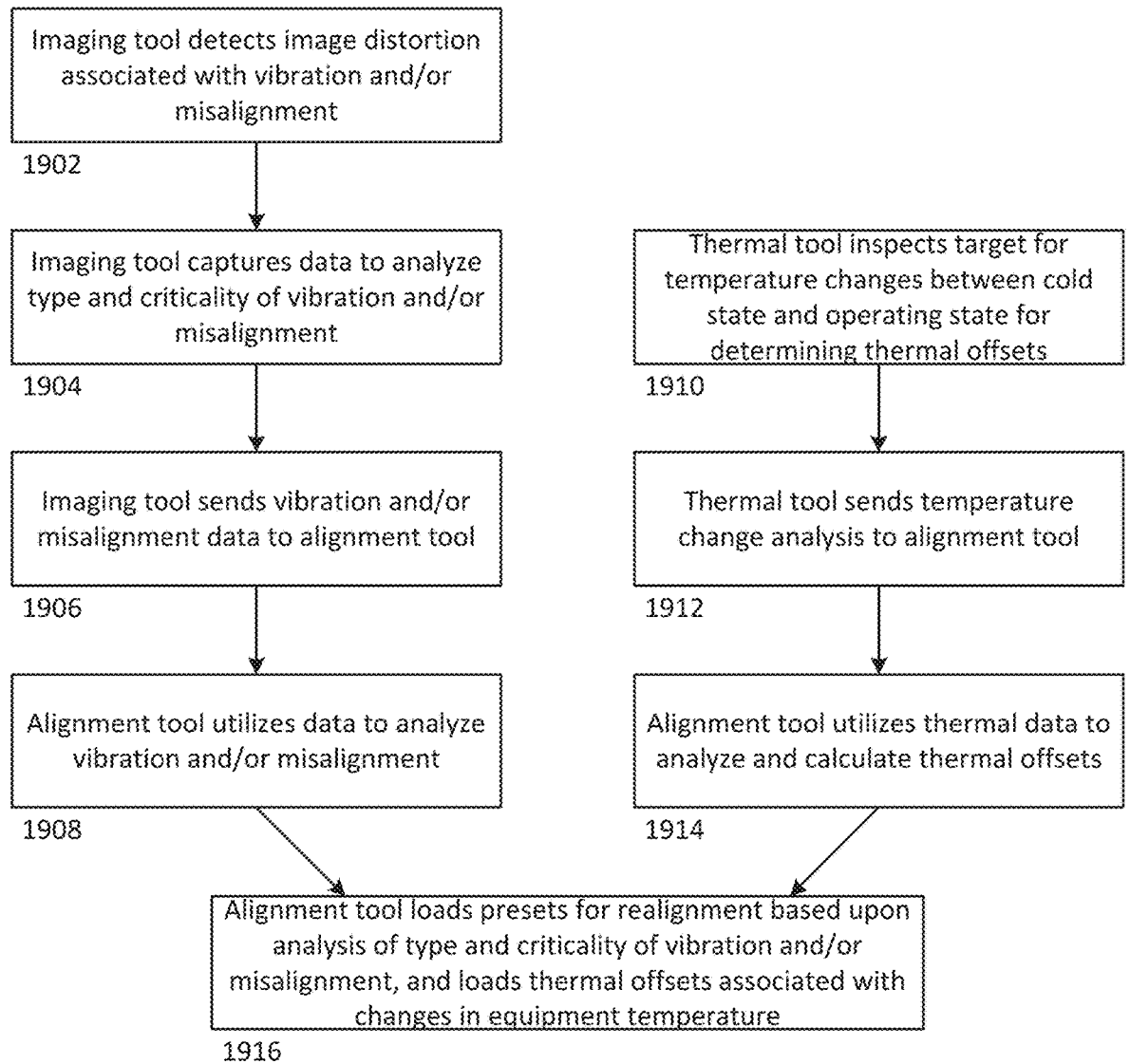
FIG. 19 shows a process flow diagram illustrating exemplary vibration and/or misalignment analysis and an alignment set-up process.

According to the method of FIG. 19, an imaging tool is used to detect image distortion associated with vibration and/or misalignment of an object (1902) and captures data for analyzing the type and/or criticality of the vibration and/or misalignment (1904). In the exemplary method of FIG. 19, the imaging tool sends the vibration and/or misalignment data to an alignment tool (1906), which utilizes the data to load presets (e.g., calibration data) for realignment (1908).

Additionally or alternatively, a thermal tool (e.g., a thermal imaging camera as part of an imaging tool, a contact temperature sensor as part of a test and measurement tool, etc.) inspects the object for temperature changes between a cold state and an operating state for determining thermal offsets (e.g., a cold temperature $T_0$ and an operating temperature T of equation 1) (1910). The thermal tool sends the temperature change analysis to the alignment tool (1912), which utilizes the thermal data to determine thermal offsets (e.g., via equations 2 and 3) (1914).

The alignment tool can be configured to load presets for realignment (e.g., calibration data) based upon analysis of the type and/or criticality of detected vibration and/or misalignment, and the calculated thermal offsets associated with changes in temperature for further realignment (1916). In various examples, the presets associated with the image distortion (e.g., due to the type and/or criticality of vibration and/or misalignment) are entered and treated separately from the thermal offsets. For example, the thermal offsets can be used to refine alignment parameters based on the image distortion. In other examples, both the presets based on image distortion (e.g., from step 1908) and the calculated thermal offsets (e.g., from 1914) can be entered separately but combined to create a single set of calibration parameters for adjusting the alignment of the alignment tool.

Figure 20:
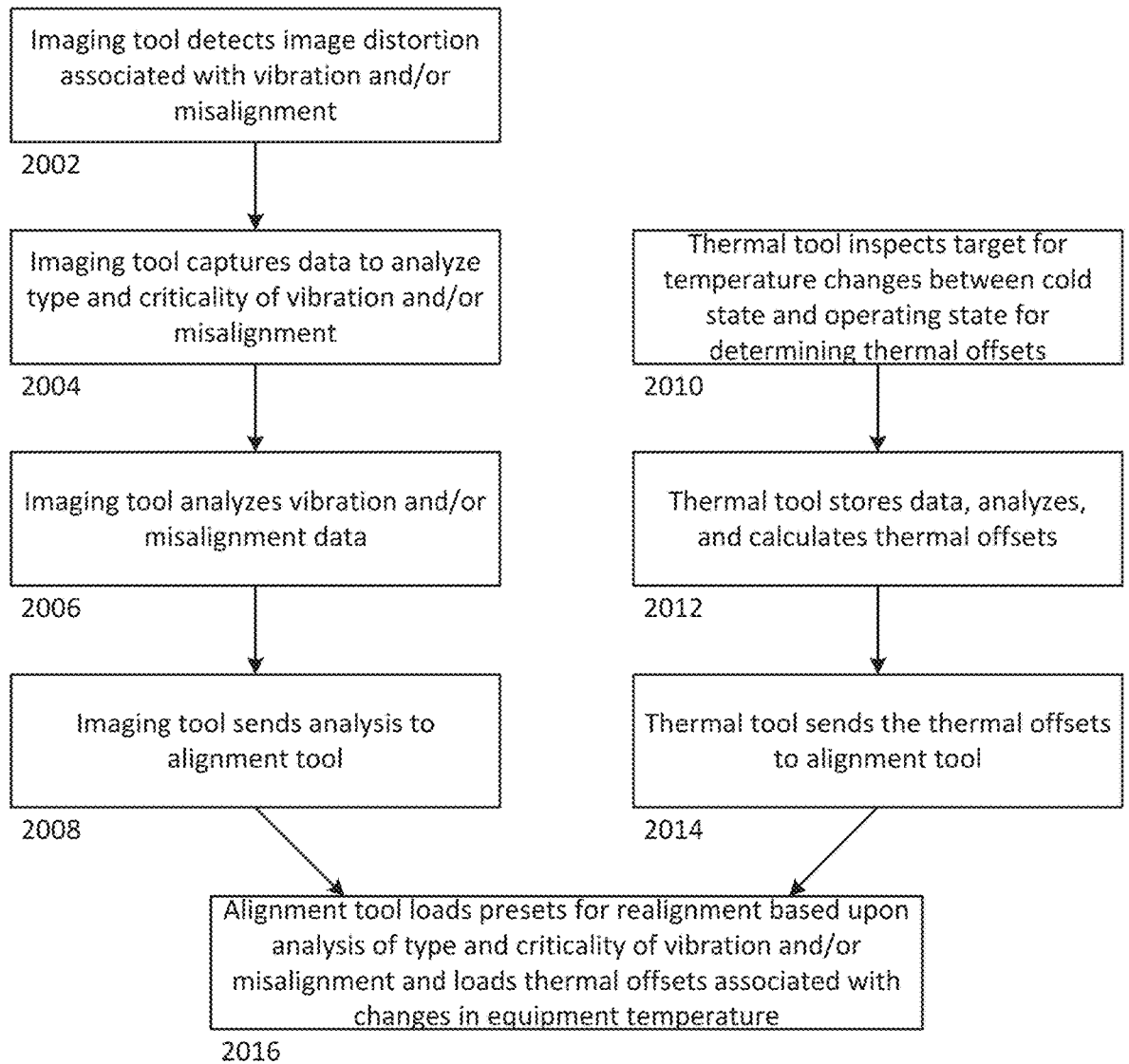
FIG. 20 shows a process flow diagram illustrating exemplary vibration and/or misalignment analysis and an alignment set-up process.

FIG. 20 illustrates a method similar to that of FIG. 19 for determining and utilizing thermal offsets and image distortion data for adjusting operation of an alignment tool. According to the process of FIG. 20, an imaging tool detects image distortion associated with vibration and/or misalignment (2002) and captures data to analyze the type and criticality of vibration and/or misalignment (2004). However, as opposed to sending vibration and/or misalignment data to an alignment too (e.g., as in step 1906 in the process of FIG. 19), the imaging tool itself analyzes the vibration and/or misalignment data (2006) and sends the analysis to the alignment tool (2008).

Similarly, after inspecting the target for temperature changes between operating states (2010), rather than sending temperature change analysis to the alignment tool (e.g., step 1912 in FIG. 19), the thermal tool itself stores and analyzes data and calculates thermal offsets (2012). The thermal tool then sends the calculated thermal offsets to the alignment tool (2014). The alignment tool, after receiving analysis from the imaging tool and the thermal offsets from the thermal tool, the alignment tool loads presets for realignment based upon analysis of the type and criticality of vibration and/or misalignment (e.g., via image distortion analysis) and the thermal offsets (e.g., calculated by the thermal tool) (2016). As described elsewhere herein, such loaded data can be used as calibration parameters for updating operation of the alignment tool to facilitate alignment of operating equipment.

Figure 21:
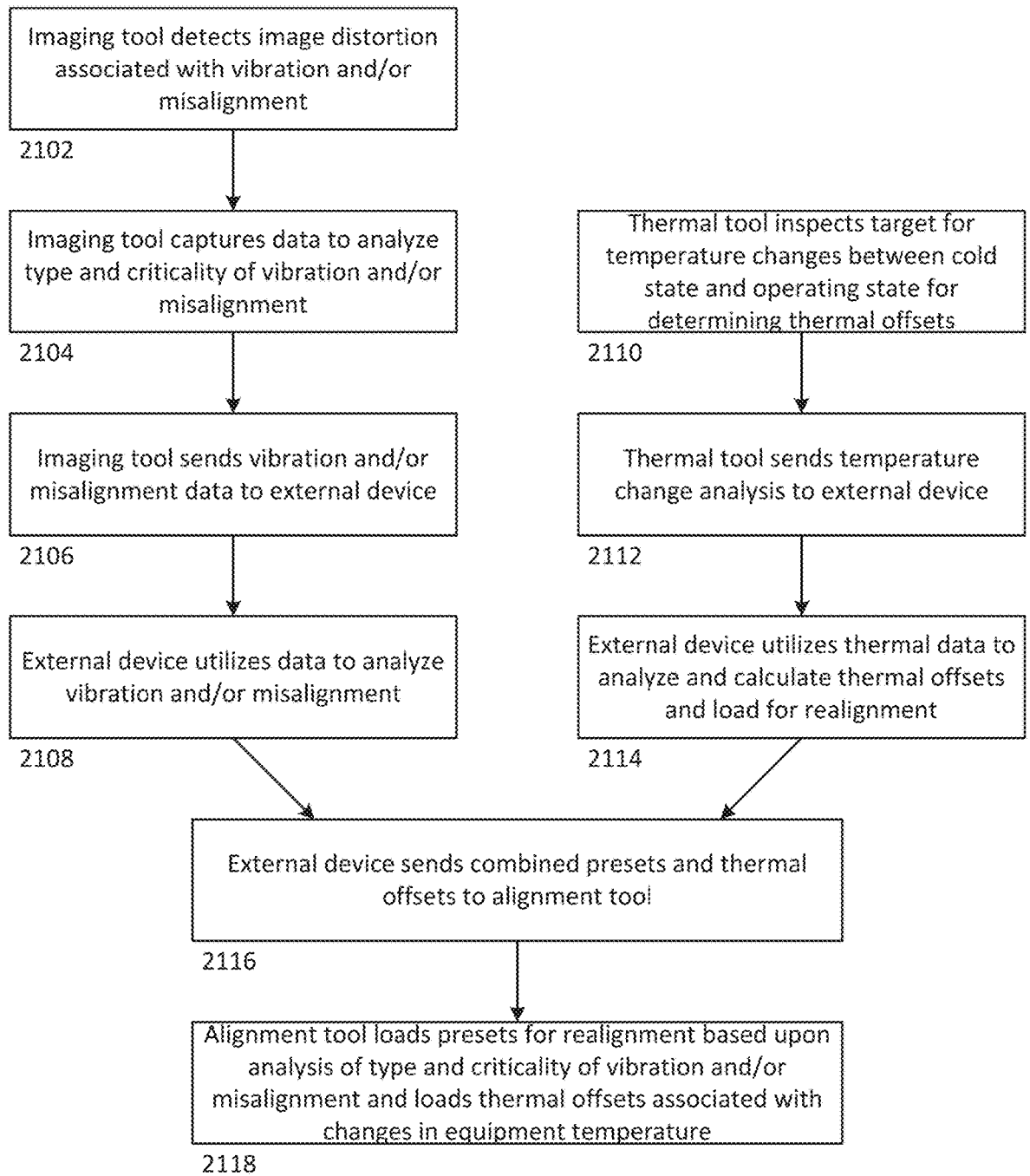
FIG. 21 shows a process flow diagram illustrating exemplary vibration and/or misalignment analysis and an alignment set-up process.

FIG. 21 illustrates a method similar to those of FIGS. 19 and 20 for determining and utilizing thermal offsets and image distortion data for adjusting operation of an alignment tool. In the exemplary method of FIG. 21, an imaging tool detects image distortion associated with vibration and/or misalignment (2102) and captures data to analyze the type and criticality of vibration and/or misalignment (2104). In the exemplary method of FIG. 21, the imaging tool sends the vibration and/or misalignment data to an external device (e.g., a smartphone, tablet, wearable device, personal computer, etc.) (2106), and the external device can use the received data to analyze vibration and/or misalignment.

Similarly, according to the exemplary method of FIG. 21, the thermal tool inspects a target for temperature changes between operating states (2110) and sends the temperature change analysis to the external device (2112). The external device can utilize the thermal data to analyze and calculate thermal offsets (2114).

The external device can determine presets (e.g., based on image distortion) and/or thermal offsets (e.g., based on the thermal data) and send such data to the alignment tool (2116). The alignment tool can load such presets and/or offsets as described elsewhere herein to calibrate operation of the alignment tool (2118).

Figure 22:
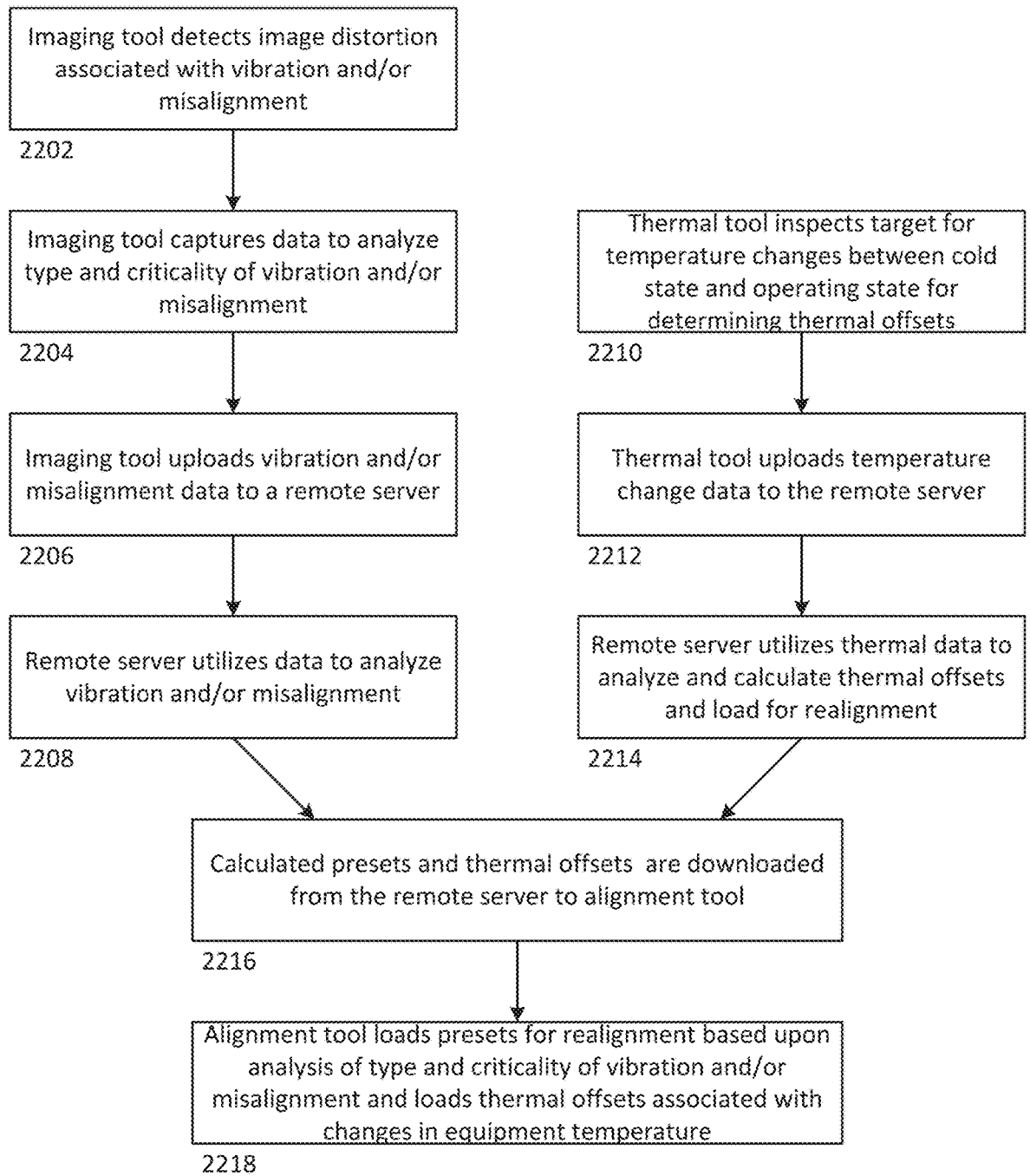
FIG. 22 shows a process flow diagram illustrating exemplary vibration and/or misalignment analysis and an alignment set-up process.

FIG. 22 illustrates a method similar to that of FIG. 21, wherein steps performed by an external device in FIG. 21 are performed by a remote server in FIG. 22. For instance, according to the exemplary method of FIG. 22, an imaging tool detects image distortion associated with vibration and/or misalignment (2202) and captures data to analyze the type and criticality of vibration and/or misalignment (2204). In the exemplary method of FIG. 22, the imaging tool sends the vibration and/or misalignment data to a remote server (e.g., a cloud-based server capable of performing cloud-based computer, a company or facility server, etc.) (2206), and the remote server can use the received data to analyze vibration and/or misalignment (e.g., via cloud-based computing).

Similarly, according to the exemplary method of FIG. 22, the thermal tool inspects a target for temperature changes between operating states (2210) and sends the temperature change analysis to the remote server (2212). The remote server can utilize the thermal data to analyze and calculate thermal offsets (2214).

The remote server can determine presets (e.g., based on image distortion) and/or thermal offsets (e.g., based on the thermal data) and send such data to the alignment tool (2216). The alignment tool can load such presets and/or offsets as described elsewhere herein to calibrate operation of the alignment tool (2218).

Figure 23:
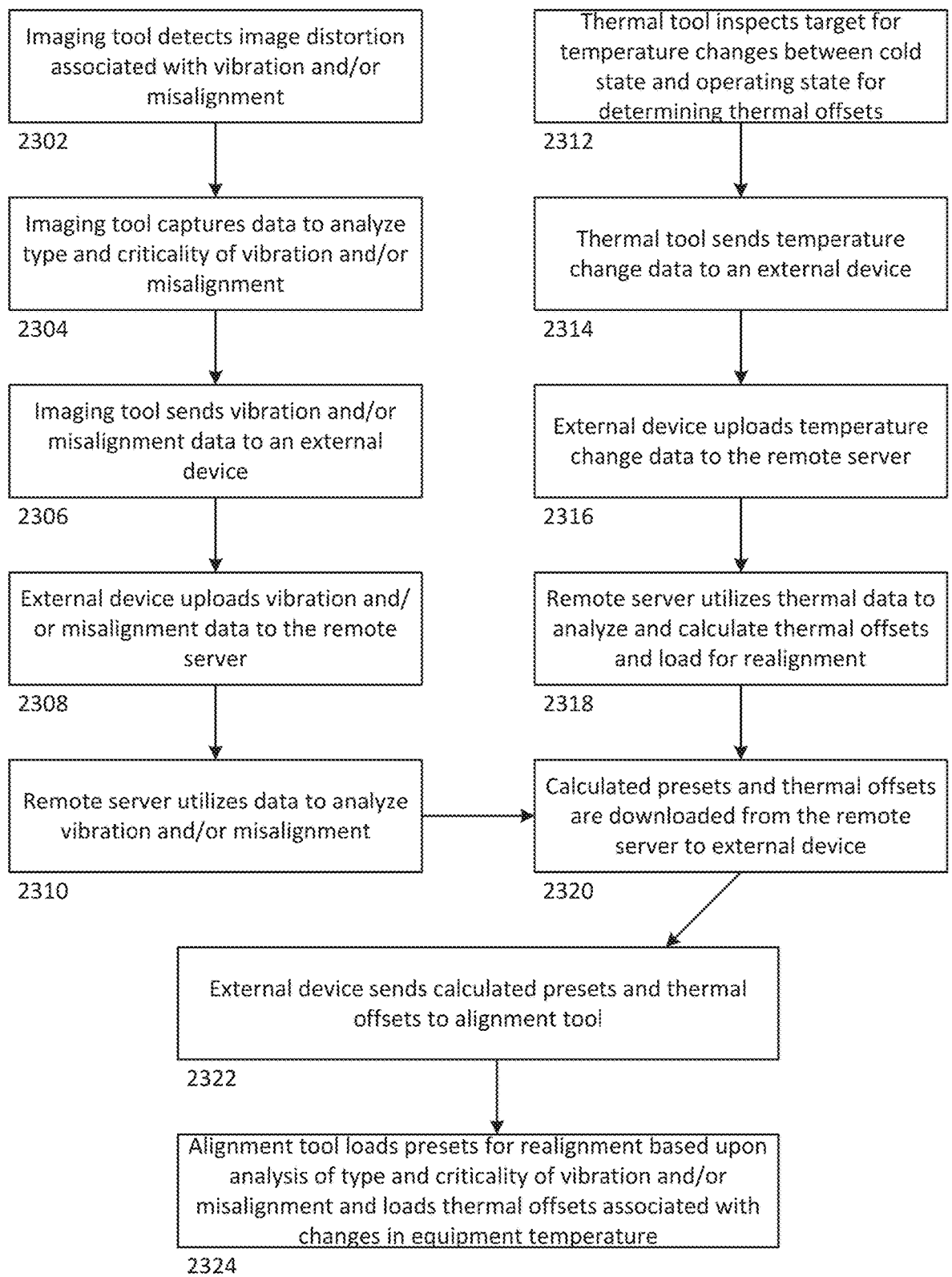
FIG. 23 shows a process flow diagram illustrating exemplary vibration and/or misalignment analysis and alignment set-up process.

FIG. 23 illustrates a method similar to those of FIGS. 21 and 22, wherein processing steps are shared between an external device and a remote server. According to the exemplary method of FIG. 23, the imaging tool detects image distortion associated with vibration and/or misalignment (2303), and captures data to analyze the type and criticality of the vibration and/or misalignment (2304). The imaging tool sends the vibration and/or misalignment data to an external device (e.g., a smartphone, tablet, etc.) (2306), which in turn uploads the data to the remote server (e.g., the cloud) (2308). The remote server utilizes the data to analyze vibration and/or misalignment for determining presets for realignment (e.g., via cloud-based computing) (2310).

Similarly, the thermal tool inspects the target for temperature changes between operating states for determining thermal offsets (2312) and sends temperature change data to an external device (2314). The external device then uploads the temperature change data to the remote server (2316), which utilizes the thermal data to analyze and calculate thermal offsets for realignment (2318).

The calculated presets and thermal offsets are downloaded from the remote server back to an external device (2320), which sends the calculated presets and thermal offsets to the alignment tool (2322), which loads the presets and/or thermal offsets for calibrating the alignment tool (2324).

In various executions of the method of FIG. 23, the external device in communication with the imaging tool, the external device in communication with the thermal tool, and the external device in communication with the alignment tool can be the same or different external devices. For example, in some implementations, an operator may use a smartphone running an application ("app") configured to facilitate communication with the imaging tool, measurement tool, and the alignment tool. The smartphone can receive data from the imaging tool and thermal tool and communicate the data to the remote server via the app. Similarly, the smartphone can receive the data from the remote server resulting from processes performed by the remote server (e.g., via cloud-based computing) and subsequently send such data to the alignment tool.

Figure 24:
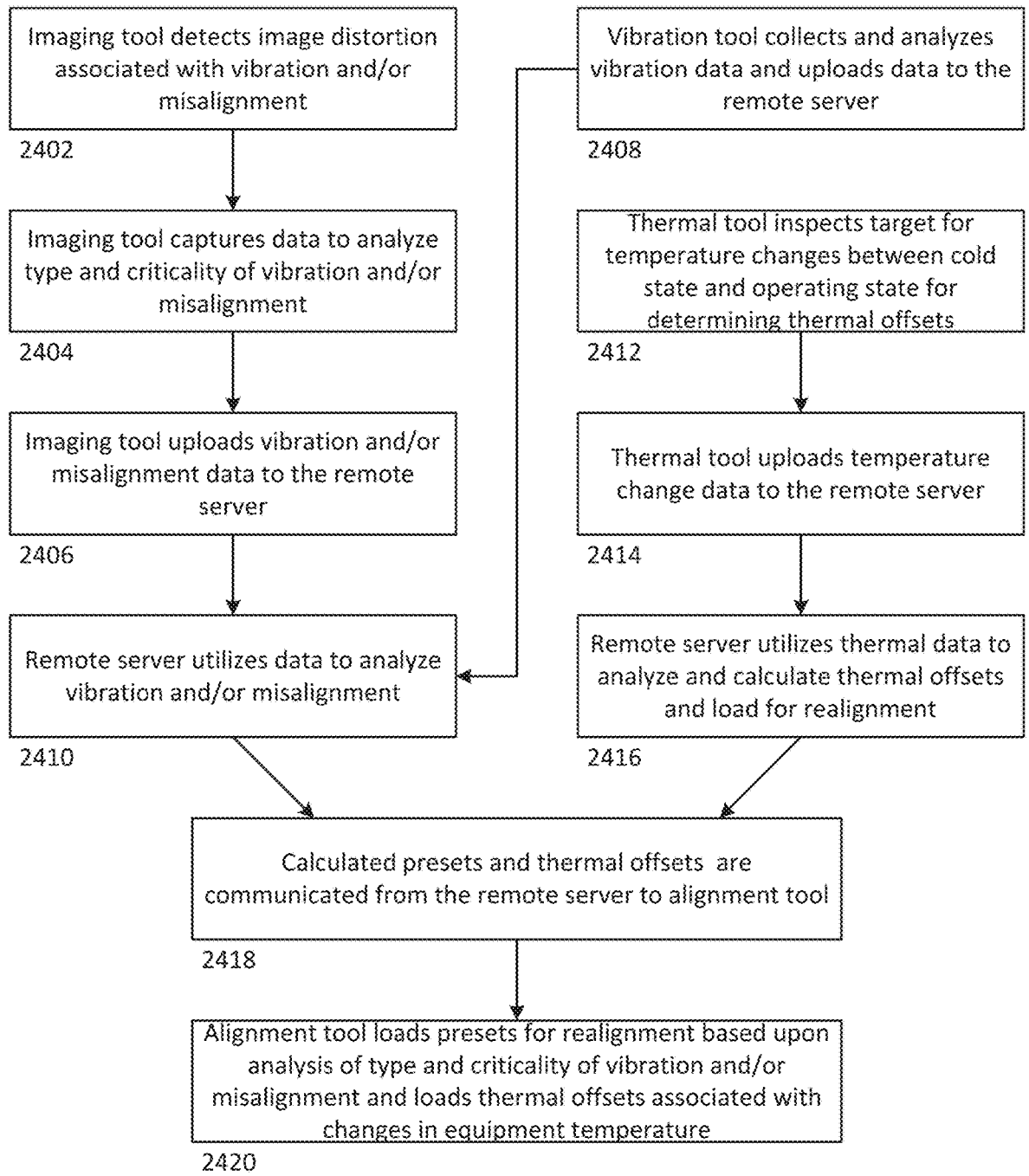
FIG. 24 shows a process flow diagram illustrating exemplary vibration and/or misalignment analysis and an alignment set-up process.

FIG. 24 shows an exemplary method for ultimately loading presets and/or thermal offsets (e.g., as alignment calibration parameters) based on image distortion and/or thermal data and/or vibration data. In the exemplary method of FIG. 24, an imaging tool detects image distortion associated with vibration and/or misalignment (2402) and captures data to analyze the type and criticality of the vibration and/or misalignment (2404). The imaging tool uploads the vibration and/or misalignment data to a remote server (e.g., a cloud-based server) (2406).

Additionally, according to the illustrated method, a vibration tool collects and analyzes vibration data and uploads the data to the remote server (2408). The remote server utilizes the data (e.g., the vibration and/or misalignment data from the imaging tool and the vibration data from the vibration tool) to analyze vibration and/or misalignments (e.g., to determine alignment tool presets) (2410).

A thermal tool inspects the target for temperature changes between operating states (2412) and uploads temperature change data to the remote server (2414) the remote server utilizes the thermal data to calculate thermal offsets (2416). Calculated presets and thermal offsets are communicated from the remote server to an alignment tool (e.g., sent to the alignment tool from the remote server or downloaded by the alignment tool from the remote server) (2418). The alignment tool loads the presets and thermal offsets (2420) for calibrating alignment processes using the alignment tool.

As described with respect to FIGS. 19-24, a variety of processes can be performed by a variety of system components for ultimately loading alignment calibration parameters (e.g., presets and/or thermal offsets) into an alignment tool as described herein. Direct or indirect communication between tools used for acquiring various data (e.g., thermal data, image distortion data, etc.) can facilitate communication of any information for determine such alignment calibration parameters. The determining of such alignment calibration parameters can be performed in a variety of locations including separate from the alignment tool itself.

Various embodiments have been described. In some examples, aspects of the disclosure can be embodied as one or more non-transitory computer-readable media comprising executable instructions for causing one or more programmable processors for performing functions described herein. For instance, processes as described herein can be performed by a single device or by a plurality of devices operating in concert. The one or more non-transitory computer-readable media can be stored in one or more of such devices, enabling different devices to perform different tasks as part of an overall process involving several such devices. For instance, in various examples, the non-transitory computer-readable media can be included in one or more of an imaging tool, a test and measurement tool, an external device, and a remote server to enable such components to operate in concert to perform a variety of tasks. In various embodiments, different devices can perform various tasks in an overall method performed by the system, and can communicate results to other devices in the system to perform additional tasks. Such examples are non-limiting, and do not define or limit the scope of the invention in any way. Rather, these and other examples are within the scope of the following claims.

The invention claimed is:

1. A system for determining a misalignment of components of equipment under test, comprising:
an imaging tool configured to receive radiation from a target scene at two or more instances during a period of time, wherein the target scene includes a first component of the equipment under test; and
a processing system in communication with the imaging tool, the processing system including one or more processors configured to:
generate an image by combining image data from the radiation received by imaging tool;
determine a shape of an image distortion in the image, wherein the image distortion indicates movement of the first component of the equipment under test between a neutral position and a deflected position during the period of time in which the imaging tool received the radiation from the target scene;
determine a misalignment of the first component coupled to a second component of the equipment under test based on the shape of the image distortion in the image; and
generate an output corresponding to the misalignment.

2. The system of claim 1, wherein the shape of the image distortion indicates an extent and orientation of deflection of the first component of the equipment under test relative to the neutral position, and wherein the one or more processors are configured to determine a type, origin, or direction of the misalignment based on the shape of the image distortion.

3. The system of claim 1, wherein the one or more processors are configured to determine a size of the image distortion.

4. The system of claim 3, wherein the one or more processors are configured to determine the size of the image distortion by determining an area of the image distortion.

5. The system of claim 3, wherein the one or more processors are configured to determine one or more alignment calibration parameters representative of an amount of misalignment of the first component of the equipment under test based on the size of the image distortion and the shape of the image distortion.

6. The system of claim 3, wherein the one or more processors are configured to alert a user when the size of the image distortion exceeds a threshold.

7. The system of claim 1, wherein the image data is combined by averaging image data derived from the radiation received by the imaging tool at the two or more instances during the period of time.

8. The system of claim 1, wherein the one or more processors are configured to:
determine a severity of misalignment of the first component of the equipment under test based on an area of the image distortion or a magnitude of deflection of the first component of the equipment under test from the neutral position indicated by the image distortion; and
alert a user when the severity of misalignment exceeds a threshold.

9. The system of claim 1, wherein the one or more processors are configured to compare the shape of the image distortion to a database of image distortions to determine the misalignment of the first component.

10. The system of claim 1, wherein the imaging tool comprises an infrared (IR) camera configured to receive the radiation from the target scene, the radiation including IR radiation, and
wherein the processing system is configured to generate the image based at least in part on IR image data from the IR radiation.

11. The system of claim 1, wherein the imaging tool comprises a visible light (VL) camera configured to receive the radiation from the target scene, the radiation including VL radiation, and
wherein the processing system is configured to generate the image based at least in part on the VL radiation.

12. A method for determining a misalignment of components of equipment under test, comprising:
receiving radiation from a target scene at two or more instances during a period of time, wherein the target scene includes a component of the equipment under test;
generating an image by combining image data;
determining a shape of an image distortion in the image, wherein the image distortion indicates movement of the component of the equipment under test between a neutral position and a deflected position during the period of time;
determining a type, origin, or direction of misalignment of the component of the equipment under test based on the shape of the image distortion in the image; and
generating an output corresponding to the type, origin, or direction of the misalignment.

13. The method of claim 12, wherein acquiring combining the image data comprises averaging image data derived from the radiation.

14. The method of claim 12, further comprising detecting edges of the image distortion in the image to determine an area of the image distortion.

15. The method of claim 14, further comprising:
determining an amount of misalignment of the component of the equipment under test based on the area of the image distortion;
determining one or more alignment calibration parameters based on the amount of misalignment of the component; and
transmitting the one or more alignment calibration parameters to an alignment tool that facilitates an alignment of the component.

16. The method of claim 14, further comprising:
determining a severity of misalignment of the component based on the area of the image distortion; and
alerting a user when the severity of misalignment exceeds a threshold.

17. The method of claim 12, further comprising determining one or more alignment calibration parameters based on a size of the image distortion and the shape of the image distortion.

18. The method of claim 12, further comprising comparing the shape of the image distortion to a database of image distortions data-to determine the type, origin, or direction of the misalignment.

19. The system of claim 1, wherein the processing system is configured to combine the image data from the radiation by generating the image with a length of exposure time sufficient for the first component of the equipment under test to move between the neutral position and the deflected position during the exposure time.

20. The method of claim 12, wherein the image data is combined by generating the image with a length of exposure time sufficient for the component of the equipment under test to move between the neutral position and the deflected position during the exposure time.

\* \* \* \* \*

UNITED STATES PATENT AND TRADEMARK OFFICE
CERTIFICATE OF CORRECTION

PATENT NO. : 12,293,501 B2  
APPLICATION NO. : 17/560817  
DATED : May 6, 2025  
INVENTOR(S) : Michael D. Stuart et al.

Page 1 of 1

It is certified that error appears in the above-identified patent and that said Letters Patent is hereby corrected as shown below:

In the Claims

<u>Column 52, Claim 13, Line 35:</u>
"wherein acquiring combining"
Should read:
--wherein combining--.

<u>Column 52, Claim 18, Line 62:</u>
"distortions data-to determine"
Should read:
--distortions to determine--.

Signed and Sealed this
First Day of July, 2025

Coke Morgan Stewart
*Acting Director of the United States Patent and Trademark Office*